United States Patent
Dalton et al.

(10) Patent No.: US 12,500,899 B2
(45) Date of Patent: Dec. 16, 2025

(54) SATELLITE COMMUNICATIONS NETWORK INTRUSION DETECTION SYSTEMS AND METHODS

(71) Applicant: SC NETWORKS, INCORPORATED, Reston, VA (US)

(72) Inventors: Dana Dalton, Reston, VA (US); Colby Moore, Reston, VA (US)

(73) Assignee: SC Networks, Incorporated, Reston, VA (US)

( * ) Notice: Subject to any disclaimer, the term of this patent is extended or adjusted under 35 U.S.C. 154(b) by 187 days.

(21) Appl. No.: 18/026,279

(22) PCT Filed: Feb. 2, 2022

(86) PCT No.: PCT/US2022/014860
§ 371 (c)(1),
(2) Date: Mar. 14, 2023

(87) PCT Pub. No.: WO2022/169809
PCT Pub. Date: Aug. 11, 2022

(65) Prior Publication Data
US 2023/0362173 A1     Nov. 9, 2023

Related U.S. Application Data

(60) Provisional application No. 63/145,419, filed on Feb. 3, 2021.

(51) Int. Cl.
*H04L 9/40*        (2022.01)
*H04W 12/121*      (2021.01)

(52) U.S. Cl.
CPC ....... *H04L 63/1408* (2013.01); *H04W 12/121* (2021.01)

(58) Field of Classification Search
CPC ............ H04L 63/14–1491; H04W 12/12–128
See application file for complete search history.

(56) References Cited

U.S. PATENT DOCUMENTS

2005/0251570 A1\* 11/2005 Heasman ................ G06F 21/55
709/224
2015/0026809 A1\* 1/2015 Altman ................ H04L 63/145
726/23

(Continued)

FOREIGN PATENT DOCUMENTS

EP     2743726 A1 \* 6/2014 ............. G01S 11/06

OTHER PUBLICATIONS

Bibik, Przemysław, et al. "Problems of detecting unauthorized satellite transmissions from the VSAT terminals." 2012 Military Communications and Information Systems Conference (MCC). IEEE, 2012. (Year: 2012).\*

(Continued)

*Primary Examiner* — Madhuri R Herzog
(74) *Attorney, Agent, or Firm* — BakerHostetler

(57) ABSTRACT

The present application at least describes an intrusion detection system. The system may include a non-transitory memory including a set of instructions. The system may also include a processor operably coupled to the non-transitory memory configured to execute the set of instructions. One of the instructions may include obtaining streaming metrics data from a satellite network management system. Another one of the instructions may include identifying a terminal in an intrusion detection database. Ye another one of the instructions may include determining, based on the streaming metrics data, whether a confidence score providing an indication of authenticity for the identified terminal meets or (Continued)

exceeds a predetermined threshold. A further one of the instructions may include generating an alert based upon the determination.

20 Claims, 13 Drawing Sheets

(56) References Cited

U.S. PATENT DOCUMENTS

| | | | | |
|---|---|---|---|---|
| 2016/0269436 A1* | 9/2016 | Danielson | ........... | H04L 63/1433 |
| 2016/0366170 A1 | 12/2016 | Bell | | |
| 2017/0104658 A1 | 4/2017 | Sykes | | |
| 2018/0124096 A1* | 5/2018 | Schwartz | ................ | H04W 8/22 |
| 2020/0100113 A1* | 3/2020 | Rognant | ............. | H04L 63/1425 |
| 2020/0412453 A1* | 12/2020 | Costello | ................ | H04B 10/40 |
| 2021/0051177 A1* | 2/2021 | White | ..................... | H04L 67/56 |

OTHER PUBLICATIONS

Zhu, Jianlong, and ChunFeng Wang. "Satellite networking intrusion detection system design based on deep learning method." International conference in communications, signal processing, and systems. Singapore: Springer Singapore, 2017. (Year: 2017).*

Ali Broumandan et al.; "Demonstration of a Multi-Layer Spoofing Detection Implemented in a High Precision GNSS Receiver"; IEEE/Ion Position, Location And Navigation Symposium (Plans), Apr. 2020; pp. 538-547.

* cited by examiner

500

Cloud AI technology stack

SATELLITE COMMUNICATIONS NETWORK INTRUSION DETECTION SYSTEMS AND METHODS

CROSS-REFERENCE TO RELATED APPLICATIONS

This application is a National Stage Application of International Patent Application No. PCT/US2022/014860, filed Feb. 2, 2022, which claims priority to U.S. Provisional Application No. 63/145,419 filed Feb. 3, 2021, entitled "Satellite (SAT) Communications (COM) Network Defense and Intrusion Detection System, Method and Computer Program Product," the entire disclosures of both which are hereby incorporated by reference as if set forth in their entirety herein.

TECHNICAL FIELD

The present application generally relates to communications networks and network intrusion detection systems and methods.

BACKGROUND OF THE DISCLOSURE

Communications networks including satellites may become susceptible to attacks by intruders, such as for example, hackers and nation-state actors seeking to exploit recovered intelligence. Conventional attempts to identify or impede attacks of data networks may include firewalls and anti-virus software systems. These options attempt to block and/or scan for identified signatures of known software viruses stored on computer systems.

Network system vulnerabilities may continually be identified and exploited by attackers. Once an attacker infiltrates a network, the attacker may hide for a predetermined period of time ultimately waiting for an opportunity to exploit the compromised network. Network attacks may involve spoofing of a target device by an attacking device.

What is needed is an improved system to detect network intrusions in satellite communication systems.

What is needed is an improved system to detect intrusions in very small aperture terminal (VSAT) networks.

SUMMARY

The foregoing needs are met, to a great extent, by the disclosed apparatus, system and method for providing network diversification and secure communications.

One aspect of the application describes an intrusion detection system. The system may include a non-transitory memory including a set of instructions. The system may also include a processor operably coupled to the non-transitory memory configured to execute the set of instructions. One of the instructions may include obtaining streaming metrics data from a satellite network management system, identifying a terminal in an intrusion detection database. Another one of the instructions may include determining, based on the streaming metrics data, whether a confidence score for the identified terminal meets or exceeds a predetermined threshold. Yet another one of the instructions may include generating an alert based upon the evaluation.

Another aspect of the application describes a method of intrusion of detection. The method may include a step of populating, via an intrusion detection database, streaming metrics data obtained from a satellite network management system. The method may also include a step of identifying a terminal in the intrusion detection database. The method may further include a step of determining, via a trained predictive machine learning model and the streaming metrics data, whether a confidence score for the identified terminal meets or exceeds a predetermined threshold. The method may even further include a step of updating the intrusion detection database in view of the determination.

Yet another aspect of the application describes a computer readable medium including program instructions which when executed by a processor effectuate the program instructions. One of the instructions may include causing streaming metrics data to be obtained from a satellite network management system. Another one of the instructions may include identifying a terminal in an intrusion detection database. Yet another one of the instructions may include determining, via a trained predictive machine learning model and the streaming metrics data, whether a confidence score for the identified terminal meets or exceeds a predetermined threshold. The instructions may even further include updating the intrusion detection database in view of the determination.

There has thus been outlined, rather broadly, certain embodiments in order that the detailed description thereof herein may be better understood, and in order that the present contribution to the art may be better appreciated. There are, of course, additional embodiments of the aspect that will be described below and which will form the subject matter of the claims appended hereto.

BRIEF DESCRIPTION OF THE DRAWINGS

In order to facilitate a fuller understanding of the aspect, reference is now made to the accompanying drawings, in which like elements are referenced with like numerals. These drawings should not be construed as limiting the aspect and intended only to be illustrative.

DETAILED DESCRIPTION

Figure 1:
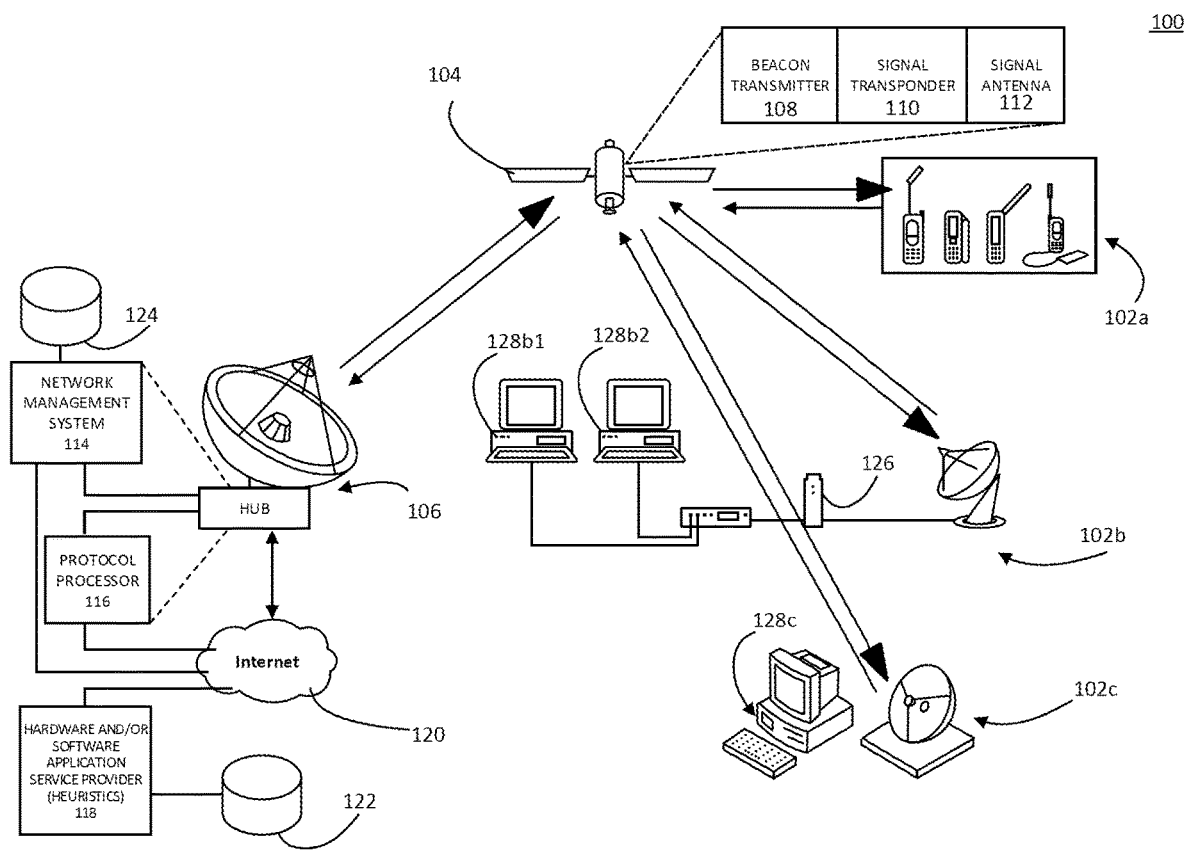
FIG. 1 depicts an exemplary environment illustrating VSAT satellite communication network coupling various exemplary remote VSAT user terminals to an exemplary central station hub via exemplary uplink and downlink communications via an exemplary geosynchronous satellite according to an aspect of the application.

In this respect, before explaining at least one embodiment of the aspect in detail, it is to be understood that the aspect is not limited in its application to the details of construction and to the arrangements of the components set forth in the following description or illustrated in the drawings. The aspect is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

Communications Networks

Communications networks may allow transmission of data in one direction (simplex) or two directions (duplex). Conventional terrestrial voice and data communications networks have converged in recent decades thanks to packet switching, voice over internet protocol (VoIP), and other enabling technologies. Terrestrial communication networks include conventional wired (e.g., circuit-switched, and packet-switched, copper and optical fiber, and CATV) and wireless networks (e.g., cellular, LTE, WiMax, WI-FI, etc.). Long haul wireless networks include microwave repeater and satellite-based networks. Wireless communication techniques involve modulating digital data over radio frequency (RF) signals, which are transmitted and received (transceived) by use of transmitter (Tx) and receiver (Rx) antennae.

A satellite radio system may use radio link (microwave line of sight (LOS)) communication using one or two RF repeaters at great distances from terminal earth stations. Thus, RF transmission with radio connectivity is the primary broadcasting means. Satellite transmissions began in the early 1960s but have been enhanced over the decades since. Satellite communications (SATCOM) service providers provide communications via satellites to so-called earth stations. An "earth station" refers to a radio facility located on the earth's surface that communicates with satellites. A "terrestrial station" is a radio facility on the earth's surface that communicates with other similar facilities on the earth's surface.

Many commercial communication satellites are geostationary. Such satellites orbit the earth in a 24-hour period, thus appearing stationary. The 24-hour synchronous orbit of a geostationary satellite is at an altitude of 22,300 miles or 35,900 km above the earth's equator. Most presently employed communication satellites are RF repeaters. Many satellites are referred to as bent pipes. Other satellites are processing satellites, which at a minimum regenerate the received digital signal. The processing satellite may decode and recode a digital bit stream via one or more transponders, which include receive and transmit antennas, amplifiers and a mixer with a local oscillator for converting an uplink signal into a downlink signal for retransmission.

Multiple access of a satellite is the ability of a number of earth stations to interconnect the stations respective communication links through a common satellite. Satellite access is categorized by assignment, whether preassigned or demand-assigned, and whether assignment is in the frequency domain, i.e., frequency division multiple access (FDMA), or the time domain, i.e., time-division multiple access (TDMA).

TDMA operates in the time domain and may only be used for digital network connectivity. Use of a satellite transponder is on a time-sharing basis. Individual time slots are assigned to earth stations in a sequential order. Each earth station has full and exclusive use of the transponder bandwidth during its time-assigned segment. With TDMA operation, earth stations use digital modulation and transmit with bursts of information for the time period of the slot assigned. Timing synchronization is crucial to effective communication. The greater the number of earth stations operating in a frame period, the more clock timing affects the system. One way to ensure all stations synchronize to a master clock is to place a sync burst as the first element of a frame.

One consideration in architecting satellite networks is fade margin, which is the additional signal level added to allow for fading. Fading is caused by anomalies in the intervening medium between stations or by the reflected signal, thus causing interference to the direct ray signal. There would be no fading phenomenon on a radio signal being transmitted through a vacuum well above the earth's surface. Thus satellite earth station signals are subject to fade only during the time the signals traverse the atmosphere. For this case, most fades may be attributed to rainfall or very low elevation angle refractive anomalies.

Three ways of handling digital communications by satellite include TDMA, FDMA, and over a VSAT network. VSATs are defined as having an antenna aperture (diameter) from about 1.6 ft (0.5 m) to 6.5 ft (2 m). A VSAT network consists of one comparatively large hub central earth station ("hub") and multiple remote VSAT user terminals, which communicate via a satellite. Some networks in the US have more than 2000 remote VSAT terminals, such as, e.g., but not limited to, a large drugstore chain. Many such VSAT networks exist.

The hub is designed to compensate for VSAT terminals being small sized, e.g., a hub antenna aperture may be 16-50 ft (5-11 m) in diameter. An example topology for a hub VSAT terminal network is a star network with the hub at the center. Inbound traffic refers to traffic from VSAT terminals to the hub, and outbound traffic refers to traffic from the hub to VSAT(s). The outbound link is commonly a time-division multiplex (TDM) serial bit stream. The inbound links may take on various bit rates.

Message access on the shared VSAT system may include fixed assigned (FDMA, CDMA, TDMA), contention (random accessed), or reservation (controlled access) based access. Conventional VSAT systems have existed for many years.

Exemplary Aspects

According to one aspect of the aspect, an exemplary system, method, and/or computer program product for detecting an intrusion or an attack into an example satellite communication network is described. This aspect may include various exemplary but nonlimiting embodiments. According to other exemplary embodiments, methods, systems, and computer program products for designing a secure satellite network are set forth for designing a satellite network including estimating geographic locations for hub and user terminal equipment and optimally secure satellites with associated selected footprint and satellite geometry to ensure the security of user terminal and hub station equipment, according to exemplary, but nonlimiting embodiments.

According to another aspect, an exemplary method may include, e.g., but not limited to, identifying an intrusion of a satellite communications (SATCOM) network, wherein the SATCOM network may include, e.g., but not limited to: a satellite, at least one hub, and a plurality (two or more of) of user terminals in radio frequency (RF) communication with the at least one hub via the satellite. The method may include, e.g., but not limited to: detecting, by at least one electronic computer processor, the intrusion of the SATCOM network. Detecting may include, e.g., but not limited to: monitoring and timestamping, by the at least one electronic computer processor, inputs and outputs of the SATCOM network; monitoring, by the at least one electronic computer processor, at least one radio frequency (RF) signal property metric of the plurality of user terminals; or monitoring, by the at least one electronic computer processor, at least one network level demodulated signal traffic metric of the plurality of user terminals; logging, by the at least one electronic computer processor, the monitored and timestamped inputs and outputs of the SATCOM network to produce at least one logged parameters history in a database; and analyzing, by the at least one electronic computer processor, currently monitored inputs and outputs of the SATCOM network to determine a relative security confidence score of an authenticity of each of said plurality of user terminals of the plurality of user terminals. Analyzing may include, e.g., but not limited to, at least one or more of: comparing, by the at least one electronic computer processor, the currently monitored inputs and outputs of the SATCOM network to the at least one logged parameters history for each of the user terminals of the plurality of user terminals to determine the relative security confidence score of the authenticity of each of the plurality of user terminals of the user network based upon at least one of: calculating, by the at least one electronic computer processor, a statistical threat probability of the relative security confidence score of the authenticity of each user terminal of the plurality of user terminals, based upon a mathematical statistical probability weighting of the at least one or more of: the at least one RF signal property metric being monitored; or the at least one network level demodulated signal traffic metric; comparing, by the at least one electronic computer processor, the calculated statistical threat probability of the relative security confidence score of the authenticity of each user terminal of the plurality of user terminals to a predetermined intrusion threat confidence threshold; determining, by the at least one electronic computer processor, if the calculated statistical threat probability of the relative security confidence score of the authenticity of each user terminal of the plurality of user terminals exceeds the predetermined intrusion threat confidence threshold; or generating, by the at least one electronic computer processor, at least one alert, alert, or notification of the intrusion, based on said determining, according to one exemplary embodiment.

According to even another aspect of the application, detecting intrusion may be employed in a system including at least one electronic computer processor being part of at least one or more of: the at least one hub; network management system (NMS) of the at least one hub; a database coupled to at least one of the at least one hub or the NMS; at least one network hardware appliance coupled to at least one of the at least one hub or the NMS; at least one software application server coupled via a data network to at least one of the at least one hub or the NMS; a hardware appliance monitoring RF communications of the SATCOM network; or a hardware appliance monitoring RF communications of the SATCOM network in communication with at least one of the at least one hub or the NMS), according to one exemplary embodiment.

According to yet another aspect, an exemplary method may include monitoring of the at least one RF signal property metric via at least one or more of: A. monitoring, by the at least one electronic computer processor, power properties of the plurality of user terminals; B. monitoring, by the at least one electronic computer processor, polarization properties of the plurality of user terminals; C. monitoring, by the at least one electronic computer processor, frequency properties of the plurality of user terminals; D. monitoring, by the at least one electronic computer processor, phase properties of the plurality of user terminals; E. monitoring, by the at least one electronic computer processor, timing properties of the plurality of user terminals; or F. monitoring, by the at least one electronic computer processor, modulation and coding (MODCOD) properties of the plurality of user terminals, according to one exemplary embodiment.

According to even another aspect of the application, the power properties of the plurality of user terminals may include, e.g., but not limited to, at least one or more of: 1. analyzing, by the at least one electronic computer processor, said power properties monitored of a given user terminal for comparison to said power properties monitored previously for the given user terminal; 2. analyzing, by the at least one electronic computer processor, said power properties of a given user terminal of said plurality of user terminals for any anomaly; 3. analyzing, by the at least one electronic computer processor, said power properties monitored during acquisition of a given user terminal for comparison to said power properties monitored previously for the given user terminal; or 4. analyzing, by the at least one electronic computer processor, said power properties monitored during an acquisition burst at an authentication time of a given user terminal of said plurality of user terminals for any anomaly, according to one exemplary embodiment.

According to even another aspect, the monitoring polarization properties of the plurality of user terminals may include, e.g., but not limited to, at least one or more of: 1. monitoring, by the at least one electronic computer processor, polarization properties for anomalous polarization properties falling outside of an expected range of historically monitored polarization properties, which may include, e.g., but not limited to, one or more of: i. monitoring, by the at least one electronic computer processor, a cross-polarization isolation between a vertical polarization component and a horizontal polarization component of each user terminal of the plurality of user terminals; ii. monitoring, by the at least one electronic computer processor, a circular polarization property of each user terminal of the plurality of user terminals; or iii. monitoring, by the at least one electronic computer processor, a linear polarization property of each user terminal of the plurality of user terminals; 2. calculating, by the at least one electronic computer processor, the expected range of differential between historically monitored polarization properties of each user terminal of the plurality of user terminals; 3. determining, by the at least one electronic computer processor, when a currently monitored polarization property falls outside the expected range of differential calculated between the historically monitored polarization properties of each user terminal of the plurality of user terminals; or 4. generating, by the at least one electronic computer processor, an alert when the currently monitored polarization property of a user terminal falls outside the expected range of differential, according to one exemplary embodiment.

According to yet a further aspect, the historically monitored polarization properties may include, e.g., but not limited to: a cross-polarization isolation differential between the vertical polarization component and the horizontal polarization component should vary between an anticipated observable satellite operator designated cross-pol isolation set up at antenna aiming, according to one exemplary embodiment.

According to yet even a further aspect, the satellite operator designated cross-pol isolation set up at an antenna aiming may include, e.g., but not limited to, at least one of more of: a given decibel level; a given range of decibel levels; about a 30 db level; about a 5 db to 40 db level range; and/or about 25 db-35 db level range), etc.

According to even a further aspect, an exemplary method may include monitoring of the at least one network level demodulated signal traffic metric which may include, e.g., but not limited to, at least one or more of: monitoring or analyzing baseband data; or monitoring or analyzing network traffic, according to one exemplary embodiment.

According to an exemplary embodiment, the method may also include, where the monitoring or said analyzing said network traffic, which may include, e.g., but not limited to, at least one or more of: monitoring or analyzing local area network traffic; monitoring or analyzing wide area network traffic; or monitoring or analyzing management traffic, according to one exemplary embodiment.

According to an exemplary embodiment, the method may include, where the monitoring or said analyzing said at least one of said baseband data or said network traffic, which may include, e.g., but not limited to, at least one of: monitoring or analyzing internal traffic; or monitoring or analyzing external traffic, according to one exemplary embodiment.

According to an exemplary embodiment, the method may include, where the monitoring or said analyzing said external traffic, which may include, e.g., but not limited to: monitoring or analyzing a destination of network traffic, according to one exemplary embodiment.

According to an exemplary embodiment, the method may include, where the monitoring or said analyzing said external traffic, which may include, e.g., but not limited to, at least one or more monitoring or analyzing an unusual destination; monitoring or analyzing a highly suspect destination; or monitoring or analyzing at least one enemy country domain, according to one exemplary embodiment.

According to an exemplary embodiment, the method may include, where the monitoring or said analyzing said internal traffic, which may include, e.g., but not limited to, at least one or more of: monitoring or analyzing internal traffic between user terminals; monitoring or analyzing internal traffic based type of network traffic; monitoring or analyzing internal traffic based on packet inspection; monitoring or analyzing internal traffic based on deep packet inspection; monitoring or analyzing internal traffic based on assembled internet protocol (IP) or network protocol stream; or monitoring or analyzing internal traffic based on analyzed assembled internet protocol (IP) or network protocol stream, according to one exemplary embodiment.

According to an exemplary embodiment, the method may include where the monitoring or said analyzing said baseband data, which may include, e.g., but not limited to at least one or more of: monitoring or analyzing modulation parameters; monitoring or analyzing coding (MODCOD) parameters; monitoring or analyzing signal to noise ratio/carrier to noise ratio (SNR/CNR) parameters; monitoring or analyzing frame type; or monitoring or analyzing padding, according to one exemplary embodiment.

According to an exemplary embodiment, the method may include logging said at least one of said baseband data or said network traffic; or logging user terminal activity or said baseband data or said network traffic, which may include, e.g., but not limited to, one or more of: anomalous user terminal activity or said baseband data or said network traffic; unexplained restart user terminal activity or said baseband data or said network traffic; unexplained crash user terminal activity or said baseband data or said network traffic; low memory user terminal activity or said baseband data or said network traffic; low performance user terminal activity or said baseband data or said network traffic; excessive resource utilization user terminal activity or said baseband data or said network traffic; other unusual user terminal activity or said baseband data or said network traffic; or performance lag user terminal activity or said baseband data or said network traffic; logging type of user terminal traffic or said baseband data or said network traffic over time to build a history of logged types of user terminal traffic or said baseband data or said network traffic, wherein said type of user terminal traffic or said baseband data or said network traffic comprises at least one or more of: HTTP type user terminal traffic or said baseband data or said network traffic; FTP type user terminal traffic or said baseband data or said network traffic; SMS type user terminal traffic or said baseband data or said network traffic; audio content type user terminal traffic or said baseband data or said network traffic; video content type user terminal traffic or said baseband data or said network traffic; VoIP call data type user terminal traffic or said baseband data or said network traffic; electronic mail type user terminal traffic or said baseband data or said network traffic; social networking traffic type user terminal traffic or said baseband data or said network traffic; text messaging type user terminal traffic or said baseband data or said network traffic; instant messaging type user terminal traffic or said baseband data or said network traffic; financial transaction type user terminal traffic or said baseband data or said network traffic; secure traffic type user terminal traffic or said baseband data or said network traffic; and/or other type user terminal traffic or said baseband data or said network traffic; logging suspect types of suspect user terminal traffic or suspect said baseband data or suspect said network traffic, which may include, e.g., but not limited to, at least one or more of: logging suspect administrative applications, which may include, e.g., but not limited to, one or more of: logging suspect SSH user terminal traffic or said baseband data or said network traffic; logging suspect FTP user terminal traffic or said baseband data or said network traffic; logging suspect SFTP user terminal traffic or said baseband data or said network traffic; logging suspect FTPS user terminal traffic or said baseband data or said network traffic; logging suspect SCP user terminal traffic or said baseband data or said network traffic; logging suspect TLS; logging suspect TFTP user terminal traffic or said baseband data or said network traffic; logging suspect FTP/SSL user terminal traffic or said baseband data or said network traffic; or logging suspect other user terminal traffic or said baseband data or said network traffic; or logging suspect unauthorized execution of administrative bash commands on a user terminal; logging at least one of a source or a destination of user terminal traffic or said baseband data or said network traffic; analyzing user terminal traffic or said baseband data or said network traffic for differences in user terminal traffic or said baseband data or said network traffic, which may include, e.g., but not limited to, one or more of: analyzing at least one type of user terminal traffic or said baseband data or said network traffic not in history of logged types of user terminal traffic or said baseband data or said network traffic; analyzing suspect user terminal traffic or suspect said baseband data or suspect said network traffic; or analyzing sources or destinations of user terminal traffic or said baseband data or said network traffic from suspect sources or suspect destinations; detecting changes in a current type of user terminal traffic or said baseband data or said network traffic compared to logged types of user terminal traffic or said baseband data or said network traffic; detecting changes in hardware resources, which may include, e.g., but not limited to, one or more of: detecting changes in memory availability; detecting changes in disk availability; detecting changes to memory; or detecting modifications to disk; or detecting sources from, or destinations to, of user terminal traffic or said baseband data or said network traffic from a suspect source or suspect destination, according to one exemplary embodiment.

According to an exemplary embodiment, the method may include analyzing the currently monitored inputs and outputs of the SATCOM network to determine the relative security confidence score of the authenticity which may include, e.g., but not limited to at least one or more of: estimating, by the at least one electronic computer processor, a location of a threat or an attack, which may include, e.g., but not limited to, at least one or more of: geographically locating the threat or the attack; geolocating the threat or the attack; geolocating an origin of the threat or the attack; estimating a geographic region of the threat or the attack; determining a geographic origin of the threat or attack; determining a geographic region of an origin of the threat or the attack; determining a geographic area of an origin of the threat or the attack; determining a geographic window of an origin of the threat or the attack; or determining a three-dimensional (3D) geographic region of an origin of the threat or the attack based upon an intersection of one or more of: a. timing information; b. position of the satellite; c. position of the hub; or d. position of the user terminal; predicting, by the at least one electronic computer processor, a threat or attack, which may include, e.g., but not limited to, at least one or more of: predicting where the threat or the attack would come from; predicting a geographic location of the threat or the attack; predicting a geolocation of the threat or the attack; predicting a geolocation of the threat or the attack; predicting a kind of the threat or the attack; predicting a geolocation of the threat or the attack by network geometry; predicting a geolocation of an origin of the threat or the attack by network geometry; predicting a geographic region of the threat or the attack; predicting a geographic origin of the threat or attack; predicting a geographic region of an origin of the threat or the attack; predicting a geographic area of an origin of the threat or the attack; predicting a geographic window of an origin of the threat or the attack; or predicting a three-dimensional (3D) geographic region of an origin of the threat or the attack based upon an intersection of one or more of: a. timing information; b. position of the satellite; c. position of the hub; or d. position of the user terminal; or characterizing, by the at least one electronic computer processor, a threat or attack, which may include, e.g., but not limited to, at least one or more of: characterizing where the threat or the attack would come from; characterizing a geographic location of the threat or the attack; characterizing a geolocation of the threat or the attack; characterizing a geolocation of the threat or the attack; characterizing a kind of the threat or the attack; characterizing a geolocation of the threat or the attack by network geometry; characterizing a geolocation of an origin of the threat or the attack by network geometry; characterizing a geographic region of the threat or the attack; characterizing a geographic origin of the threat or attack; characterizing a geographic region of an origin of the threat or the attack; characterizing a geographic area of an origin of the threat or the attack; characterizing a geographic window of an origin of the threat or the attack; or characterizing a three-dimensional (3D) geographic region of an origin of the threat or the attack based upon an intersection of one or more of: timing information; position of the satellite; position of the hub; or position of the user terminal, according to one exemplary embodiment.

According to an exemplary embodiment, the method may include confirming the intrusion has occurred by performing at least one of: a passive measure; or an active countermeasure, according to one exemplary embodiment.

According to an exemplary embodiment, the method may include ranking, by the at least one electronic computer processor, at least one of the plurality of user terminals based upon the relative security confidence score of the authenticity of each user terminal of the plurality of user terminals based upon the calculated statistical threat probability; grading, by the at least one electronic computer processor, at least one of the plurality of user terminals based upon the relative security confidence score of the authenticity of each user terminal of the plurality of user terminals based upon the calculated statistical threat probability; triggering, by the at least one electronic computer processor, at least one alert based on at least one of said ranking or said grading of the at least one of the plurality of user terminals based upon the relative security confidence score of the authenticity of each user terminal of the plurality of user terminals based upon the calculated statistical threat probability; locking down, by the at least one electronic computer processor, the user terminal based on at least one of said ranking or said grading of the at least one of the plurality of user terminals based upon the relative security confidence score of the authenticity of each user terminal of the plurality of user terminals based upon the calculated statistical threat probability; or triggering, by the at least one electronic computer processor, at least one event based on at least one of said ranking or said grading of the at least one of the plurality of user terminals based upon the relative security confidence score of the authenticity of each user terminal of the plurality of user terminals based upon the calculated statistical threat probability, according to one exemplary embodiment.

According to an exemplary embodiment, the method may include analyzing, by the at least one electronic computer processor, the monitored and timestamped inputs and outputs of the satellite network from the database to determine at least one logged pattern of life (POL) history for each of the user terminals of the plurality of user terminals; and adjusting the relative security confidence score of the authenticity of at least one of the user terminals based on comparison with the determined of the at least one logged POL history, according to one exemplary embodiment.

According to an exemplary embodiment, the method may include, where the SATCOM network, which may include, e.g., but not limited to at least one or more of: a geosynchronous (GEO) satellite SATCOM network; a non-geosynchronous SATCOM network; a low earth orbit satellite SATCOM network; a low earth orbit satellite constellation; VSAT SATCOM network; a point to point network; a point to multi-point network; a star topology network; a mesh topology network; a hybrid topology network; a network using intersatellite communications; a network using intersatellite RF communications; a network using intersatellite optical communications; or a network using microwave communications, according to one exemplary embodiment.

According to an exemplary embodiment, the method may be employed in a SATCOM network, wherein said generating step may include one or more of: silencing, by the at least one electronic computer processor, the at least one alert or notification; silencing, by the at least one electronic computer processor, the at least one alert or notification for a period of time; receiving, by the at least one electronic computer processor, the predetermined intrusion threat confidence threshold; receiving, by the at least one electronic computer processor, an adjustment to the predetermined intrusion threat confidence threshold; locking down, by the at least one electronic computer processor, at least one user terminal; receiving, by the at least one electronic computer processor, at least one event trigger; receiving, by the at least one electronic computer processor, at least one manually adjustable detection parameter; receiving, by the at least one electronic computer processor, at least one custom adjustable detection parameter associated with at least one user terminal of said plurality of user terminals; or maintaining, by the at least one electronic computer processor, a history of at least one adjustment of the at least one custom adjustable detection parameter associated with at least one user terminal of said plurality of user terminals, according to one exemplary embodiment.

According to even an exemplary embodiment, the method may further include one or more of: monitoring RF properties of an RF communications environment by at least one hardware appliance; analyzing RF properties of an RF communications environment by at least one spectrum analyzer; analyzing RF properties of an RF communications environment by at least one custom analysis tool; capturing RF properties of an RF communications environment in digital form; storing RF properties of an RF communications environment in at least one database; and/or processing RF properties of an RF communications environment via logic analytics of a software agent program, according to one exemplary embodiment.

According to an exemplary embodiment, the method may further include: logging data over time; analyzing current data for changes comparing to logged data based on logic analytics; and generating an alarm or alert based on at least one event trigger relating to said analyzing of the logic analytics, according to one exemplary embodiment.

According to an exemplary embodiment, the method may include at least one event trigger, which may include, e.g., but not limited to at least one or more of: at least one external event; at least one user terminal connection or reconnection; at least one change in at least one polarization property; at least one change in modulation; at least one change in timing; at least one detection of jamming; at least one change in modulation or coding; at least one unexpected variance in network timing; at least one unexpected variance in signal timing; at least one unexpected change in parameters monitored by the hub; at least one unexpected change in parameters monitored by the NMS; at least one change in bandwidth utilization; at least one detection of at least one network anomaly; at least one detection of at least one user terminal reset; and/or at least one detection of at least one user terminal disconnection, according to one exemplary embodiment.

According to an exemplary embodiment, the at least one event trigger may include detection of at least one of said jamming, said anomaly, said at least one user terminal reset, or said at least one detection of said at least one user terminal disconnection, which may further include, e.g., but not limited to at least one or more of: passively monitoring a user terminal suspected of being an impersonating user terminal; passively capturing traffic activity of a user terminal suspected of being an impersonating user terminal; or actively interrogating a user terminal suspected of being an impersonating user terminal, which may include, e.g., but not limited to, at least one or more of: requesting configuration information from the user terminal suspected of being an impersonating user terminal and comparing it to expected configuration information; making a configuration change to the user terminal suspected of being an impersonating user terminal; or taking other retroactive measures against the user terminal suspected of being an impersonating user terminal, according to one exemplary embodiment.

According to an exemplary embodiment, the method may include generating, which may include, e.g., but not limited to: generating said alarm or alert based on a confidence level, according to one exemplary embodiment.

According to an exemplary embodiment, the method may include detecting a hybrid attack of a plurality of attack types, which may include, e.g., but not limited to, at least one or more of: detecting an IP network attack; or detecting an RF network attack, according to one exemplary embodiment.

According to an exemplary embodiment, the method may include identifying an intrusion of a SATCOM network, wherein the SATCOM network, which may include, e.g., but not limited to: a satellite, at least one hub, and a plurality of user terminals in RF communication with the at least one hub via the satellite, the system, which may include, e.g., but not limited to: at least one electronic computer processor; at least one memory device coupled to said electronic computer processor; at least one network interface coupled to said electronic computer processor, and coupled to at least one data network, said at least one data network coupled to said at least one hub; and wherein said at least one electronic computer processor is configured to: detect the intrusion of the SATCOM network, which may include, e.g., but not limited to, wherein said at least one electronic computer processor is configured to: monitor and timestamp inputs and outputs of the SATCOM network, which may include, e.g., but not limited to, wherein said at least one electronic computer processor is configured to at least one or more of: monitor at least one radio frequency (RF) signal property metric of the plurality of user terminals; or monitor at least one network level demodulated signal traffic metric of the plurality of user terminals; log the monitored and timestamped inputs and outputs of the SATCOM network to produce at least one logged parameters history in a database; and analyze currently monitored inputs and outputs of the SATCOM network to determine a relative security confidence score of an authenticity of each of said plurality of user terminals of the plurality of user terminals, which may include, e.g., but not limited to, wherein said at least one electronic computer processor is configured to at least one or more of: compare the currently monitored inputs and outputs of the SATCOM network to the at least one logged parameters history for each of the user terminals of the plurality of user terminals to determine the relative security confidence score of the authenticity of each of the plurality of user terminals of the user network based upon wherein said at least one electronic computer processor is configured to at least one of: calculate a statistical threat probability of the relative security confidence score of the authenticity of each user terminal of the plurality of user terminals, based upon a mathematical statistical probability weighting of the at least one or more of: the at least one RF signal property metric being monitored; or the at least one network level demodulated signal traffic metric; compare the calculated statistical threat probability of the relative security confidence score of the authenticity of each user terminal of the plurality of user terminals to a predetermined intrusion threat confidence threshold; determine if the calculated statistical threat probability of the relative security confidence score of the authenticity of each user terminal of the plurality of user terminals exceeds the predetermined intrusion threat confidence threshold; or generate at least one alert, alert, or notification of the intrusion, based on said determining of said (iii), according to one exemplary embodiment.

According to even a further aspect of the application, an exemplary computer program product may include a computer program product embodied on a nonvolatile computer accessible storage media embodying instructions which when executed on at least one electronic computer processor perform a method of identifying an intrusion of a SATCOM network, wherein the SATCOM network comprises: a satellite, at least one hub, and a plurality of user terminals in radio frequency (RF) communication with the at least one hub via the satellite, the method of the computer program product, which may include, e.g., but not limited to: detecting, by at least one electronic computer processor, the intrusion of the SATCOM network, which may include, e.g., but not limited to: monitoring and timestamping, by the at least one electronic computer processor, inputs and outputs of the SATCOM network, which may include, e.g., but not limited to, at least one or more of: monitoring, by the at least one electronic computer processor, at least one RF signal property metric of the plurality of user terminals; or monitoring, by the at least one electronic computer processor, at least one network level demodulated signal traffic metric of the plurality of user terminals; logging, by the at least one electronic computer processor, the monitored and timestamped inputs and outputs of the SATCOM network to produce at least one logged parameters history in a database; and analyzing, by the at least one electronic computer processor, currently monitored inputs and outputs of the SATCOM network to determine a relative security confidence score of an authenticity of each of said plurality of user terminals of the plurality of user terminals, which may include, e.g., but not limited to, at least one or more of: comparing, by the at least one electronic computer processor, the currently monitored inputs and outputs of the SATCOM network to the at least one logged parameters history for each of the user terminals of the plurality of user terminals to determine the relative security confidence score of the authenticity of each of the plurality of user terminals of the user network based upon at least one of: calculating, by the at least one electronic computer processor, a statistical threat probability of the relative security confidence score of the authenticity of each user terminal of the plurality of user terminals, based upon a mathematical statistical probability weighting of the at least one or more of: the at least one RF signal property metric being monitored; or the at least one network level demodulated signal traffic metric; comparing, by the at least one electronic computer processor, the calculated statistical threat probability of the relative security confidence score of the authenticity of each user terminal of the plurality of user terminals to a predetermined intrusion threat confidence threshold; determining, by the at least one electronic computer processor, if the calculated statistical threat probability of the relative security confidence score of the authenticity of each user terminal of the plurality of user terminals exceeds the predetermined intrusion threat confidence threshold; or generating, by the at least one electronic computer processor, at least one alert, alert, or notification of the intrusion, based on said determining of said (iii).

According to an exemplary embodiment, the method may include designing a secure satellite network may include, e.g., but not limited to: receiving a request for a satellite network design; and recommending in response to said request a selection of said satellite network design, which may include, e.g., but not limited to, at least one or more of: recommending at least one satellite; recommending a geographic location for at least one hub; and recommending a geographic location for at least one user terminal.

According to an exemplary embodiment, the method may include where the response to the request of the selection is dependent upon at least one or more of: timing information; footprint of the least one satellite; location of the at least one satellite; geographic location of the at least one hub; or geographic location of the at least one user terminal, according to one exemplary embodiment.

According to an exemplary embodiment, the method may include where the response to the request of the selection may include at least one or more of: selecting timing information; footprint of the least one satellite; location of the at least one satellite; geographic location of the at least one hub; or geographic location of the at least one user terminal, according to one exemplary embodiment.

According to another exemplary embodiment, the method may include where the response to the request of the selection is selected to be a secure location in a three-dimensional (3D) region, which may include, e.g., but not limited to: an intersection of timing information; a location and footprint of the satellite, wherein said footprint is selected to cover a secure location; a geographic location of the at least one hub, wherein said geographic location of the at least one hub is selected to be in a secure hub location; or a geographic location of the at least one user terminal, wherein said geographic location of the at least one user terminal is selected to be in a secure user terminal location, according to one exemplary embodiment.

According to another exemplary embodiment, the method may include where the secure hub location and said secure user terminal location fall within said footprint and no insecure geographic locations fall within said footprint, according to one exemplary embodiment.

According to another exemplary embodiment, the method may include where the response to the request of said selection is selected to be a secure location in a three-dimensional (3D) region selected based on comprises at least one or more of: estimating, by the at least one electronic computer processor, an expected location of a threat or an attack, which may include, e.g., but not limited to, at least one or more of: geographically locating the expected location of the threat or the attack; geolocating the expected location of the threat or the attack; geolocating the location of an origin of the expected location of threat or the attack; estimating a geographic region of the expected location of the threat or the attack; determining a geographic origin of the expected location of the threat or attack; determining a geographic region of an origin of the expected location of the threat or the attack; determining a geographic area of an origin of the expected location of the threat or the attack; determining a geographic window of an origin of the expected location of the threat or the attack; or determining a three-dimensional (3D) geographic region of an origin of the expected location of the threat or the attack based upon an intersection of one or more of: a. timing information; b. position of the satellite; c. position of the hub; or d. position of the user terminal; predicting, by the at least one electronic computer processor, the expected location of a threat or attack, which may include, e.g., but not limited to, at least one or more of: predicting where the expected location of the threat or the attack would come from; predicting a geographic location of the expected location of the threat or the attack; predicting a geolocation of the expected location of the threat or the attack; predicting a geolocation of the expected location of the threat or the attack; predicting a kind of the expected location of the threat or the attack; predicting a geolocation of the expected location of the threat or the attack by network geometry; predicting a geolocation of an origin of the expected location of the threat or the attack by network geometry; predicting a geographic region of the expected location of the expected location of the threat or the attack; predicting a geographic origin of the expected location of the threat or attack; predicting a geographic region of an origin of the expected location of the threat or the attack; predicting a geographic area of an origin of the expected location of the threat or the attack; predicting a geographic window of an origin of the expected location of the threat or the attack; or predicting a three-dimensional (3D) geographic region of an origin of the expected location of the threat or the attack based upon an intersection of one or more of: a. timing information; b. position of the satellite; c. position of the hub; or d. position of the user terminal; or characterizing, by the at least one electronic computer processor, the expected location of a threat or attack, which may include, e.g., but not limited to, at least one or more of: characterizing where the expected location of the threat or the attack would come from; characterizing a geographic location of the expected location of the threat or the attack; characterizing a geolocation of the expected location of the threat or the attack; characterizing a geolocation of the expected location of the threat or the attack; characterizing a kind of the expected location of the threat or the attack; characterizing a geolocation of the expected location of the threat or the attack by network geometry; characterizing a geolocation of an origin of the expected location of the threat or the attack by network geometry; characterizing a geographic region of the expected location of the threat or the attack; characterizing a geographic origin of the expected location of the threat or attack; characterizing a geographic region of an origin of the expected location of the threat or the attack; characterizing a geographic area of an origin of the expected location of the threat or the attack; characterizing a geographic window of an origin of the expected location of the threat or the attack; or characterizing a three-dimensional (3D) geographic region of an origin of the expected location of the threat or the attack based upon an intersection of one or more of: timing information; position of the satellite; position of the hub; or position of the user terminal, according to one exemplary embodiment.

Various exemplary embodiments of a computer-implemented method, system and computer program product of enabling remote collaborative communication and facilitation of therapeutic treatments, and for capturing and displaying health information of at least a first person on an electronic computing device, the electronic computing device may include: at least one computer processor; and at least one memory, according to an exemplary embodiment.

A system, method, and apparatus for detecting an RF-based intrusion of a VSAT network are described. In the following description, for the purposes of explanation, numerous specific details are set forth in order to provide a thorough understanding of exemplary embodiments of the disclosure. It is apparent, however, to one skilled in the relevant art that the embodiments of the disclosure may be practiced without these specific details or with alternative embodiments, yet equivalent arrangement. In other instances, well-known structures and devices are shown in block diagram form in order to avoid unnecessarily obscuring of the example embodiments of the disclosure.

Satellite Communications System

According to an aspect of the application, an exemplary VSAT communication system is described. The system may exemplarily be utilized for intrusion detection, monitoring, alert generation, threat estimation, prediction and characterization. The aspect may also include complementary methods and computer program products.

Satellite communications systems may be configured in a variety of ways. One method for conducting satellite communications is sometimes referred to as the "bent-pipe" method, in which a signal is sent from a fixed point on Earth, received by the satellite and amplified, then sent back down to a predetermined receiver. Decisions about routing and switching of communications traffic, essential to communications systems in general, are made on the ground, as is the execution of those decisions. Because satellites used in the bent-pipe method lack on-board communications traffic processing, the method is typically limited to use within a single satellite communications beam.

Another method of satellite communication is a "hub" configuration. In the hub configuration, a series of terrestrial terminals and a single hub are located within a single beam. The hub acts as a two-step bent-pipe configuration, in which the uplink signal is routed from the satellite, which may be a geosynchronous (GEO) satellite, to an intermediate ground hub. The hub acts as a local control center to assign communication channels and other functions associated with network management and protocol processing.

An earth station including an uplink and a downlink may be used to transmit information between transceivers. A satellite in geosynchronous orbit, orbits the earth at the equator, known as the Clarke belt, at about 22,236 miles above the ground, orbiting in synchrony with the earth's rotation. Since the satellite moves in synchrony with the earth's rotation, the satellite appears stationary to earth stations, the communication can be more predictable and reliable, and may allow a station to have a fixed antenna, which may be less expensive. There are over three hundred communications satellites in the geostationary/geosynchronous orbit. Geosynchronous satellites may vary a bit in actual location, but remain located in about a 40-mile wide "station keeping" box. From time to time a satellite provider may correct the satellite's drift to ensure correct positioning within station keeping.

A satellite may include one or more transponders, which receive an uplink signal, coordinate a conversion to a different downlink frequency and transmit the signal back to earth. More specifically, a transponder may include a receive antenna that receives the uplink radio transmission from the earth, passes the signal through a bandpass filter to allow only a desired signal to pass while rejecting all others, amplifies that signal, mixes the amplified filtered signal with a local oscillator (a known stabilized frequency source) to convert to a downlink frequency, then amplifies with a high power amplifier and retransmits the signal via a transmit antenna as the downlink signal to receiving earth stations. As communication is transmitted from the satellite toward the earth, an example 17-degree beam may be used, forming a pattern of reception known as the satellite's footprint. For example, if a satellite spans a footprint approximately one third the width of the earth, then three equidistant satellites could be used to span the entire width of the earth. Modern satellites may contain many transponders, an example might have 38, allowing focused footprints referred to as spot beams.

A SATCOM system, when using a satellite in GEO orbit, typically provides services in a relay mode and a broadcast mode. In relay mode, the GEO satellite relays a signal from one terrestrial terminal to another. When in broadcast mode, the GEO satellite transmits a signal to a large number of terrestrial terminals. In the relay mode, which corresponds to the bent-pipe discussed above, a terrestrial terminal transmits a signal using an uplink frequency to the GEO satellite, which retransmits the signal to a second terrestrial terminal using a downlink frequency. When the transmission footprint of the GEO satellite on the earth's surface is large, the power density of the signal is correspondingly low. A signal having low power density demands that the receiving antenna be sufficiently large to achieve the requisite antenna gain to put the low-density signal to use. Alternatively, use of smaller antennas requires the satellite to generate sufficient radiated power to supply a power density within the single wide area coverage beam sufficient for signal reception and usage by the smaller antennas.

Communications satellite system architectures for smaller antennas may involve a number of smaller spot beams, instead of a single wide area coverage beam, to cover the same geographical area. By decreasing the size of the spot beams while maintaining the same overall transmitted power, the power density within each spot beam enables the use of smaller terrestrial antennas.

Existing satellite communications systems often use Ku-band uplink and downlink frequencies that are highly populated and re-used. Further, in SATCOM systems, satellites are closely spaced. Close spacing increases likelihood of interference between respective communications links and the need to reuse frequencies. Closely spaced satellites using the Ku-band require terrestrial terminals to use a narrow beam, which in turn requires larger antennas and more accurate pointing systems. As a result, terrestrial terminals become larger and more expensive, while providing a lower throughput than may be desirable.

Some satellite communication systems may use a steerable spot beam, a satellite signal specially concentrated in power to cover only a regional geographical area and direction which may be controlled. Because these beams have a smaller, more regional footprint than do wide area beams, they are not easily adapted to terrestrial or maritime terminals that may move.

VSAT

According to yet another aspect of the application, a VSAT terminal system are described. VSATs may include one or more central station (hub) earth stations, and one or more VSAT terminal earth stations, which are generally remote from the hub, and may be fixed, or in some cases mobile. The hub, also sometimes referred to as a teleport, may include a satellite antenna, and modulating and demodulating (MODEM) equipment, and computing systems, which may include, e.g., but not limited to, a network management system (NMS), and a protocol converter. The hub can control the VSAT terminals, including providing instructions to the plurality of VSAT terminals, regarding transmission parameters, and the like. For example, VSAT terminals may be assigned a communications bandwidth subset, e.g., time slots of a frame in which to transmit data to, and to receive data from, the satellite using a multiplexing method such as, e.g., but not limited to, time division multiple access (TDMA), etc.

A signal may vary in three dimensions, namely frequency, phase, and amplitude. Amplitude is the height of a wave. Frequency refers to how frequently a wave repeats itself per a time period, e.g., per second (Hz). Phase refers to whether two signals are perfectly aligned in phase (linear) or out of phase by, e.g., exactly 90 degrees out of phase (orthogonal).

If frequency is fixed, then a waveform may be varied by the other two dimensions, i.e., phase or amplitude.

If phase is maintained identically, then a horizontal (H), and vertical (V) component of the signal can be said to be in phase, this is known as Linear Polarization. Relative amplitude (the remaining dimension) may determine if the waveform is horizontally or vertically polarized.

If H and V components are the same amplitude, but vary in phase by exactly 90 degrees, this is circular polarization.

The remote VSAT user terminal generally includes a linear feed assembly including a dish-shaped parabolic antenna, a feed horn at a focal point of the antenna, aimed toward the dish, and the feed horn is coupled via an orthogonal mode or ortho-mode transducer (OMT) to the transmitter and receiver. The receiver (Rx) is referred to as the low noise block (LNB) down converter, and the transmitter (Tx) is referred to as the block up converter (BUC) for transmitting the uplink traffic to the satellite. The OMT allows for simultaneous Tx/Rx of uplink and downlink signals of opposite polarization, using the same or a common antenna feed assembly, referred to as cross-polarization. Thus, by having the Tx and Rx perfectly orthogonal, the respective antenna can be in close proximity, but not in interference, when the antenna has been properly aimed. The polarization setting (direction or degree value) is related to how the two signals vary in amplitude in relation to one another. Antenna pointing is important to ensure cross-polarization isolation between polarized horizontal and vertical components of small VSAT terminals. Many satellite operators require cross-polarization isolation of 30 dB.

Antenna aiming involves pointing the antenna, such that the desired cross-polarization isolation required by the operator, may be obtained. Various antenna aiming systems measure cross-polarization isolation. A method of determining cross-polarization isolation of a modulated carrier is set forth in U.S. Pat. No. 8,576,962, the contents of which is incorporated herein by reference in its entirety.

Downstream as discussed herein refers to communication emanating from the hub to VSAT terminals. Upstream as discussed refers to communication from VSAT terminals to the hub.

Satellite frequencies are categorized in bands, which are divided into RF spectrum by capacity and reception variation. The capacities are uplink and downlink, and for full duplex (bidirectional) communication a pair of frequencies may be used, the uplink for transmission, and downlink for reception. See Table 1 below regarding exemplary satellite communication frequency bands. Linear polarization (comprised of a horizontal and vertical component exactly in-phase) is more common when using Ku-band radio frequency transceivers (RFTs). C-band systems use Circular Polarization (two orthogonal components exactly 90 degrees out of phase), almost exclusively. With circular polarization, both frequency and amplitude are equal, so only the phase relationship of the signal components determines the polarization type. Circular polarization does not require tuning or nulling out the opposite polarization component and operates in more of a helical-type arrangement. Looking at transmission from the remote VSAT toward the antenna fee horn in the direction of transmitting towards the satellite, right-hand circular polarized signals would rotate clockwise, and left-hand circular polarized signals would rotate counter clockwise. Circular polarization can also reduce rain fade in 12 GHz transmissions.

TABLE 1

| Band | Uplink Frequency | Downlink Frequency |
| --- | --- | --- |
| C | 5.925-6.425 GHz | 3.700-4.200 GHz |
| Ku | 14.0-14.5 GHz (extended uplink 13750-14750 MHz) | 11.7-12.2 GHz (extended downlink 10950-12750 MHz) |
| Ka | 27.5-31.0 GHz | 17.7-21.2 GHz |
| X or super high frequency (SHF) | 7.9-8.4 GHz | 7.25-7.75 GHZ |
| L | 1-2 GHz (Intermediate Frequency, e.g., 950-2150 MHz) | |

Satellite footprint maps show in lines of force estimated minimal satellite dish diameters required by geographic area location, and may show signal strength in decibel watts (dBW) with respect to the effective isotropic radiated power (EIRP) received from the satellite. The higher the number, the greater the signal strength. EIRP is the calculation of power measured one meter away from the antenna of the source of transmission, i.e., the satellite.

Digital signals are modulated into analog RF symbols. An information signal is digital data, a stream of 1s and 0s representing a bitstream. That stream may then be modulated using one of the following methods:

1) amplitude shift keying (ASK)—using one amplitude at a fixed frequency to convey a logic high, and zero amplitude to convey logical low.

2) frequency shift keying (FSK)—one frequency is used to convey logic high, another for logic low.

3) phase shift keying (PSK)—relying on transmitter and receiver being perfectly synchronized at all times, so reference used is same as that used for modulation.

4) differential phase shift keying (DPSK)—a more common modulation scheme using phase of preceding signal element period of reference.

Satellite communications may exhibit various advantages including distance insensitivity (distance between endpoints is not a pricing consideration), single hop transmission (with only one repeater—at the satellite transponder, this eliminates some errors), practical for maritime and remote areas, relatively low bit error rate for data transmission, large amounts of bandwidth.

Some disadvantages of satellite networks may include one-way propagation delay (a one-way trip from a VSAT terminal to a hub may involve 120 ms up uplink delay from the VSAT to the satellite, and 120 ms of downlink delay from the satellite to the hub, or for a roundtrip of communication back from the hub to the VSAT, after another 120 ms uplink delay, and 120 ms downlink delay, arrives at approximately 500 ms total for the roundtrip), multi-hops can increase delay, high path loss can be experienced (so more power may be required to overcome signal-to-noise ratios), rain absorption, other atmospheric weather, temperature effects, and solar flare activity, can affect path loss, and finally congestion buildup from increasing numbers of satellites in orbit can occasionally cause interference, as well.

Satellites currently perform valuable functions for many applications. Such applications include, for example, communications, earth resource management, and navigation. For these and other applications, there is a need to accurately fix the precise location, orbital velocity, acceleration and orientation (known in the art as the ephemeris) of the satellite. Several methods are known and used in the art for fixing the ephemeris of a satellite. One method involves use of ground based radar. Another method is described in U.S. Pat. No. 5,717,404, the contents of which is incorporated herein by reference in its entirety.

The effects of atmospheric conditions, including fade, on RF transmission will influence the total overall performance of the system. The severity and the duration of these conditions will affect the distance and performance. All electromagnetic radiation used in any communications system is affected differently, be it low/high frequency radio, microwave radio, or laser transmission. The wavelength of each transmission determines the effects on the actual transmission.

RF communications may be affected by various external factors while traversing the atmosphere between earth stations and a satellite, various exemplary, but nonlimiting examples of atmospheric effects include on rain fade, other weather, cosmic rays, solar flares, etc.

VSAT Network

According to even a further aspect of the application, FIG. 1 exemplarily depicts an environment 100 of a very small aperture terminal (VSAT) satellite communication network coupling various exemplary remote VSAT user terminals 102 to an exemplary central station hub 106 via exemplary uplink and downlink communications via an exemplary geosynchronous satellite 104, according to an exemplary embodiment of the present aspect.

FIG. 1 depicts an exemplary environment diagram 100 illustrating example subscribers to an example VSAT network 100, using a fixed pointing very small aperture terminal (VSAT) remote or user VSAT terminal handheld terminal 102a, networked terminal including antenna 102b, 102c (collectively referred to as 102 herein) to communicate via communication satellite 104, using communications controlled by a central earth station hub referred to herein as a hub 106, according to an exemplary embodiment. VSAT terminal 102*a* illustrates a satellite mobile device, according to an exemplary embodiment. Remote VSAT user terminal 102*b* includes an exemplary fixed dish antenna coupled via a modem and/or router 126 to an exemplary local area network switch, ethernet switch, or the like, to example computing devices 128*b*1 and/or 128*b*2, according to an exemplary embodiment. VSAT user terminal 102*c* includes a computing device 128*c* coupled to an antenna 102*c*, which could be, e.g., but not limited to, a point-of-sale (POS) terminal and/or other communication enabled computing device, according to an exemplary embodiment.

The satellite 104 as illustrated may include various exemplary components including, e.g., but not limited to, an exemplary beacon transmitter 108, an exemplary signal transponder 110, and an exemplary one or more satellite signal antennas.

The example remote very small aperture terminal (VSAT) user terminal 102 as illustrated may include a two-way satellite ground station or a stabilized maritime VSAT antenna with a dish antenna that is smaller than about 3 meters (e.g., ~1.2 m in diameter), according to an exemplary embodiment. The parabolic shape of the dish has special reflective properties that enable the dish antenna to concentrate and focus signals to a single point, i.e., the focal point. The dish, after reflecting and concentrating the signals, receives from, and transmits signals to one or more satellites for communication from a VSAT terminal to the hub and/or to other VSAT terminals via the hub with communication transmitted via the satellite 104, according to an exemplary embodiment. VSAT user terminals 102 have originally most commonly been used to transmit narrowband data (e.g., point-of-sale transactions such as, e.g., but not limited to, credit card, polling and/or radio frequency identifier (RFID) data; or supervisory control and data acquisition (SCADA)), and/or broadband data (for the provision of Satellite Internet access to remote locations, voice over internet protocol (VoIP) or video, or other streaming data, etc.), according to an exemplary embodiment. VSATs may also be used for transportable, on-the-move (utilizing phased array antennas) or mobile maritime communications, according to an exemplary embodiment.

According to an embodiment as depicted in FIG. 1, a hub 106 may include a central earth station of an exemplary VSAT network. The hub may include a network management system (NMS) coupled by ethernet interfaces to an upstream network via an upstream router. The hub may also include a tunnel network, hardware chassis and one or more line cards which communicate to an antenna. The hub 104 may further include a PP coupled via ethernet interfaces to the upstream network and tunnel network. An exemplary customer router may route packets from customer network data network devices to the upstream network. NMS clients may also be coupled to the upstream network.

The network management system (NMS) 114 may include NMS hardware, interfaces and internal hardware specifications. These components may be used together as part of an exemplary hub central earth station of an exemplary VSAT network.

According to an embodiment, the NMS 114 may include NMS software architecture and exemplary application programs and interfaces of an exemplary NMS configuration as may be used as part of an exemplary hub central earth station of an exemplary VSAT network. The NMS 114 may be configured to access a config database and statistics database according to an exemplary embodiment.

According to another embodiment, FIG. 1 depicts a protocol processor system (PP) 116 including PP hardware architecture, exemplary interfaces and exemplary internal hardware specifications. These components may be used as part of an exemplary hub central earth station of an exemplary VSAT network illustrating exemplary hub components.

According to yet another embodiment, FIG. 1 the PP 116 may include PP software architecture, exemplary application programs and interfaces of an exemplary PP configuration. These component may be used as part of an exemplary hub central earth station of an exemplary VSAT network illustrating exemplary hub components.

According to another embodiment as depicted in FIG. 1, a VSAT star topology network may include the central hub 106 and one or more user terminals 102 coupled via satellite communication links. In an example, an exemplary roundtrip communication latency may be about 500 ms.

The VSAT remote user terminals 102 may be used to communicate data, voice and video, to or from a remote site to a central earth station or hub ("hub") 106 via satellite network transmission. The hub 106 has hub terminal equipment that may include, e.g., but not limited to, an exemplary outdoor transceiver and antenna 106, an exemplary integrated modem and multiplexing system (not shown), an exemplary single-cable intra-facility link, and a variety of network interfaces that can simultaneously deliver traffic to, e.g., a backbone in time division multiplexing (TDM), asynchronous transfer mode (ATM), and/or internet protocol (IP format), according to an exemplary embodiment. Sectors may be provisioned for 1:N (e.g., N=4) active redundancy, according to an exemplary embodiment. Example hub components may include, as shown in FIG. 1, may include an exemplary network management system (NMS) 114 (the NMS 114 may handle configuration, timing, power, throughput, etc.) and an exemplary protocol processor (PP) 116 (the PP 116 may handle traffic, such as, e.g., but not limited to, packet unpacking, routing, etc.) Details of an example hub 106 earth station are described in U.S. Pat. No. 6,212,360, the contents of which is incorporated herein by reference in its entirety. The NMS 114 and/or PP 116 may be coupled to communication networks 120, which may include router based communication to the global Internet and may be coupled via communication networking equipment (not shown) to an exemplary hardware and/or software application service provider systems 118, running various exemplary application programs including the exemplary intrusion detection, threat estimation, prediction heuristics, analysis, learning, alerting and/or characterization application programs and/or methods, systems, and/or computer program products, according to an exemplary embodiment.

The data flow from the hub to the VSATs 102 (out-route) can be received by all the members in the network; the signals sent by the individual VSATs 102 (in-route) are usually of a lower speed and may only be correctly received by the hub 106 due to the limited size of the VSAT stations. Communication between VSAT station terminals 102 usually takes place via the hub 106, referred to as a double hop, which causes an additional up to half-second delay in the signal transmission time due to the great distance to satellites 104.

An advantage of VSAT networks may include implementations where messages destined for a plurality of remote VSAT user terminals 102 need only be sent once and be received by all destinations simultaneously. By installing communication equipment in the immediate proximity of the user, complex routing over several switching stations can be avoided.

Due to signal attenuation caused by atmospheric effects, typical for radio frequencies higher than 10 GHz, a certain power margin must be provided when operating such systems, so communications do not immediately break down when attenuation occurs. In order to guarantee high availability over the year, the power margin must be approximately 2-3 dB for currently common "Ku band" transmission frequencies of 12-14 GHz. The margin is permanently built in through dimensioning of the satellite network and therefore may not be used for other transmission purposes in systems during the greater part of the year, when atmospheric path attenuation is much lower than the margin provided.

According to another embodiment in reference to FIG. 1, satellite 104 may include a receiver (Rx) uplink antenna coupled to a RX band pass filter to filter out noise, and a low noise amplifier (LNA) to amplify the signal. These are mixed using a mixer and via the local oscillator signal to modify the signal for transmission. The signal is run through another transmission (Tx) band pass filter to remove noise, and then through a high power amplifier (HPA) to output switching and isolation for transmission over the transmission (TX) antenna as the downlink.

A VSAT may operate in frequency bands such as C band (4-6 GHz), Ku band (11-14 GHz), and Ka band (26.5-40 GHz). C band may be ideal for heavy rain locations. Ku band is most popular with dish sizes in the range 60 cm-1.8 m in diameter. The Ka band satellite broadband services are rapidly expending. Ku band is primarily used for satellite communications. Ku band satellites are also used for backhauls and particularly for satellite from remote locations back to a television network studio for editing and broadcasting. The band can be split into multiple segments that vary by geographical region by the International Telecommunication Union (ITU). Ku band systems require smaller dishes than C band because of their shorter wavelengths, (higher frequencies), which when combined with higher satellite transponder power translates into smaller, cheaper antennas on the ground and therefore lower start up and transport costs. As power increases, the dish antenna's size can decrease. The smaller Ku Band dishes can be easily installed on almost any surface—the ground, a roof, or bolted to the side of a building. This is an important consideration for areas with limited space. Compared with C-band, Ku band is not similarly restricted in power to avoid interference with terrestrial microwave systems, and the power of its uplinks and downlinks can be increased. A satellite operator's earth station antenna can require more accurate position control when operating at Ku band than compared to when operating at C band. New VSAT systems use Ka band technology that promises higher bandwidth rates for lower costs. Ka band dishes are smaller than Ku band dishes because of the even shorter wavelengths (higher Ka band frequencies) and higher satellite power. The higher frequencies of Ka band are significantly more vulnerable to signal quality problems caused by rainfall. Therefore, Ka band VSATs are usually unsuitable for mission critical or high availability systems in the tropical and sub-tropical regions without provision of measures to combat adverse weather conditions.

According to an embodiment, FIG. 1 depicts an exemplary transponder at user terminal 102. The transponder may include a transmission IFL, transmitter BUC, orthogonal or ortho-mode transducer (OMT) to feedhorn, and from OMT. The transponder may also include a transmitter reject filter to Horizontal plane (H-Plane) bend to LNB and to Receiver (Rx) IFL. Typically, a VSAT remote user terminal 102 has a small aperture directional antenna for receiving from and transmitting signals to a satellite, and a feed assembly, attached to the dish. This feed assembly is connected via one or two cables referred to as an interfacility link (IFL) to an indoor unit (IDU) that processes the information (voice, video or data) received or for transmission, and an outdoor unit (ODU) mounted near the antenna for transmitting a modulated carrier generated by the IDU to the antenna. The feed assembly is placed at the focal point and includes a feed horn, a radio, etc. A feedhorn is a horn antenna used to convey radio waves between the radio and the dish. The IDU demodulates incoming signals received from the ODU and also operates as an interface between a user's communication equipment and the ODU. A receiver and a transmitter are coupled to a single antenna via the feedhorn so as to allow for simultaneous transmission and reception of signals, by use of a polarizer, which splits signals into a vertical and horizontal polarization unit, using a transmitter (Tx) waveguide section, and a receiver (Rx) waveguide section.

Signals from a satellite, reflected by the dish and converging at the feed horn, are weak and barely detectable after traversing thousands of miles in space. The signals will also have picked up other extraneous signals ("noise"), as they traverse the atmosphere. The feed horn collects the weak reflected signals and passes them on to the radio. The radio amplifies/boosts the weak received signals without amplifying the noise signals and converts the high frequencies of the signals into lower frequencies (i.e., down converting to the IDU). If the high frequencies were conveyed without down conversion, they require the use of wave guides for conveyance.

In a receive mode, the ODU processes Rx signals and outputs useable information, e.g., data, video or voice, which can be passed on to the appropriate device connected to the IDU. For example, if the VSAT system is used for internet access, a router, network switch or computer could be connected or coupled to the receiver circuit.

In a transmission mode, information is fed into a modulator, which can mix the information with a carrier signal through a process called modulation. The modulator then outputs the modulated signal to the ODU. The ODU amplifies and increases the frequency of the TX signal and then feeds it to the feedhorn. The feedhorn then disperses the signal onto the dish, which reflects the Tx signal, in a focused beam towards the satellite.

Other coupling apparatus include various combinations of individual components, including multiple filters and transducers, coupled together as required to perform the necessary task of separating the signals to be transmitted from the received signals, as will be apparent to those skilled in the relevant art.

According to an embodiment, the satellite communications network may include a satellite that is in geostationary orbit. It may be operated by an entity and provide satellite communications that enable the satellite communications network. Alternatively, several different networks that operate at the same time may share the resources provided by the satellite. The satellite operator communicates with the satellite using equipment.

An earth control station may be operably in communication with the satellite. This equipment may be operated by an entity, such as a network operator, that implements a satellite communications network using the satellite according to the resources allocated by the satellite operator. The network operator may implements one or plural networks.

The earth control station may include a hub that controls communications over the network with one or more terminals. A given network may have thousands of terminals or only a few. The earth control station may also have a control station antenna through which the hub communicates via the satellite to the terminals.

According to an embodiment, each VSAT may include an antenna or dish that is very small when compared with the control station antenna. For example, VSATs may have satellite dishes that are in the range of 0.5 to 2.0 meters across where the control station antenna may be in the range of 5 to 11 meters in diameter. One VSAT is a hand-held mobile device adapted to operate in a satellite network. Another VSAT rests in a fixed location and communicates with the satellite via terminal antenna which is a dish. Various customer premises equipment (CPE) connects with the VSAT. The CPE may include a server or a number of rack-mounted servers, a network, or the like. User equipment (UE) communicates over the overall satellite communications network 1 via the CPE and the VSAT.

According to another embodiment, the hub may communicate with an intrusion detection appliance that may reside on hardware that is external to the equipment in the hub. In other embodiments, the intrusion detection appliance may reside on hardware that is within the hub, or on the hub's own hardware, or remote from the hub via a network such as the Internet, or even on-board the satellite.

According to an embodiment, the satellite communications network may support multiple access to the satellite by employing multiple access technology such as frequency division multiple access (FDMA), time division multiple access (TDMA), and/or code division multiple access (CDMA).

The TDMA method if implemented by the hub may control each VSAT by way of assigning time slots, guard bands, power levels, and the like. In general, each VSAT has full and exclusive use of the assigned transponder bandwidth during the time slot that the hub assigns it.

With TDMA operation, the hub and the terminals communicate in bursts of information for the time period of the slot assigned. The hub may place a sync burst as the first element of a frame to control the timing synchronization of the stations.

The hub further directs each VSAT as to what modulation and coding (MODCOD) scheme to implement.

What goes on in the atmosphere affects networks such as satellite communications network, resulting in fading. To compensate for fading, which may derive from rain or other disturbances, the hub may direct a terminal to transmit with additional power and, subsequently, to reduce its transmit power as the situation dictates.

Thus, the hub dynamically directs the terminal in the majority of settings the terminal uses (also referred to herein as operating parameters) as it participates in the satellite communications network.

According to even a further embodiment, the hub may include communications equipment. This equipment may be implemented, in a concrete example, as a rack-mounted chassis with various line cards in slots, transmit and receive ports, and a patch panel for convenient interconnection. The communications equipment is coupled with the control station antenna to transmit and/or receive signals to and/or from the satellite.

The communications equipment connects to other components via a first network which may be referred to as a tunnel network. These other components include an upstream router and a network management system such as described above in reference to FIG. 1.

The upstream router performs routing between the tunnel network and a second network which may be referred to as an upstream network. The NMS also operates on the upstream network. Other participants in the upstream network may include a customer router, a protocol processor server, an NMS client, and an NMS database.

The customer router may perform routing between the upstream network and a customer network.

The NMS client may interact with the NMS to permit the network operator to configure and control the satellite communications network. The NMS may contain logic that continuously operates to manage the operating parameters of the terminals. The NMS also contains logic that continuously interacts with NMS database.

The NMS database contains a substantial amount of information that may be understood to fall into two broad categories: configuration information and statistics.

As to the configuration information, the NMS database stores details about the equipment that participates in the satellite communications network and also the setup of the satellite communications network. As to the statistical information, the NMS database stores details about the ongoing operation of such equipment. This statistical information may include an extensive log of data about how each piece of equipment is operating to include its operating parameters and status.

According to an embodiment, logs of network management system information need not be collected only by the NMS. Some information may be collected by other devices, optionally remote from the hub, that send the information to the NMS or to the intrusion detection appliance. Here, therefore, "network management system logs" should be understood to refer to logged information whether it is obtained through the actual NMS, the NMS database, or elsewhere.

The statistical information, as mentioned above, includes logs of data about the terminals and the communications system.

NMS Event Logs

The logs in the NMS database may include event logs. An example of the type of information that may be included in event logs is shown in Table 2 below.

TABLE 2

| Field | Log entry A | Log entry B |
|---|---|---|
| Date & Time | 2020 Nov. 29 14:16:22 | 2020 Nov. 29 14:47:19 |
| Log Type | Event | Event |
| Network Name | ABC Main Network | ABC Main Network |
| Site Name | Store 52 | Store 52 |
| Terminal Model | T3424 | T3424 |
| Terminal Serial No. | 202442 | 202442 |
| Terminal ID | T52a | T52a |
| Event Type | LAN disconnect | LAN connect |
| Event Description | Terminal disconnected from local LAN port 1 | Terminal connected to local LAN port 2 |

Table 2

Table 2 arranges the field names of the information in the first column, example values for what data is in each field in a first log entry "A" in the second column, and example values for the data in another log entry "B" in the third column. The fields are just examples for the sake of explanation. The fields names and formats are likewise just examples, as are the values.

The NMS may provide these kind of log entries (also referred to as records) to the NMS database, which stores them. Log entry A contains "20201129 14:16:22" in the first row. The field name for this data, in the teaching example, is "Date & Time." The reader may interpret this as meaning that the log entry was recorded in A.D. 2020 on November 29, at time 14:16:22 (hours, minutes, seconds). Log entry B was recorded about half an hour later.

In Table 2, the "Log Type" field may identify the type of log entry. In this example, the log entry is an "Event" log entry. The reader may readily grasp the meaning of the other field names. The various fields that make up a log entry may change from type to type, in some systems of logging data. For example, an event log entry may have an "Event Type" field but other kinds of log entries might have different fields. Various logs may be present in the NMS database. For example, the NMS database may hold an events log and an IP traffic log. The log entries may, for example, be stored as records in a relational database management system of NMS database or the like.

NMS General Logs

The logs in the NMS database may include general logs. An example of the type of information that may be included in general logs is shown in Table 3 below.

TABLE 3

| Field | Log entry C |
| --- | --- |
| Date & Time | 2020 Nov. 29 15:16:22 |
| Log Type | General |
| Network Name | ABC Main Network |
| Site Name | Store 52 |
| Terminal Model | T3424 |
| Terminal Serial No. | 202442 |
| Terminal ID | T52a |
| LAN IP Address | 216.10.0.52 |
| LAN Subnet Mask | 255.255.255.252 |
| Max Power | −20.000000 dBm |
| Initial Power | −22.000000 dBm |
| Max Downstream Information Rate | 1024.000000 kbps |
| Min Upstream Information Rate | −0.001000 kbps |
| Downstream C/N | 16.00 dB |
| Upstream C/No | 66.77 dBHz |
| Upstream C/N | n/a |
| Tx Pwr | 26.42 dBm |
| Temp | 55.41 C. |
| Symbol Timing Offset | 5066 |
| Frequency Offset | −2526 |
| TDM Lost | 15 |
| Clock DAC | −25016 |
| Up Time | 35 days 4 hours 34 min 28 sec |
| Lan Port | 2 |
| Connections | 1 |

Table 3 shows some of the fields in an example of a general log entry according to this teaching example. Although the table shows only one log entry C the reader should understand that NMS causes such entries to be generated very frequently. A setting in NMS, for example, determines how often log entries of any given type are made. Thus, a general log entry might be made more than once per second but an event log entry like the ones shown in Table 1 might be made once every several days or even months.

In Table 3, the log entry reveals that the given terminal T52a has a maximum transmit power of −20.000000 dBm. This kind of information about the equipment is shown as an example only. Equipment capability information might not appear in a general log entry but might be kept in a reference table in the NMS database depending on the implementation. Even so, this example log entry helps the reader understand that the NMS database contains a vast amount of data about everything of possible interest that takes place on the satellite communications network.

Log entry C also reveals some of the aspects of the service that apply to the terminal's communications. For example, its maximum and minimum upstream information rates show the upper and lower bounds of bandwidth that are set for terminal T52a.

Note the following fields of log entry C: "Downstream C/N", "Upstream C/No", "Upstream C/N", "Tx Pwr", "Temp", "Symbol Timing Offset", "Frequency Offset", "TDM Lost", and "Clock DAC". These fields reflect current status information for the given terminal T52a.

"Downstream C/N" means the current downstream carrier-to-noise ratio that the terminal presently experiences. This is the signal strength that the modem at the terminal's location sees. "Upstream C/No" means the current carrier-to-noise density ratio measured at the hub 1000. "Upstream C/N" means the current upstream carrier-to-noise ratio, or signal strength, measured at the hub. "Tx Pwr" means the transmit power at which the terminal presently transmits. "Temp" is a measure of the operating temperature of the modem at the terminal's location. "Symbol Timing Offset," "Frequency Offset," and "TDM" may be afforded their customary and ordinary meaning to one skilled in the art. "Clock DAC" represents the state of the internal oscillator at the terminal end.

An NMS client may, by way of a user interface, show a network operator information gleaned from multiple general log entries. For example, a network operator may view a management screen that shows "Average Downstream C/N" instead of "Downstream C/N."

Similarly, the NMS client may display "Up Time" information that the NMS computes from various event log records, in which case the "Up Time" field might not be included in the general log entry. Various implementations are possible.

The "LAN Port" field in the general log entry identifies the local LAN port into which the terminal's equipment is presently connected.

The "Connections" field reveals how many connections to the modem are currently active. The value "1" indicates that there is one such connection at the present. This situation may arise when, for example, an administrator connects to the modem to manage its configuration or the like.

NMS IP Logs

The logs in the NMS database 1300 may include IP logs. Here, "IP" refers to packet traffic such as TCP, UDP, ICMP, HTTP, IGMP, and others. An example of the type of information that may be included in IP logs is shown in Table 4 below.

TABLE 4

| Field | Log entry D | Log entry E |
| --- | --- | --- |
| Date & Time | 2020 Nov. 29 14:16:23 | 2020Nov. 29 14:16:24 |
| Log Type | IP | IP |
| Network Name | ABC Main Network | ABC Main Network |
| Site Name | Store 52 | Store 52 |
| Terminal Model | T3424 | T3424 |
| Terminal Serial No. | 202442 | 202442 |
| Terminal ID | T52a | T52a |
| Packet Type | TCP | HTTP |
| Size | 0.262 kb | 0.815 kb |

In Table 4, log entry D reveals that terminal T52a transmitted a certain amount of data in TCP traffic, and log entry E, made one second later, shows that traffic that followed was HTTP traffic.

The IP log entries may also include source and destination address information, for example, and also other information such as transmission time.

NMS Latency Logs

The NMS database may include latency information. Here, "latency" refers to traffic, and is a metric that represents how long it takes for a given message to traverse the network.

The latency information may be kept in latency log entries in the NMS database 35, an example of which appears in Table 5 below.

TABLE 5

| Field | Log entry F | Log entry G | Log entry H |
|---|---|---|---|
| Date & Time | 2020 Nov. 29 16:15:23 | 2020 Nov. 29 16:45:24 | 2020 Nov. 29 17:15:25 |
| Log Type | Latency | Latency | Latency |
| Network Name | ABC Main Network | ABC Main Network | ABC Main Network |
| Site Name | Store 52 | Store 52 | Store 52 |
| Terminal Model | T3424 | T3424 | T3424 |
| Terminal Serial No. | 202442 | 202442 | 202442 |
| Terminal ID | T52a | T52a | T52a |
| IP address | 216.10.0.52 | 216.10.0.52 | 216.10.0.52 |
| Latency (ms) | 665.74 | 629.65 | 654.75 |

In Table 5 above, the IP address is that of the terminal. The NMS generates this kind of log twice per minute in this teaching example. The latency value, in milliseconds, represents an average of the time (within the satellite communications network 100) between when the network receives a message for transmission over the network (for example, from a terminal) and when the network delivers the message to its network destination (for example, the hub).

Summary—NMS Logs

The NMS is not limited by the above-mentioned information and may store, calculate, or otherwise record, any available information from the data in the NMS database. The data in the records of the NMS database may result, in various circumstances, from measurement, calculation, or estimation by the NMS or, optionally, by other components that operate within the satellite communications network. The NMS database contains many more specific atoms of data that have not made their way into the foregoing discussion. What specific data resides in a given NMS database depends on the specific implementation of the network, the specific way the vendor equipped the NMS, and the particular equipment that feeds information into the system.

The example log entries A-H should not be confused with any actual data; it is fictitious and offered merely to help the reader understand, in a concrete way, what types of information may be obtained from the NMS database.

The NMS database stores data in a database, typically under the control of a database management system. When a NMS client provides a network operator with statistical information via a graphical user interface, this information may be straight from the NMS database or it may be information calculated by the NMS client based on the records in the NMS database. The discussion below refers to both of these types of statistical information about the network as "NMS data" unless some specific context requires calling out the difference between recorded data and calculated data.

Satellite Footprint

According to an embodiment, a satellite 104 may be in geostationary orbit. The transponders of the satellite may be directed toward the earth. The earth, its atmosphere, the geometry of the various transponders, and their pointing direction all affect the strength of signals communicated between the satellite and the terminals. These factors form a pattern of reception referred to herein as the footprint of the satellite 11 (e.g., .110.a110 a100 a200 a100 a100).

According to an embodiment, a footprint for the satellite may be envisaged. The footprint of the satellite may exist over a continent, e.g., over Europe, depicting lines of force. The lines of force may be depicted with numerals that refer to the power at which a terminal on the surface receives a signal from the satellite under clear conditions. A terminal in the area bounded by a line of force with a higher number receives the signal at a level of power greater than a terminal in an area bounded by a line of force with a lower number.

Satellite footprint information may be stored in a database in any of several formats. For example, a satellite footprint database may be stored in a look-up table. An example of such a look-up table may be as provided in Table 6 below.

TABLE 6

| Lat/Lon 1 | Lat/Lon 2 | Strength |
|---|---|---|
| 48.85847610743875, 2.2949067235160387 | 48.847883091577245, 2.3147497188583683 | 50.5 |

In Table 6, the first column represents a value for the latitude and longitude of one corner of a rectangular portion of the earth's surface. The second column represents the latitude and longitude of the opposite corner. The two values define the location to which the pair of coordinates pertain, an area of about five thousand feet on each side. The value in the third column indicates the power at which the terminal may be expected to receive a signal from the satellite 11.

This is merely an example. The information may be stored in other ways, be referenced using other systems, and/or have a different granularity. Regardless of these implementation details, this type of information for the area for which the satellite provides communications support is referred to herein as "footprint data."

Fade and Atmospheric Data

According to another aspect, weather may affect communications between the terminals and the satellite1. Clouds, rain, and snow may at any instant degrade how well a given terminal can communicate with the satellite while, at the same instant, other terminals may suffer the same, more, less, or not at all. The weather varies from place to place and moment to moment.

Weather is one factor that can contribute to fade, a decrease in the level at which a signal can be received owing to factors external to the system such as weather. When the hub detects a decrease in the carrier-to-noise ratio, for example, or in the event that the carrier-to-noise ratio is below a transmit power-based threshold, the hub can instruct the given terminal to increase its transmit power. In other words, the hub can work to compensate for fade by sending the terminal an instruction to increase transmit power.

Various national and international entities make weather data available to the public through published application programming interfaces (APIs). For example, the U.S. National Oceanographic and Atmospheric Administration (NOAA) may provide such a service. This service makes available atmospheric data for current conditions as well as the conditions at a prior date and time. Such atmospheric data may include temperature, precipitation, show and ice, cloud cover, and wind. This atmospheric data may be provided on a gridded basis so that the current and/or historical conditions may be ascertained for a specific geographic area.

Such atmospheric data may originate from ground readings or from information provided by weather satellites. Regardless of the source or form, such weather-related information is hereafter referred to as "atmospheric data."

According to a further embodiment, a Digital Video Broadcasting-Satellite-Second Generation (DVB-S2) protocol structure may include a frame logical structure including exemplary forward error correction (FEC) depending on variable length modulation and coding (MODCOD). DVB-S2 is an exemplary ETSI standard for satellite communication.

DVB-S2 may be a digital television broadcast standard that has been designed as a successor for the popular DVB-S system. It was developed in 2003 by the Digital Video Broadcasting Project, an international industry consortium, and ratified by ETSI (EN 302307) in March 2005. The standard is based on, and improves upon DVB-S and the electronic news-gathering (or Digital Satellite News Gathering) system, used by mobile units for sending sounds and images from remote locations worldwide back to their home television stations.

DVB-S2 may be designed for broadcast services including standard and HDTV, interactive services including Internet access, and (professional) data content distribution. The development of DVB-S2 coincided with the introduction of HDTV and H.264 (MPEG-4 AVC) video codecs.

Two new features to the DVB-S standard are:
1) A powerful coding scheme based on a modern LDPC code, which for low encoding complexity, the LDPC codes chosen have a special structure, also known as Irregular Repeat-Accumulate codes.
2) Variable Coding and Modulation (VCM) and Adaptive Coding and Modulation (ACM) modes, which allow optimizing bandwidth utilization by dynamically changing transmission parameters.

Other features may include enhanced modulation schemes up to 32APSK, additional code rates, and the introduction of a generic transport mechanism for IP packet data including MPEG-4 audio-video streams, while supporting backward compatibility with existing MPEG-2 TS based transmission.

DVB-S2 achieves significantly better performance than predecessor versions—mainly allowing for an increase of available bitrate over the same satellite transponder bandwidth. The measured DVB-S2 performance gain over DVB-S is around 30% at the same satellite transponder bandwidth and emitted signal power. When the contribution of improvements in video compression is added, an (MPEG-4 AVC) HDTV service can now be delivered in the same bandwidth that supported an early DVB-S based MPEG-2 SDTV service only a decade before.

In March 2014, DVB-S2X specification as published by DVB Project provided an optional extension adding further improvements. See Table 7 below.

TABLE 7

| | DVB-S | DVB-S2 |
|---|---|---|
| Input interface | Single transport stream (TS) | Multiple transport stream and generic stream encapsulation (GSE) |
| Modes | Constant coding & modulation | Variable coding & modulation and adaptive coding & modulation |

TABLE 7-continued

| | DVB-S | DVB-S2 |
|---|---|---|
| FEC | Reed-Solomon (RS) | LDPC + BCH 1/4, 1/3, 2/5, 1/2, 3/5, 1/2, 2/3, 3/4, 5/6, 7/8 2/3, 3/4, 4/5, 5/6, 6/7, 8/9, 9/10 |
| Modulation | Single-carrier QPSK | QPSK, 8PSK, 16APSK, 32APSK |
| Interleaving | Bit-interleaving | Bit-interleaving |
| Pilots | Pilot symbols | Pilot symbols |

An extension has been created named RCS for bidirectional satellite communication.

DVB-RCS & DVB-RCS2 Standards

DVB-RCS is the first generation of open international standard for TDM/TDMA satellite networks. The standard was published in 2001 and updated several times since. Various companies have implemented the standard, e.g., NSSL Global Technologies on its SatLink product line, among others involved in developing the standard. Today DVB-RCS is supported by multiple satellite network suppliers and is used in hundreds of networks worldwide.

In March of 2011 the second generation of the standard (DVB-RCS2) was published. DVB-RCS2 specifies new technology providing significant advances in TDM/TDMA performance for better efficiency, more throughput, and greater network reliability. The predominance of TDM/TDMA in satellite networks today for interactive IP (Internet Protocol) communications illustrates the importance of this technology in furthering the reach of the Internet and for extending all kinds of private IP networks or VPNs into regions of the world poorly served by terrestrial communications.

The portion of these networks where the greatest innovation is occurring is in the TDMA communication from many remote VSATs (i.e., low-cost ground user terminals) to one or more central site hub(s) in an exemplary star topology, and to other VSAT user terminals (in an exemplary mesh topology). The bandwidth for transmissions from the VSAT user terminals may be provided by a TDMA Carrier Group, which may act as a single pool of bandwidth shared by many VSAT user terminals.

Multiple Carrier Groups May be Used if Desired, with a Single TDM Forward Link.

A Carrier Group is managed by control logic at the hub using the concept of a "superframe" which defines and tracks all timeslots, on all TDMA carriers. For maximum efficiency, timeslots may be assigned exclusively to specific VSAT user terminals to implement all necessary "virtual channels" for user traffic, which must "float" dynamically across multiple TDMA carriers based on many fast changing criteria affecting the network to assure maximum link-level availability and multiplexing efficiency.

Furthermore the time slots must be assigned with the necessary throughput, response time, and jitter performance for each of potentially many thousands of different IP traffic flows, based on a set of pre-defined quality of service "QoS Classes" (i.e., aggregates of IP traffic), which may be configured on a customized basis for each VSAT user terminal in the network.

The approved DVB-RCS2 standard—the 2nd generation of the well-established and widely adopted DVB-RCS standards—is the most significant advancement in TDMA burst-mode technology in a decade and a half. DVB-RCS2 sets a new non-proprietary, standard benchmark for TDM/TDMA network technologies.

The specific nature of the TDMA technology for accomplishing these goals in satellite networks is referred to as dynamic Multi-Frequency TDMA (MF-TDMA).

MF-TDMA is supported fairly widely in the industry, but not by all TDM/TDMA suppliers, as some lack required dynamic flexibility. Dynamic MF-TDMA employs fast frequency hopping within the TDMA carrier group where the hopping across carriers occurs automatically in response to the needs of the network (i.e., not requiring human intervention).

Dynamic MF-TDMA technology was standardized in the first version of the DVB-RCS standard in 2001. Today both standard (DVB-RCS) and proprietary versions of Dynamic MF TDMA exist. But many suppliers lack key features needed to produce the highest levels of efficiency, throughput, and reliability demanded by many customers. In particular, many may lack support of adaptive technologies for use in TDMA Carrier Groups (such as ACM) and may lack good modem spectral efficiency. Those suppliers providing ACM have substantial efficiency benefits.

Two principal adaptive technologies for TDMA burst mode operation may include:
1) Adaptive Carrier Selection (ACS) per Burst: Dynamically selecting the carrier for a VSAT user terminal to use for its next TDMA burst, based on the carrier symbol rate, current conditions at the VSAT user terminal or the Hub (e.g., bad weather or interference), and as constrained by the VSAT hardware configuration. ACS may help assure greater throughput and increased link reliability.
2) Adaptive Coding and Modulation (ACM) per Burst: Dynamically selecting the MODCOD for a VSAT to use for its TDMA bursts, based on the same factors as above. ACM may deliver a significant advantage for maximizing efficiency, as well as throughput and link reliability.

Both of the ACS and ACM technologies are supported by DVB-RCS2 and various companies' products. While ACS has been supported in various VSAT networks for many years using first-generation DVB-RCS, the introduction of ACM per burst became available from some vendors in 2012. DVB-RCS2 may require some suppliers to implement major changes to proprietary architectures.

The support of "ACM per burst" on TDMA carriers may produce a 2x to 2.5x increase in the average efficiency and throughput of those carriers in Ku or Ka band networks, while also greatly increasing link-level reliability. When combined with ACS, further advantages may be realized in throughput and reliability.

For suppliers still without ACM or ACS the best mode of operation is to have all TDMA carriers in the Carrier Group run at the same symbol rate using a single fixed MODCOD. Some "dynamic" TDM/TDMA products may require this preventing those suppliers from obtaining comparable efficiency, throughput, or reliability under common network conditions, even if they do eventually improve basic modem performance and support a wider range of modulation and coding options (MODCODs).

The new DVB-RCS2 standard products became released starting in June 2011 with commercial availability of DVB-RCS2 in 2012. Today these two "RCS standards" provide open, fully documented standards for TDM/TDMA satellite networks.

DVB-RCS2 delivers many additional advancements that may work in combination with ACM and ACS to produce the highest performance TDMA networks available. These include:

Modulation and Coding Options (MODCODs) from QPSK 1/3 to 16QAM 5/6: cover a range similar to DVB-S2 for TDM carriers, with "nominal" efficiencies up to 3.3 bits per symbol, using an exemplary 16-state Turbo Code forward error correction (FEC).

Low Burst Overheads: All TDMA modems incur some burst overhead for guard times, preambles and/or pilot symbols. The key is to assure that these do not significantly reduce the nominal spectral efficiency by more than a few percent, even at high symbol rates.

Lower Carrier Spacing: In a DVB-RCS2 network, a spacing of 1.12x among TDMA carriers produces the optimal spectral efficiency (in bps/Hz), and the best efficiency of any burst modem, while matching or beating the spectral efficiencies of the best "continuous mode" (e.g., TDM or SCPC) modems, even after subtracting burst overhead and Layer 1 framing overheads. This holds true also when compared with DVB-S2 at its minimum 1.2x carrier spacing (with pilots and short-frames, as is common when using DVB-S2 with ACM).

Excellent Signal-to-Noise Ratio (SNR) Requirements: SNR requirements for DVB-RCS2 TDMA carriers are comparable (+/−0.3 dB) to DVB-S2 TDM carriers for the same spectral efficiency at comparable FEC frame & burst sizes.

Multiple Burst Sizes: DVB-RCS2 defines several traffic burst sizes (which may also contain signaling information), a mini-burst dedicated to periodic and/or random access signaling, plus a special logon burst. All are defined in terms of symbols to simplify superframe customization and enable ACM. The traffic burst sizes allow TDMA Carrier Groups to be optimized for the mix of IP packet sizes and/or the peak loading intensities expected at each VSAT.

More Efficient IP Packet Encapsulation for Multiple IP Flows & Protocols: DVB-RCS2 replaces the previous standard methods of IP packet encapsulation with a new method called "RLE" that is optimized for maximum efficiency in TDMA burst operation, greatly reducing overhead on small IP packets where it matters most, and supporting multiple concurrent QoS Classes from a single VSAT as well as multiple IP versions (e.g., IPv4 & IPv6).

Higher Symbol Rate TDMA Carriers: Maximum symbol rates for DVB-RCS2 carriers are not specified in the standard since they are implementation dependent. But the ability to tightly synchronize TDMA bursts in a DVB-RCS2 network (down to small fractions of a microsecond) minimizes required guard times, and therefore reduces the penalty of going to higher symbol rates. This goal is also helped by the "Long Burst" and "Very Long Burst" options in DVB-RCS2 and the simplicity of the superframe. SatLink currently supports symbol rates on TDMA carriers up to 8 Msps (much higher than supported by other TDMA technologies) with the capability for further increases as the market may demand.

Large, Diverse TDMA Carrier Groups: The size and diversity of symbol rates with a TDMA Carrier Group is also implementation dependent. The DVB-RCS2 standard provides signaling structures that allow a huge diversity and a very large number of carriers all in the same Carrier Group. Currently 24 TDMA carriers are supported in SatLink Hubs for the RCS2 superframes with both ACM and ACS active. In the future, up to 64 TDMA carriers will be easily supported for RCS2 on high-performance platforms. This increases efficiency, throughputs, and overall link reliability for all VSATs.

According to an embodiment, if a remote VSAT user terminal is to maintain a fixed data rate regardless of at what MODCOD the remote user terminal operates, the required symbol rate may increase drastically as the MODCOD goes down, according to an exemplary embodiment. In order to maintain a configured committed information rate (CIR), the remote will require more and more symbols as the MOD-COD decreases, forcing this remote to steal symbols from the shared carrier in order to guarantee the CIR, according to an exemplary embodiment.

In a stationary network environment, the nominal MOD-COD is typically chosen to be the clear sky MODCOD of the remote, The CIR and MIR (maximum information rate) granted to the remote are limited by the remote's nominal MODCOD. The remote is allowed to operate at MODCODs higher than the nominal MODCOD, as long as it does not exceed the configured remote maximum MODCOD, but is not granted additional higher CIR or maximum information rate (MIR) when operating above the nominal MODCOD.

During a rain fade, the CIR or MIR granted to a remote are scaled down based on the remote's nominal MODCOD. This scale down provides a graceful degradation of CIR and MIR during the fade while consuming the same satellite bandwidth as at the nominal MODCOD.

Figure 2:
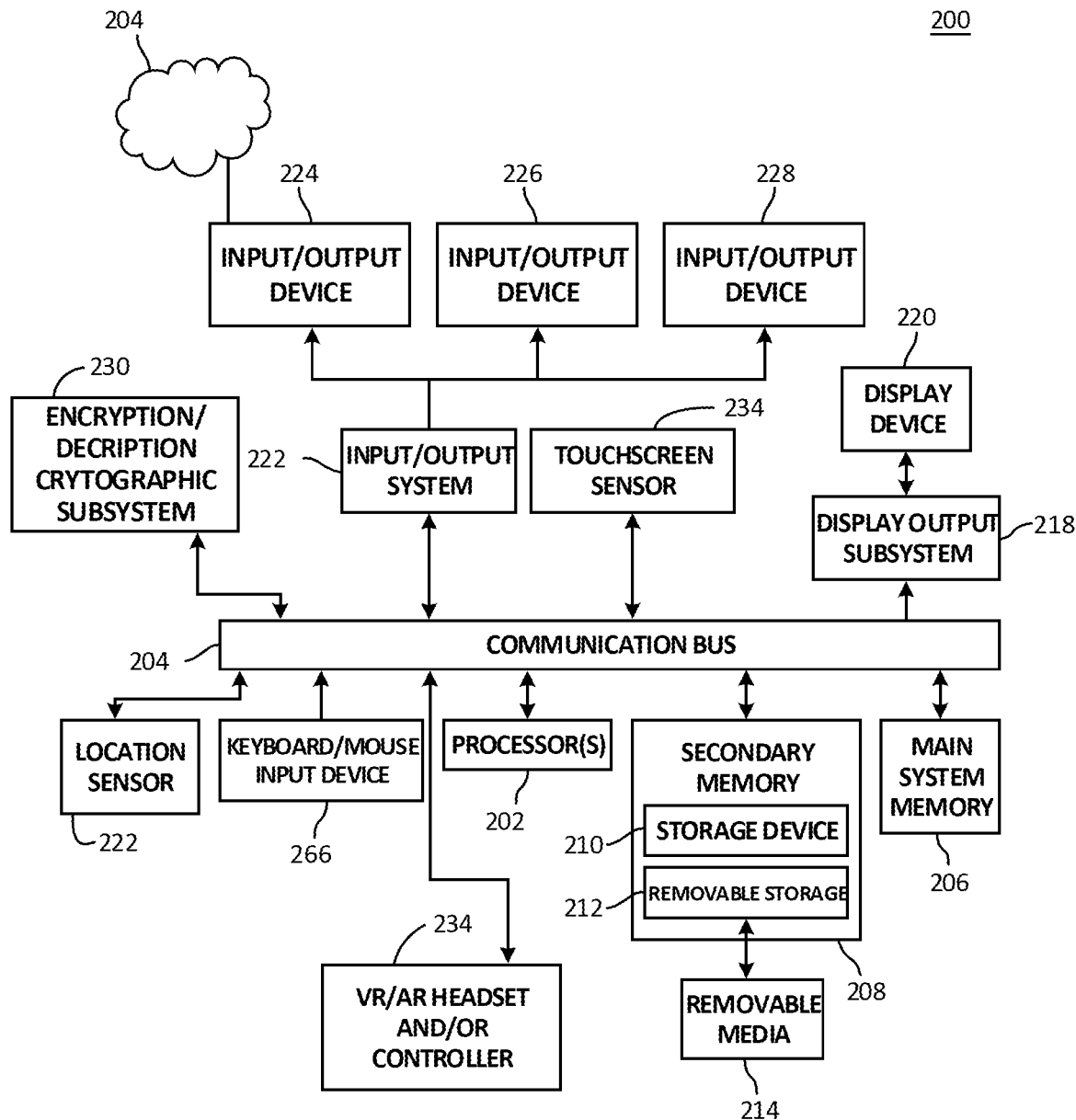
FIG. 2 depicts an exemplary schematic diagram of computing and communications system for providing any of various exemplary devices including exemplary functionality which may include in exemplary embodiments, and exemplary intrusion detection, data logging, analysis, comparison, heuristics, threat estimation, weighting, prediction, characterization, analysis, ranking, and alert/notification generator system, computing and/or communications device, and/or client, and/or server, and/or service provider device system hardware architecture according to an aspect of the application.

According to even another embodiment, FIG. 2 depicts a schematic diagram 200 illustrating an exemplary computing and communications system for providing any of various exemplary devices including exemplary functionality which may include in exemplary embodiments, and exemplary intrusion detection, data logging, analysis, comparison, heuristics, threat estimation, weighting, prediction, characterization, analysis, ranking, and alert/notification generator system, computing and/or communications device, and/or client, and/or server, and/or service provider device system hardware architecture, according to one exemplary embodiment.

Moreover, FIG. 2 depicts an exemplary embodiment of a block diagram 200 illustrating an exemplary embodiment of a computer system 102, 106 that may be used in conjunction with any of the systems depicted in the environment 100 of FIG. 1 or hardware layer 202 of diagram 200 of FIG. 2. Further, computer system 202, 206 of block diagram 200 may be used to execute any of various methods and/or processes such as, e.g., but not limited to, those discussed herein. FIG. 2 depicts an exemplary embodiment of a computer system 102, 106 that may be used in computing devices such as, e.g., but not limited to, client 106 and/or server 102 computing devices according to an exemplary embodiment of the present aspect. FIG. 2 depicts an exemplary embodiment of a computer system that may be used as client device 106, or a server device 102, etc. The present aspect (or any part(s) or function(s) thereof) may be implemented using hardware, software, firmware, or a combination thereof and may be implemented in one or more computer systems or other processing systems. In fact, in one exemplary embodiment, the aspect may be directed toward one or more computer systems capable of carrying out the functionality described herein. An example of a computer system 200 is shown in FIG. 2, depicting an exemplary embodiment of a block diagram of an exemplary computer system useful for implementing the present aspect. Specifically, FIG. 2 illustrates an example computer 200, which in an exemplary embodiment may be, e.g., (but not limited to) a personal computer (PC) system running an operating system.

The aspect may be implemented on any appropriate computer system running any appropriate operating system. In one exemplary embodiment, the present aspect may be implemented on a computer system operating as discussed herein. An exemplary computer system, computer 200 is shown in FIG. 2. Other components of the aspect, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, augmented reality devices (AR), virtual reality (VR) devices, etc., may also be implemented using a computer such as that shown in FIG. 2.

The computer system 200 may include one or more processors, such as, e.g., but not limited to, processor(s) 202. The processor(s) 202 may include, a microprocessor, nanoprocessor, quantum computer, any of various conventional digital architecture processors including, e.g., but not limited to, Pentium, CORE i7, i5, i3, i9, etc., ARM, CISC, RISC, POWER, multi-processor, and/or multi-core, quadcore, etc., field programmable gate array (FPGA), application specific integrated circuit (ASIC), cryptographic processor, cryptographic subsystem, a system on a chip (SOC), etc., may be coupled or connected to a communication infrastructure 204 (e.g., but not limited to, a communications bus, a backplane, a mother board, a cross-over bar, or network, etc.). Various exemplary software embodiments may be described in terms of this exemplary computer system. After reading this description, it will become apparent to a person skilled in the relevant art(s) how to implement the aspect using other computer systems and/or architectures.

Computer system 200 may also include a display interface 218 that may forward, e.g., but not limited to, graphics, text, and other data, etc., from the communication infrastructure 204 (or from a frame buffer, etc., not shown) for display on the display unit 220.

The computer system 200 may also include, e.g., but may not be limited to, a main memory 206, which may include, e.g., but not limited to, random access memory (RAM), volatile and nonvolatile, synchronous digital (SDRAM), flash memory, and/or a secondary memory 208, etc. The secondary memory 1308 may include, for example, (but not limited to) a storage device 210 such as, e.g., but not limited to, a hard disk drive and/or a removable storage drive 212, representing, e.g., but not limited to, a floppy diskette drive, a magnetic tape drive, an optical disk drive, a compact disk (CD-ROM) device, write once read many (WORM), Read Write (RW), Read (R), a magneto-optical (MO) drive, a digital versatile disk (DVD) device, BLU-RAY, and/or other Digital Storage Disk, electronic, magnetic, optical, magneto-optical, and/or optical storage device, etc. The removable storage drive 212 may, e.g., but not limited to, access, read from and/or write to a removable storage unit 214 in a well-known manner. Removable storage media unit 214, may also be called a program storage device or a computer program product, and may represent, e.g., but not limited to, a floppy disk, magnetic tape, optical disk, CD-ROM disk, a MO media, a DVD disk, FLASH MEMORY, USB stick, SDRAM, memory device, etc. which may be accessed, read from, and/or written to by removable storage drive 212. As will be appreciated, the removable storage unit 1314 may include, e.g., but not limited to, a computer usable storage medium having stored therein computer software and/or data.

In alternative exemplary embodiments, secondary memory 1308 may include other similar devices for allowing computer programs or other instructions to be loaded into computer system 200. Such devices may include, for example, a removable storage unit 214 and a storage subsystem interface adapter (not shown.) Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM), SDRAM, FLASH, and/or associated socket, and/or storage and/or processing and/or memory, and/or integrated devices, and/or other removable storage units 214 and interfaces, which may allow software and data to be transferred from the removable storage unit 214 to computer system 200.

Computer 200 may also include, e.g., but not limited to, an input device 216 such as, e.g., (but not limited to) a mouse or other pointing device such as a digitizer, and/or a keyboard or other data entry device (not separately labeled).

Computer 200 may also include, e.g., but not limited to, output devices 220, such as, e.g., (but not limited to) display, touchscreen, touch sensor, proximity sensory, printers, and output subsystem display interface 1318.

Computer 200 may also include, e.g., but not limited to, input/output (I/O) system 222 such as, e.g., (but not limited to) a communications interface, a cable and communications path, (not separately shown) etc., as well as I/O devices 224, 226, 228, for example. These devices 224, 226, 228, may include, e.g., but not limited to, a network interface card, and modems (not separately labeled). The communications interface may allow software and data to be, e.g., transferred between computer system 200 and external devices over a network 104, as shown. Examples of the communications interface may include, e.g., but may not be limited to, a modem, a network interface (such as, e.g., an Ethernet card), a communications port, a Personal Computer Memory Card International Association (PCMCIA) or PC-Card slot and card, etc. Software and data transferred via communications interface may be in the form of signals 230 (not shown) which may be electronic, electromagnetic, optical or other signals capable of being received by communications interface. These signals 230 may be provided to communications interface via, e.g., but not limited to, a communications path (e.g., but not limited to, a channel). This channel may carry signals, which may include, e.g., but not limited to, propagated signals, and may be implemented using, e.g., but not limited to, wire or cable, fiber optics, a telephone line, a cellular link, a radio frequency (RF) link and other communications channels, etc.

According to the application, the terms "computer program medium" and "computer readable medium" may be used to generally refer to media such as, e.g., but not limited to removable storage drive 214, a hard disk installed in storage device 210, and signals 230, etc. These computer program products may provide software to computer system 200. The aspect may be directed to such computer program products.

Embodiments of the aspect may be implemented in one or a combination of hardware, firmware, and software. Embodiments of the aspect may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others, when in a nonvolatile form.

Computer programs (also called computer control logic), may include object-oriented computer programs, and may be stored in main memory 206 and/or the secondary memory 208 and/or removable storage media units 214, also called computer program products. Such computer programs, when executed, may enable the computer system 200 to perform the features of the present aspect as discussed herein. In particular, the computer programs, when executed, may enable the processor 202 to provide a method to resolve conflicts during data synchronization according to an exemplary embodiment of the present aspect. Accordingly, such computer programs may represent controllers of the computer system 200.

In another exemplary embodiment, the aspect may be directed to a computer program product comprising a computer readable medium having control logic (computer software) stored therein. The control logic, when executed by the processor 202, may cause the processor 202 to perform the functions of the aspect as described herein. In another exemplary embodiment where the aspect may be implemented using software, the software may be stored in a computer program product and loaded into computer system 200 using, e.g., but not limited to, removable storage drive 212, storage device 210 or communications interface, etc. The control logic (software), when executed by the processor 202, may cause the processor 202 to perform the functions of the aspect as described herein. The computer software may run as a standalone software application program running atop an operating system, or may be integrated into the operating system.

In yet another embodiment, the aspect may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the aspect may be implemented primarily in firmware. In yet another exemplary embodiment, the aspect may be implemented using a combination of any of, e.g., but not limited to, hardware, firmware, and software, etc.

Exemplary embodiments of the application may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium May include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present aspect makes reference to wired, or wireless networks. Wired networks include any of a wide variety of well-known means for coupling voice and data communications devices together. A brief discussion of various exemplary wireless network technologies that may be used to implement the embodiments of the present aspect now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G, 4G, 5G, 6G, 7G, nG wireless, BLUETOOTH, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

BLUETOOTH is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present aspect may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g-2003, etc.), 802.16, Wi-Max, etc.

An exemplary computer-implemented exemplary intrusion detection, data logging, analysis, comparison, heuristics, threat estimation, weighting, prediction, characterization, analysis, ranking, and alert/notification generator system, computing and/or communications device providing in one exemplary embodiment, and access to devices, via, e.g., an exemplary communications network to a plurality of electronic computing devices configured as set forth in the claims, and may include various inputs and/or outputs including any of various sensors including, e.g., but not limited to, touch screens, touch sensors, pressure sensors, accelerometers, location sensors, energy based sensors, Zygbee devices, intelligent devices, Internet of Things (iOT) devices, etc., data database collection sensor/gatherers, system service provider datasets, data sensors, utility pricing data, blockchain components, encrypted cryptographically protected user information and account user passwords, and/or other private data, distributed ledgers, etc. Specifically, FIG. 2 illustrates an example computer-implemented exemplary intrusion detection, data logging, analysis, comparison, heuristics, threat estimation, weighting, prediction, characterization, analysis, ranking, and alert/notification generator system, computing and/or communications device system service provider computer 200, which in an exemplary embodiment may be, e.g., (but not limited to) an exemplary computer-implemented exemplary intrusion detection, data logging, analysis, comparison, heuristics, threat estimation, weighting, prediction, characterization, analysis, ranking, and alert/notification generator system, computing and/or communications device system service provider personal computer (PC) system in one exemplary embodiment, running an operating system such as, e.g., (but not limited to) MICROSOFT® WINDOWS® 10/8.1/8/7/NT/98/2000/XP/CE/ME/VISTA/Windows 10, etc. available from MICROSOFT® Corporation of Redmond, Wash., U.S.A. However, the aspect may not be limited to these platforms. Instead, the aspect may be implemented on any appropriate exemplary computer-implemented exemplary intrusion detection, data logging, analysis, comparison, heuristics, threat estimation, weighting, prediction, characterization, analysis, ranking, and alert/notification generator system, computing and/or communications device system service provider computer system running any appropriate operating system and/or another programming environment. In one exemplary embodiment, the present aspect may be implemented on an exemplary computer-implemented exemplary intrusion detection, data logging, analysis, comparison, heuristics, threat estimation, weighting, prediction, characterization, analysis, ranking, and alert/notification generator system, computing and/or communications device system service provider computer system, including a computer processor, and memory, with instructions stored in the memory configured to be executed on the computer processor, operating as discussed herein. An exemplary computer-implemented exemplary intrusion detection, data logging, analysis, comparison, heuristics, threat estimation, weighting, prediction, characterization, analysis, ranking, and alert/notification generator system, computing and/or communications device system service provider computer system, exemplary computer-implemented energy optimization energy storage device sizing and management system service provider computer 200 may be shown in FIG. 2. Other components of the aspect, such as, e.g., (but not limited to) exemplary computer-implemented exemplary intrusion detection, data logging, analysis, comparison, heuristics, threat estimation, weighting, prediction, characterization, analysis, ranking, and alert/notification generator system, computing and/or communications device system service provider computing device, a communications device, mobile phone, a telephony device, a telephone, a personal digital assistant (PDA), a personal computer (PC), a handheld PC, an interactive television (iTV), a digital video recorder (DVD), a tablet computer, an iPad, an iPhone, an Android phone, a Phablet, a mobile device, a smartphone, a wearable device, a network appliance, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 2. Services may be provided on demand using, e.g., but not limited to, an interactive television (iTV), a video on demand system (VOD), and via a digital video recorder (DVR), or other on demand viewing system.

The exemplary computer-implemented exemplary intrusion detection, data logging, analysis, comparison, heuristics, threat estimation, weighting, prediction, characterization, analysis, ranking, and alert/notification generator system, computing and/or communications device system service provider computer system 200 may include one or more processors, such as, e.g., but not limited to, processor(s) 204 such as, e.g., but not limited to, a CORE i7, or the like, Pentium, QuadCore, Multiprocessor, SOC, Microcontroller, Programmable Logic Controller (PLC), microprocessor, nanoprocessor, quantum computer, etc. The exemplary computer-implemented exemplary intrusion detection, data logging, analysis, comparison, heuristics, threat estimation, weighting, prediction, characterization, analysis, ranking, and alert/notification generator system, computing and/or communications device system service provider processor(s) 204 may be connected and/or coupled to a communication infrastructure 206 (such as, e.g., but not limited to, a communications bus, cross-over bar, or network, etc.). Various exemplary software embodiments may be described in terms of this exemplary computer-implemented exemplary intrusion detection, data logging, analysis, comparison, heuristics, threat estimation, weighting, prediction, characterization, analysis, ranking, and alert/notification generator system, computing and/or communications devices of a service provider computer system. After reading this description, it may become apparent to a person skilled in the relevant art(s) how to implement the aspect using other exemplary computer-implemented exemplary intrusion detection, data logging, analysis, comparison, heuristics, threat estimation, weighting, prediction, characterization, analysis, ranking, and alert/notification generator system, computing and/or communications device system service provider computer systems and/or architectures. According to an exemplary embodiment, the system may include an exemplary computer-implemented exemplary intrusion detection, data logging, analysis, comparison, heuristics, threat estimation, weighting, prediction, characterization, analysis, ranking, and alert/notification generator system, computing and/or communications device service provider and data transformer 234. In an exemplary embodiment, a cryptographic controller 230 may be included, in an exemplary embodiment, and may be used to, e.g., but not limited to, authenticate a user device, and/or provide encryption and/or decryption processing, according to an exemplary embodiment.

Exemplary computer-implemented exemplary intrusion detection, data logging, analysis, comparison, heuristics, threat estimation, weighting, prediction, characterization, analysis, ranking, and alert/notification generator system, computing and/or communications device system service provider computer system 200 may include a display interface 202 that may forward, e.g., but not limited to, graphics, text, and other data, etc., from the communication infrastructure 206 (or from a frame buffer, etc., not shown) for display on the display unit 220, or other output device 218, 234, 220, 234 (such as, e.g., but not limited to, a touchscreen, etc.).

The exemplary computer-implemented exemplary intrusion detection, data logging, analysis, comparison, heuristics, threat estimation, weighting, prediction, characterization, analysis, ranking, and alert/notification generator system, computing and/or communications device system service provider computer system 200 may also include, e.g., but may not be limited to, a main memory 206, random access memory (RAM), and a secondary memory 208, etc. The secondary memory 208 may include, for example, (but not limited to) a hard disk drive 210 and/or a removable storage drive 212, representing a floppy diskette drive, a magnetic tape drive, an optical disk drive, a compact disk drive CD-ROM, etc. The removable storage drive 212 may, e.g., but not limited to, read from and/or write to a removable storage unit 212 in a well-known manner. Removable storage unit 212, 214, also called a program storage device or a computer program product, may represent, e.g., but not limited to, a floppy disk, magnetic tape, solid state disc (SSD), SDRAM, Flash, a thumb device, a USB device, optical disk, compact disk, etc. which may be read from and written to by removable storage drive or media 214. As may be appreciated, the removable storage unit 212, 214 may include a computer usable storage medium having stored therein computer software and/or data. In some embodiments, a "machine-accessible medium" may refer to any storage device used for storing data accessible by a computer. Examples of a machine-accessible medium may include, e.g., but not limited to: a magnetic hard disk; a floppy disk; an optical disk, like a compact disk read-only memory (CDROM) or a digital versatile disk (DVD); a magnetic tape; and/or a memory chip, etc. Communications networking subsystem may be coupled to an electronic network coupled to a data provider, various secure connections allowing electronic receipt of data, and transfer of data to partner systems.

In alternative, exemplary embodiments, secondary memory 1308 may include other similar devices for allowing computer programs or other instructions to be loaded into computer system 200. Such devices may include, for example, a removable storage unit 214 and an interface 220. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 222 such as, e.g., but not limited to, SDRAM, Flash, a thumb device, a USB device, and interfaces 220, which may allow software and data to be transferred from the removable storage unit 222 to computer system 200.

Exemplary computer-implemented intrusion detection, data logging, analysis, comparison, heuristics, threat estimation, weighting, prediction, characterization, analysis, ranking, and alert/notification generator system, computing and/or communications device system service provider computer 200 may also include an input device 216, 234 such as, e.g., (but not limited to) a mouse or other pointing device such as a digitizer, and a keyboard or other data entry device (not shown), or an input sensor device 232, location sensor and/or other sensor 232, such as, e.g., but not limited to, a touch screen, a pressure sensor, an accelerometer, and/or other sensor device such as, e.g., a pressure sensor, a rangefinder, a compass, a camera, accelerometer, gyro, ultrasonic, biometric, secure authentication system, etc.

Exemplary computer-implemented exemplary intrusion detection, data logging, analysis, comparison, heuristics, threat estimation, weighting, prediction, characterization, analysis, ranking, and alert/notification generator system, computing and/or communications device system service provider computer 200 may also include output devices, such as, e.g., (but not limited to) display 230, and display interface 202, or other output device 240, 220, Augmented Reality, Virtual Reality device 234, touchscreen 236. Exemplary computer-implemented energy optimization energy storage device sizing and management system service provider computer 200 may include input/output (I/O) devices such as, e.g., (but not limited to) sensors, touch sensitive, pressure sensitive input systems, accelerometers, and/or communications interface 224, cable 228 and communications path 226, etc. These communications networking devices may include, e.g., but not limited to, a network interface card, and modems (neither are labeled).

From a data model, which may automate the process of creating an exemplary computer-implemented energy optimization energy storage device sizing and management system service provider computer system 254, may process incoming electronic data and transform the data into exemplary intrusion detection, data logging, analysis, comparison, heuristics, threat estimation, weighting, prediction, characterization, analysis, ranking, and alert/notification generator system, computing and/or communications device system pages, and/or related social media posts, and then provide the transformed data, in the form of data indicative of the one or more exemplary computer-implemented exemplary intrusion detection, data logging, analysis, comparison, heuristics, threat estimation, weighting, prediction, characterization, analysis, ranking, and alert/notification generator system, computing and/or communications device system posts, cumulative exemplary computer-implemented system goals, exemplary computer-implemented exemplary intrusion detection, data logging, analysis, comparison, heuristics, threat estimation, weighting, prediction, characterization, analysis, ranking, and alert/notification generator system, computing and/or communications device amounts, electronic database, and electronic funds process and disbursement information, and processing to initiate electronic disbursement, and can be provided to an electronic decision support system (DSS) 258, and/or computer database management system (DBMS) 260 (which can be a relational database, and/or use a graph database, an SQL database, a noSQL database, and/or other social networking and/or graph database, and/or electronic interactive, graphical user interface (GUI) system 262 (not shown). Each of the exemplary DSS 258, DBMS 260 and/or EIGUI system 262, can then, using e.g., but not limited to, a cryptographic processor and/or a crypto chip controller, or the like, then encrypt the data using electronic encryptor 264, which can make use of one or more cryptographic algorithm electronic logic 266, which can include encryption code, a cryptographic combiner, etc., and may be stored in encrypted form, according to an exemplary embodiment, in a computer database storage facility, from computer database storage device 268, and from there the process may continue with use of the cryptographic algorithm electronic logic 270, and electronic decryptor 272, which may decrypt and/or provide a process for decrypting encrypted data, and/or by providing such data to the DSS 258, the DBMS 260, or the EIGUI 262, if authorized (not shown). By using encryption/decryption, certain algorithms may be used, as described above, including, e.g., but not limited to, AES encryption, RSA, PKI, TLS, FTPS, SFTP, etc. and/or other cryptographic algorithms and/or protocols.

In the following description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

An exemplary computer-implemented energy optimization energy storage device sizing and management system service provider processing may include algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it may be appreciated that throughout the specification discussions utilizing terms such as, e.g., but not limited to, "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term exemplary computer-implemented energy optimization energy storage device sizing and management system service provider "system" or "processor" "system on a chip" "microcontroller" "multi-core" may refer to any device or portion of a device that processes electronic data from registers and/or memory to transform that electronic data into other electronic data that may be stored in registers and/or memory. An exemplary computer-implemented energy optimization energy storage device sizing and management system service provider "computing platform" may comprise one or more processors.

Embodiments of the present aspect may include exemplary computer-implemented energy optimization energy storage device sizing and management system service provider apparatuses for performing the operations herein. An apparatus may be specially constructed for the desired purposes, selectively activated or reconfigured by an exemplary computer-implemented exemplary intrusion detection, data logging, analysis, comparison, heuristics, threat estimation, weighting, prediction, characterization, analysis, ranking, and alert/notification generator system, computing and/or communications device system service provider program stored in the device in coordination with one or more special purpose data sensors.

In yet another exemplary embodiment, the aspect may be implemented using a combination of any of, e.g., but not limited to, hardware, firmware and software, etc.

In one or more embodiments, the present embodiments are embodied in machine-executable instructions. The instructions may be used to cause exemplary computer-implemented exemplary intrusion detection, data logging, analysis, comparison, heuristics, threat estimation, weighting, prediction, characterization, analysis, ranking, and alert/notification generator system, computing and/or communications device system service provider processing device, for example a special-purpose exemplary computer-implemented exemplary intrusion detection, data logging, analysis, comparison, heuristics, threat estimation, weighting, prediction, characterization, analysis, ranking, and alert/notification generator system, computing and/or communications device system service provider processor, which is programmed with the exemplary computer-implemented exemplary intrusion detection, data logging, analysis, comparison, heuristics, threat estimation, weighting, prediction, characterization, analysis, ranking, and alert/notification generator system, computing and/or communications device system service provider instructions, to perform the steps of the present aspect. Alternatively, the steps of the present aspect may be performed by specific exemplary computer-implemented exemplary intrusion detection, data logging, analysis, comparison, heuristics, threat estimation, weighting, prediction, characterization, analysis, ranking, and alert/notification generator system, computing and/or communications device system service provider hardware components that contain hardwired logic for performing the steps, or by any combination of programmed computer components and custom hardware components. For example, the present aspect may be provided as exemplary intrusion detection, data logging, analysis, comparison, heuristics, threat estimation, weighting, prediction, characterization, analysis, ranking, and alert/notification generator system, computing and/or communications device system service provider computer program product, as outlined above. In this environment, the embodiments may include a machine-readable medium having exemplary computer-implemented exemplary intrusion detection, data logging, analysis, comparison, heuristics, threat estimation, weighting, prediction, characterization, analysis, ranking, and alert/notification generator system, computing and/or communications device system service provider instructions stored on it. The exemplary computer-implemented exemplary intrusion detection, data logging, analysis, comparison, heuristics, threat estimation, weighting, prediction, characterization, analysis, ranking, and alert/notification generator system, computing and/or communications device system service provider may be used to program any processor or processors (or other electronic devices) to perform a process or method according to the present exemplary embodiments. In addition, the present aspect may also be downloaded and stored on a computer program product. Here, the program may be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

Exemplary wireless protocols and technologies used by a communications network may include BLUETOOTH, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies may be used.

The embodiments may be employed across different generations of exemplary special purpose index construction wireless devices. This includes 1G-5G according to present paradigms. 1G refers to the first generation wide area wireless (WWAN) communications systems, dated in the 1970s and 1980s. These devices are analog, designed for voice transfer and circuit-switched, and include AMPS, NMT and TACS. 2G refers to second generation communications, dated in the 1990s, characterized as digital, capable of voice and data transfer, and include HSCSD, GSM, CDMA IS-95-A and D-AMPS (TDMA/IS-136). 2.5G refers to the generation of communications between 2G and 3 G. 3G refers to third generation communications systems recently coming into existence, characterized, for example, by data rates of 144 Kbps to over 2 Mbps (high speed), being packet-switched, and permitting multimedia content, including GPRS, 1.times.RTT, EDGE, HDR, W-CDMA. 4G refers to fourth generation and provides an end-to-end IP solution where voice, data and streamed multimedia may be served to users on an "anytime, anywhere" basis at higher data rates than previous generations, and will likely include a fully IP-based and integration of systems and network of networks achieved after convergence of wired and wireless networks, including computer, consumer electronics and communications, for providing 100 Mbit/s and 1 Gbit/s communications, with end-to-end quality of service and high security, including providing services anytime, anywhere, at affordable cost and one billing. 5G refers to fifth generation and provides a complete version to enable the true World Wide Wireless Web (WWWW), i.e., either Semantic Web or Web 3.0, for example. Advanced technologies may include intelligent antenna, radio frequency agile systems, and flexible modulation schemes to optimize ad-hoc wireless networks.

Furthermore, the exemplary computer-implemented exemplary intrusion detection, data logging, analysis, comparison, heuristics, threat estimation, weighting, prediction, characterization, analysis, ranking, and alert/notification generator system, computing and/or communications device system service provider processes and processors need not be located at the same physical locations. In other words, each processor may be executed at one or more geographically distant processor, over for example, a LAN or WAN connection. A great range of possibilities for practicing the exemplary special purpose index construction embodiments may be employed, using different networking hardware and software configurations from the ones above mentioned. Although described with reference to an application server and/or a web-based browser-enabled environment, such as, e.g., but not limited to, a JAVA environment, the application could also be implemented in a client server architecture, or as a mobile based app running on iOS or Android, or the like, and may interact with a server of exemplary computer-implemented energy optimization energy storage device sizing and management system service provider via communication network technology. Also, it is important to note that reference to an electronic network component, is not to require only electronic components, but could also integrate with other common networking equipment including, e.g., but not limited to, optical networking equipment, optical fiber, ATM, SONET, etc.

According to one exemplary embodiment, the exemplary intrusion detection, data logging, analysis, comparison, heuristics, threat estimation, weighting, prediction, characterization, analysis, ranking, and alert/notification generator system, computing and/or communication device system service provider may be integrated with mobile devices which can run an exemplary an example graphical user interface (GUI) of an exemplary smartphone, and/or mobile phone, and/or computer application, and/or tablet application, and/or Phablet application, etc., application can transmit and/or receive data to and/or from an example mobile exemplary computer-implemented energy optimization energy storage device sizing and management system application device and/or server, in various embodiments. Various exemplary GUI elements can be provided, including icons and/or buttons, which may provide certain functionality relating to the exemplary computer-implemented energy optimization energy storage device sizing and management system, according to an exemplary embodiment. Various exemplary GUI elements may include exemplary scroll bars for scrolling through exemplary lists of exemplary computer-implemented energy optimization energy storage device sizing and management system features, and/or lists of particular GUI element options, according to an exemplary embodiment. Various exemplary embodiments of the system may include, e.g., but not limited to, enhanced interactive features such as, e.g., but not limited to, Web 2.0, social networking posts and/or friend authentication and sharing features, enhanced security offer and acceptance of authorized user(s), ability to interact with other users in social media posts, enhanced demographically and/or psychographically targeted advertisements and/or content, a graph database based scalable back office system for managing a large scalable database of users, and/or social media posts, social media profiles for each user, ability to provide ratings and/or emoji and/or other interaction between users, and/or rating of users, comment posting, sharing, and/or electronically enabled micro-fundraising, and/or donations and/or tracking of funds raised using real currency, and/or foreign currency equivalents, including, e.g., but not limited to, cryptocurrencies, real currencies, electronic ledgers, block-chain ledgers, foreign currencies, mobile currencies according to various exemplary embodiments.

According to an exemplary embodiment, a burst-timeplan may include reservation allocation plans allowing an exemplary PP to allocate all slots on the D-TDMA frame. In an embodiment, an exemplary BTP is the slot allocation plan for the next D-TDMA.

According to a further embodiment, a cross polarization test may be used to measure cross-pol isolation, according to an exemplary embodiment.

According to a further embodiment, a cross polarization test example may be used in antenna pointing. This may be employed to indicate an exemplary isolation between an exemplary vertical polarization component and an exemplary horizontal polarization component. This may be used to measure cross-pol isolation.

Figure 3:
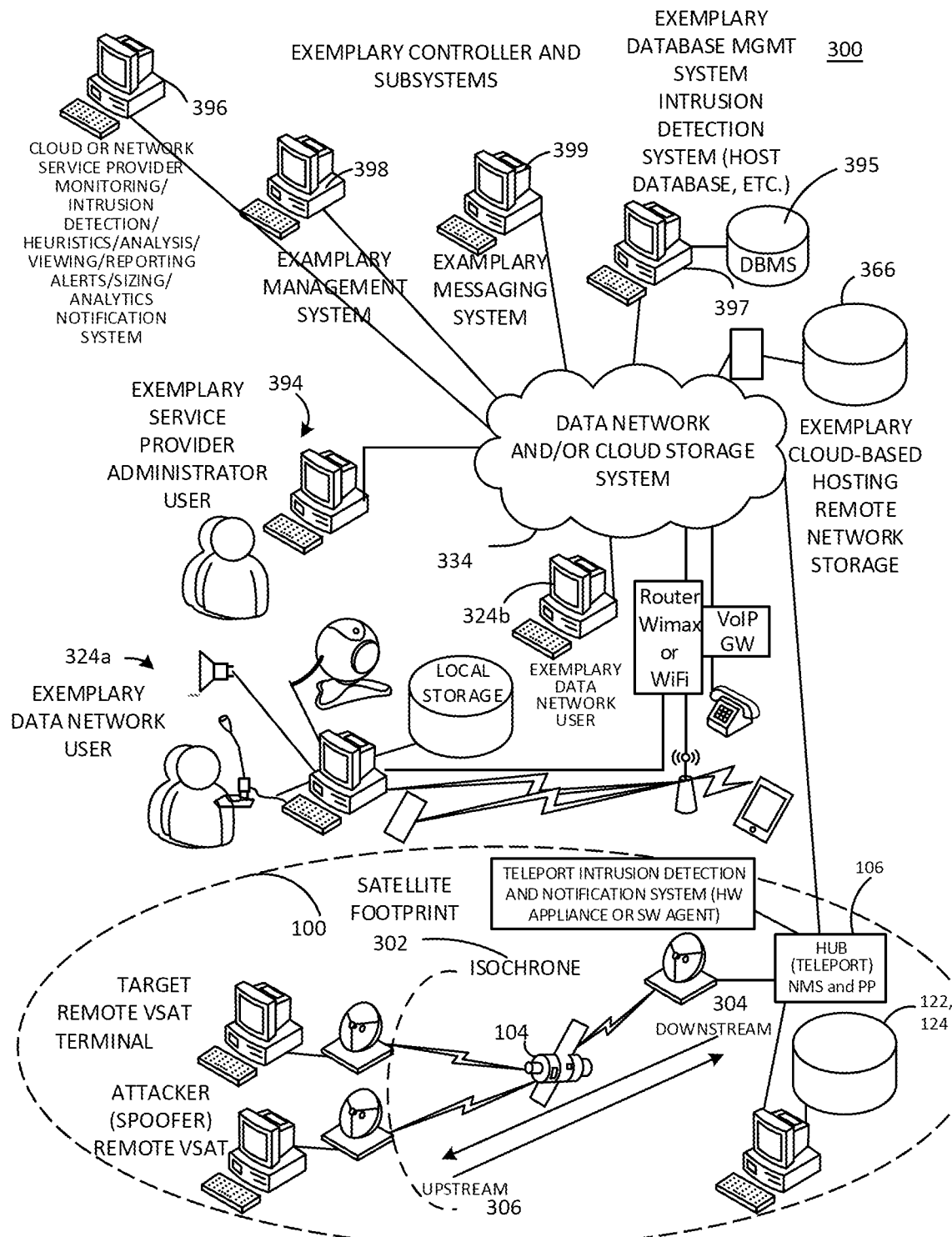
FIG. 3 depicts an exemplary communication system environment and exemplary VSAT network system including an exemplary central earth station hub coupled via an exemplary VSAT satellite network to a plurality of exemplary remote VSAT user terminals and an exemplary intrusion detection monitoring, logging, analysis, heuristics, threat estimation, prediction, characterization, weighting, analysis, storing, comparing, alert/notification generation and reporting according to an aspect of the application.

FIG. 3 depicts a block diagram 300 illustrating an exemplary communication system environment and exemplary VSAT network system including a central earth station hub coupled via a VSAT satellite network to a plurality of remote VSAT user terminals and an intrusion detection system for monitoring, logging, analysis, heuristics, threat estimation, prediction, characterization, weighting, analysis, storing, comparing, alert/notification generation and reporting.

Figure 4:
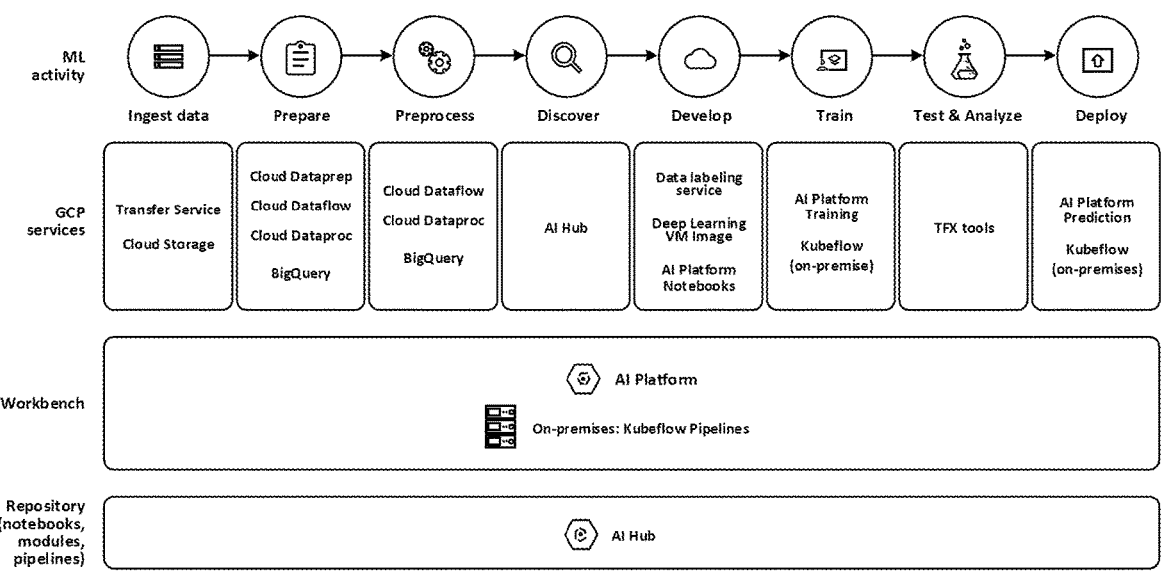
FIG. 4 depicts an exemplary artificial intelligence (AI) platform, according to an aspect of the application.

FIG. 4 depicts an exemplary embodiment of an exemplary diagram 400 an exemplary artificial intelligence (AI) platform and non-limiting machine learning (ML) platform enabling development of ML projects from ideation to production and deployment, enabling data engineering, flexibility, and an integrated tool chain for building and running ML predictive analytics applications, supporting a KUBEFLOW open-source platform, allows building portable ML pipelines, which can run on-premises or on cloud without significant code change, and including TENSORFLOW, TPUs, and TFX tools as enabling deployment of production AI applications, according to an exemplary embodiment.

Figure 5:
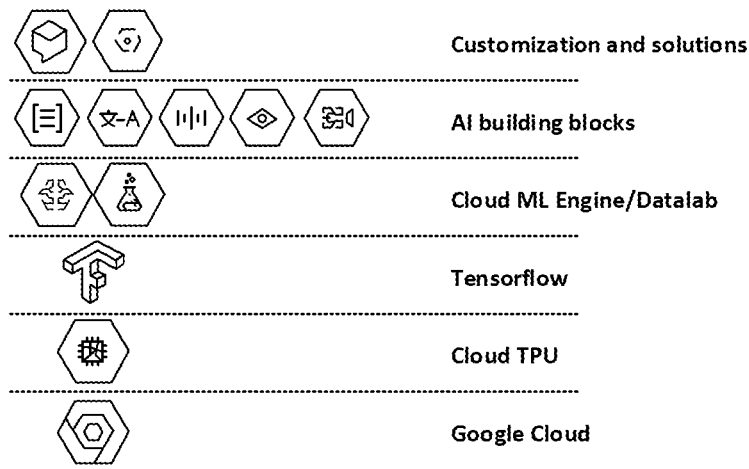
FIG. 5 depicts an exemplary cloud AI technology stack as may be used to implement any of various exemplary embodiments according to an aspect of the application.

FIG. 5 depicts an exemplary embodiment of an exemplary FIG. 500 illustrating an exemplary cloud AI technology stack as may be used to implement any of various exemplary embodiments.

Intrusion Detection System

Figure 6A:
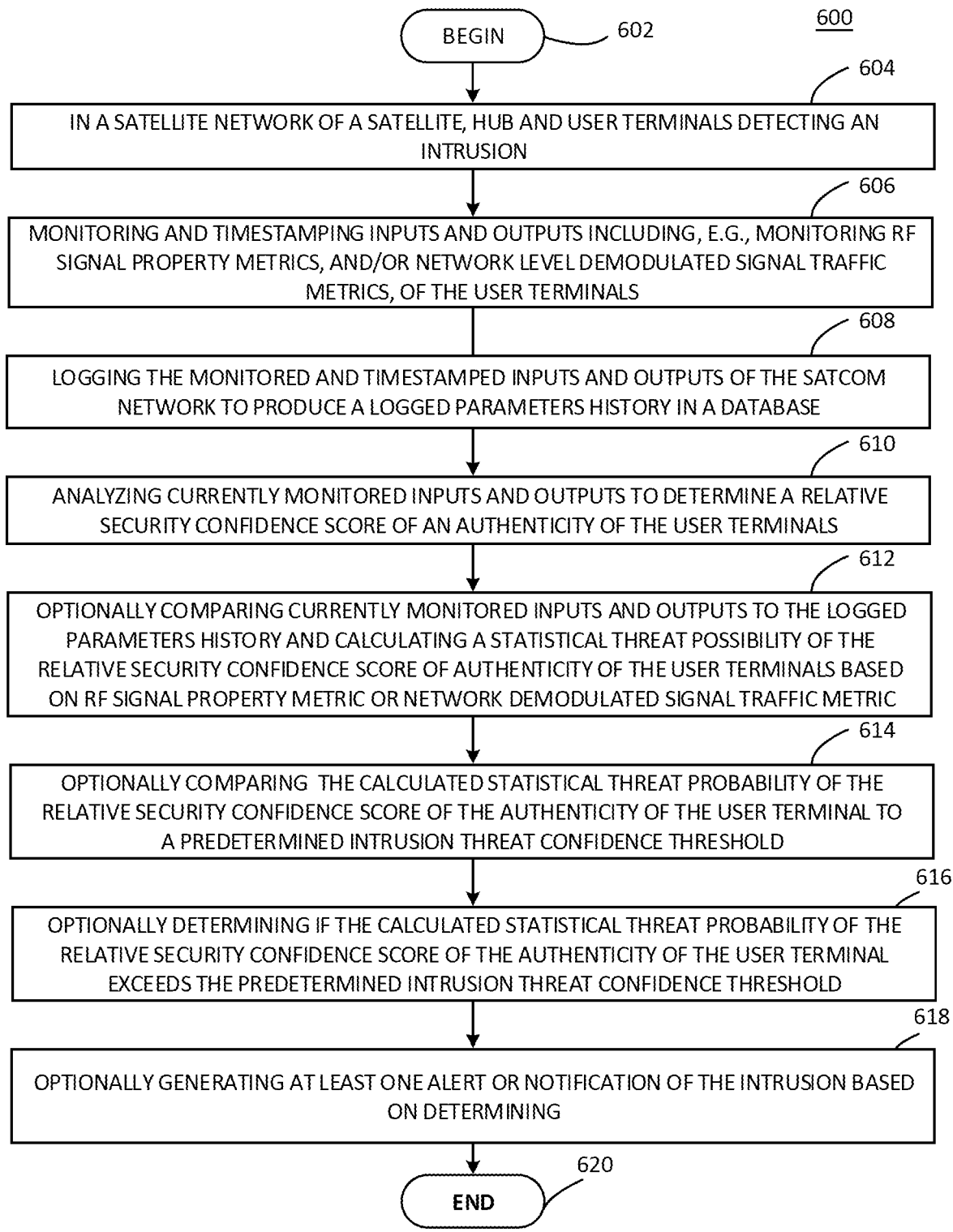
FIG. 6A depicts an exemplary flow diagram illustrating an exemplary intrusion detection system functional workflow according to an aspect of the application.

According to yet even a further aspect of the application, FIG. 6A depicts an exemplary flow diagram 600 illustrating an intrusion detection system functional workflow, according to an exemplary embodiment. Flow diagram 600 may begin with 602 and may continue immediately with step 604.

In 604, in an example satellite communications network, which may include a satellite, a hub, and one or more user terminals, a system, method and/or computer program product may be provided to provide an exemplary intrusion detection method, system, and/or computer program product, according to an exemplary embodiment. From 604, flow diagram 600 may continue with 606.

In 606, in the example satellite communications network, the system, method and/or computer program product may include the exemplary intrusion detection method may include, e.g., but not limited to, monitoring and timestamping inputs and outputs including, e.g., monitoring RF signal property metrics, and/or network level demodulated signal traffic metrics, of the user terminals, according to an exemplary embodiment. From 606, flow diagram 600 may continue with 608.

In 608, in the example satellite communications network, the system, method and/or computer program product may include the exemplary intrusion detection method may include, e.g., but not limited to, logging the monitored and timestamped inputs and outputs of the SATCOM network to produce an example logged parameters history in an example database, according to an exemplary embodiment. From 608, flow diagram 600 may continue with 610.

In 610, in the example satellite communications network, the system, method and/or computer program product may include the exemplary intrusion detection method may include, e.g., but not limited to, analyzing currently monitored inputs and outputs to determine a relative security confidence score of an authenticity of the user terminals, according to an exemplary embodiment. From 610, flow diagram 600 may continue with 612.

In 612, in the example satellite communications network, the system, method and/or computer program product may include the exemplary intrusion detection method may include, e.g., but not limited to, optionally comparing currently monitored inputs and outputs to the logged parameters history and calculating a statistical threat possibility of the relative security confidence score of authenticity of the user terminals based on RF signal property metric or network demodulated signal traffic metric, according to an exemplary embodiment. From 612, flow diagram 600 may continue with 614.

In 614, in the example satellite communications network, the system, method and/or computer program product may include the exemplary intrusion detection method may include, e.g., but not limited to, optionally comparing the calculated statistical threat probability of the relative security confidence score of the authenticity of the user terminal to a predetermined intrusion threat confidence threshold, according to an exemplary embodiment. From 614, flow diagram 600 may continue with 616.

In 616, in the example satellite communications network, the system, method and/or computer program product may include the exemplary intrusion detection method may include, e.g., but not limited to, optionally determining if the calculated statistical threat probability of the relative security confidence score of the authenticity of the user terminal exceeds the predetermined intrusion threat confidence, according to an exemplary embodiment. From 616, flow diagram 600 may continue with 618.

In 618, in the example satellite communications network, the system, method and/or computer program product may include the exemplary intrusion detection method may include, e.g., but not limited to, optionally generating at least one alert or notification of the intrusion based on determining, according to an exemplary embodiment. From 618, flow diagram 600 may continue with 620.

In 620, flow diagram 600 may immediately end, according to an exemplary embodiment.

Figure 6B:
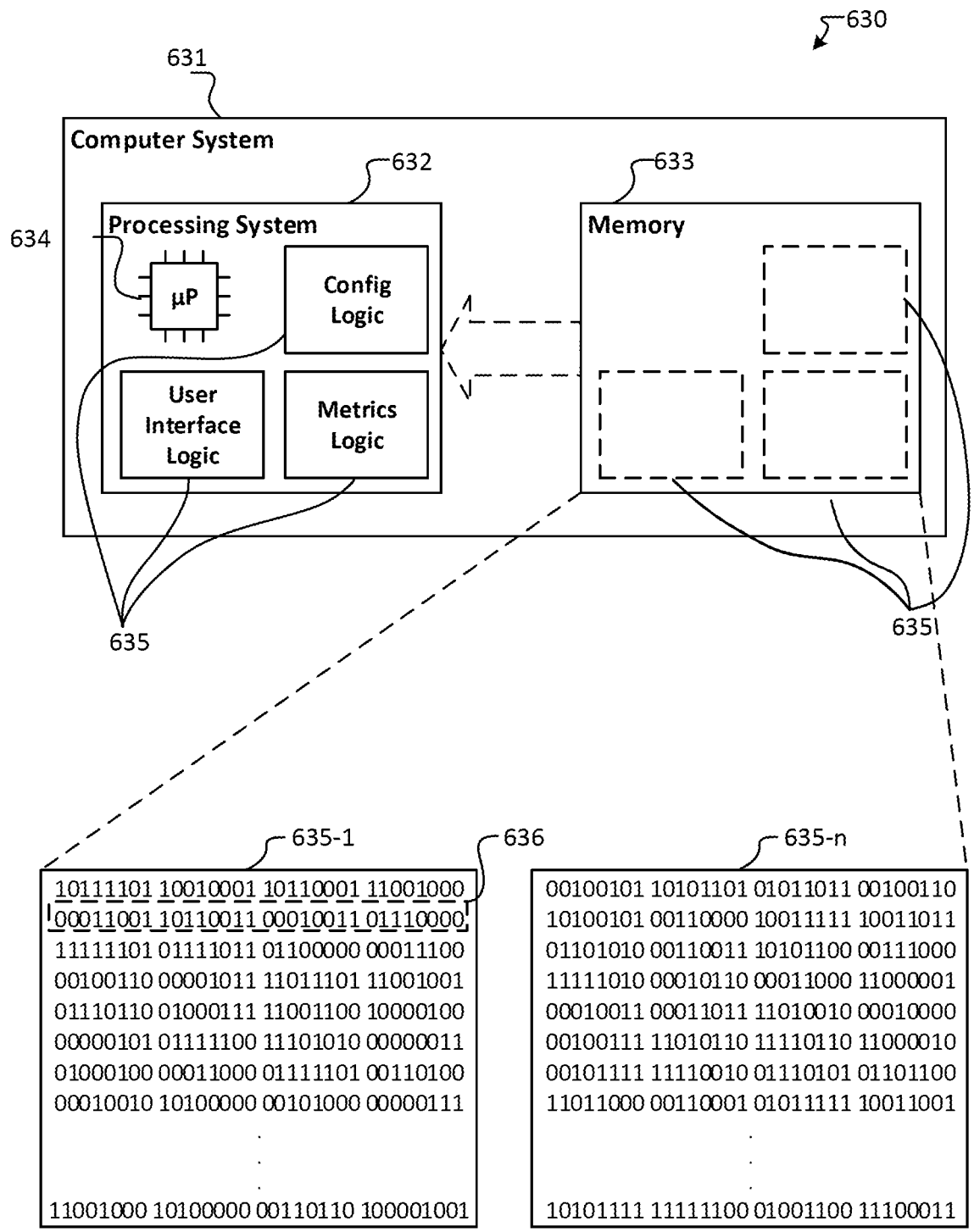
FIG. 6B depicts an exemplary implementation of an intrusion detection appliance according to an aspect of the application.

According to another embodiment, a network intrusion detection appliance may be implemented as a computer system 630 as exemplarily depicted in FIG. 6B. In this implementation, a computer system 631 may include at least a memory 633 and a processing system 632. In general, the memory will store, at one time or another, at least portions of an executable program code such as software modules 635-1 through 635-n, and the processing system will execute one or more instructions included in that executable program code, such as machine code 636. The processing system 632 includes at least one hardware processor 634, and in other examples includes multiple processors and/or multiple processor cores. The processing system 632 in yet another example includes processors from different devices working together.

In an embodiment, the intrusion detection appliance 630 may be embodied in a computer program product. A computer program product is an article of manufacture that has a computer-readable medium with software adapted to enable a processing system to perform various operations and actions. Here, implementations of the approach and operations of the intrusion detection appliance 630 may, at one stage, be statements written in a computer language. Such computer language statements, when made executable by a compiler or the like and then executed by the computer, or when interpreted and subsequently executed, cause the computer to act in accordance with the particular content of the statements.

Software may be stored on a computer-readable medium. Some computer-readable media are transitory and some are non-transitory. Examples of non-transitory computer-readable media include portable storage such as an optical disc, a USB disk, a USB stick, a flash disk, an external SSD, a compact flash card, an SD card, and the like. Other examples of non-transitory computer-readable media include secondary storage such as an internal hard drive, an internal SSD, internal flash memory, internal non-volatile memory, internal DRAM, ROM, RAM, and the like. Another example of a non-transitory computer-readable medium is the primary storage of a computer system when large enough to store and when used to store all of a given software. Yet other examples may be developed in the future.

Although the software is "written on" a disc, "embodied in" an integrated circuit, "carried over" a communications circuit, "stored in" a memory chip, or "loaded in" a cache memory, it will be appreciated that, for this application, the software will be referred to simply as being "in" or "on" the computer-readable medium. The terms "in" or "on" are intended to encompass the above mentioned and all equivalent and possible ways software is associated with a computer-readable medium.

The interrelationship between the executable software instructions and the hardware processor is structural. The instructions per se are simply a series of symbols or numeric values that do not intrinsically convey any information. It is the hardware processor, which by design was preconfigured to interpret the symbols or numeric values that imparts meaning to the instructions.

The hardware processor may be configured when designed so as to perform a predefined set of basic operations in response to receiving a corresponding basic instruction selected from a predefined native instruction set of codes.

The software modules or logic generally are made executable before the hardware processor may perform the operations designed into the software. The process of making the logic executable by a hardware processor, a process known to those familiar with this technical field as compilation or interpretation, is not the subject of this application and is well known in the field, and therefore will not be described in any detail here. When logic is made executable for a hardware processor, the logic is necessarily changed into machine codes that are selected from the predefined native instruction set of codes that may be carried out by the given hardware processor.

The logic described below, when made executable, therefore includes a respective set of machine codes selected from the native instruction set.

Returning to FIG. 6B, the processing system 632 may include a hardware processor 634. If the implementation is on a device such as a server, the hardware processor may for example be an INTEL XEON processor or similar, which itself contains multiple central processing unit (CPU) cores, graphics cores, various levels of cache memory, and numerous buffers. Other modern computer systems include other processing systems of other configurations.

Logic 635 may be implemented in hardware, in software, or a combination of the two. When implemented in hardware, the logic 635 may be under control of the processing system 14. When implemented in software, for example, software module 635-1 of the logic 635 may be loaded into or stored in memory, and then executed by the hardware processor of the processing system as and when necessary; this arrangement is represented by the dashed-line boxes within memory and the dotted-line arrow that bridges memory with processing system.

In FIG. 6B, the hardware processor may operates on machine codes that have a length of thirty-two bits. A given machine code 636 appears within a dashed-line box inside of software module 635-1. The machine code 636 has thirty-two bits, as do other valid machine codes that may be selected from the predefined native instruction set of codes available for hardware processor. This particular choice of a given instruction is for the sake of a teaching example only; modern hardware processors may employ sixty-four bits for a single-word instruction and may employ instructions that are more than one word in length.

The logic 636 includes, for example, Config Logic, Metrics Logic, and User Interface Logic among other software modules not shown due to the lack of space. These modules of logic 636 are merely examples of an implementation and are not intended to be limitative. The software modules 635-1 through 635-n have a respective set of machine codes, such as the machine code 636, which are selected from the native instruction set of the hardware processor.

Figure 6C:
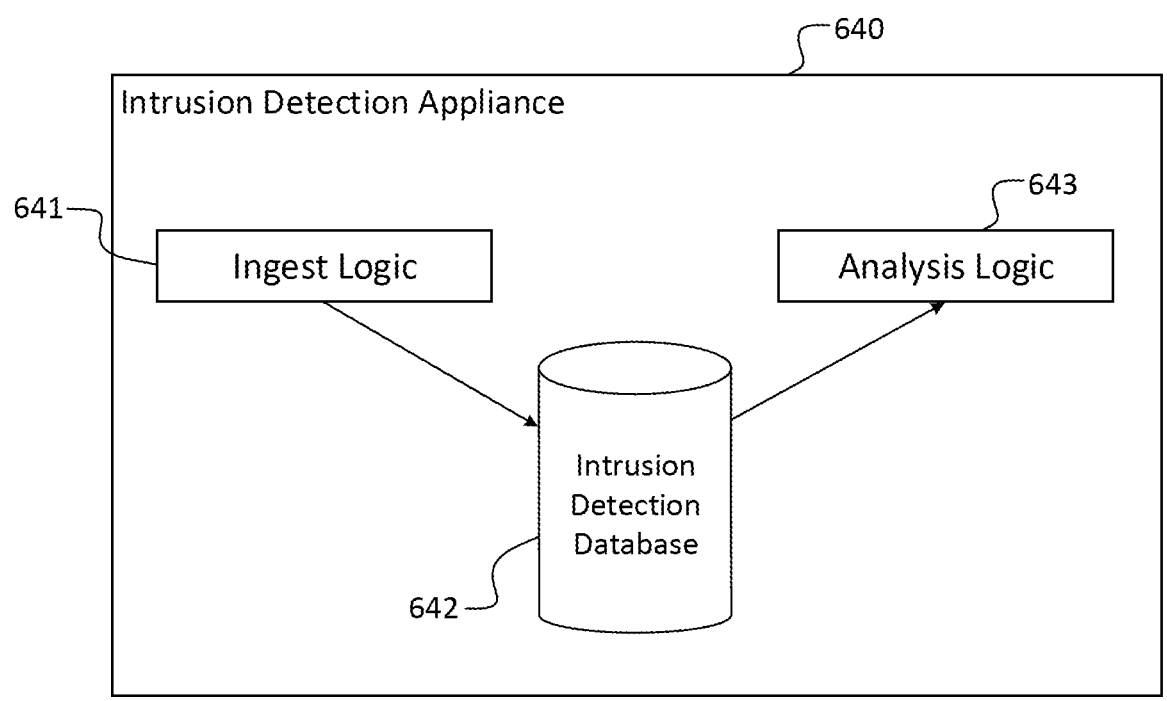
FIG. 6C depicts an exemplary architecture of an intrusion detection appliance according to an aspect of the application.

In even another embodiment, FIG. 6C illustrates the intrusion detection appliance 23 (referred to in this embodiment as 640), which has an ingest logic 641 an analysis logic 643, and an intrusion detection database 642. This depiction is just an example. The intrusion detection appliance 640 need not be contained in one "box" as the name might imply, although nothing prevents such an implementation. For example, in one variation, the ingest logic is separate from (also referred to as being remote from) the analysis logic 643 and/or the intrusion detection database 642. In another alternative implementation, the intrusion detection database 642 is a remote, cloud-based database accessible via the internet, for example.

Figure 6D:
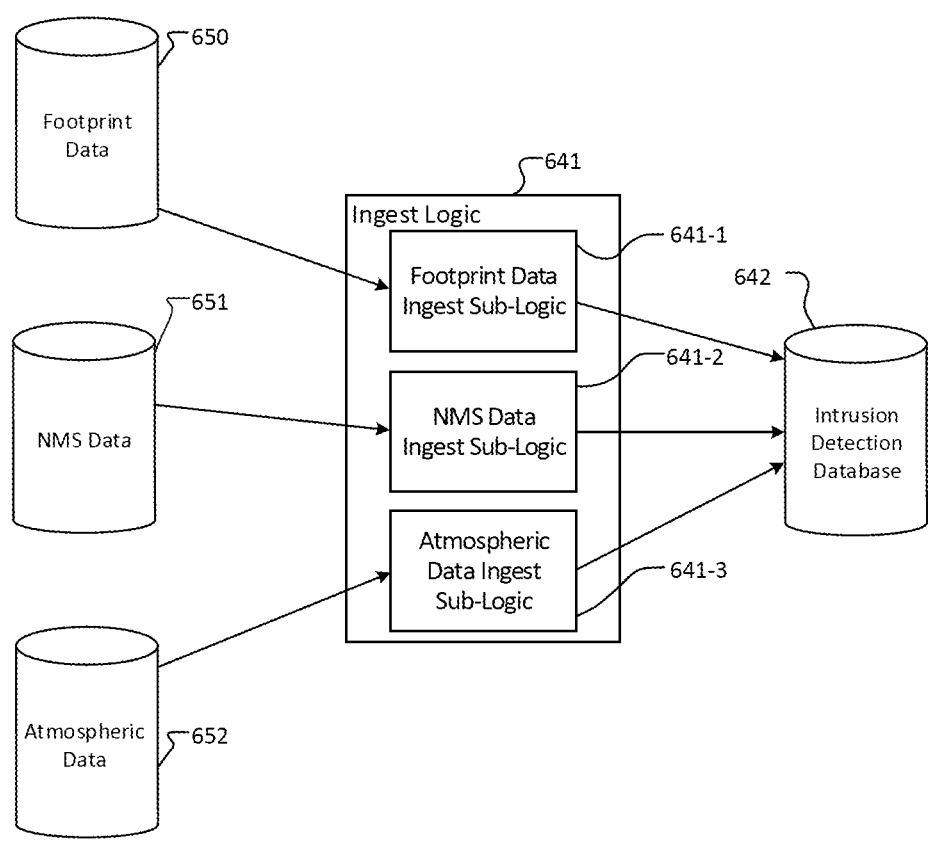
FIG. 6D depicts functionality of ingest logic of an intrusion detection appliance according to an aspect of the application.

According to another embodiment as shown in FIG. 6D, ingest logic 641 of an intrusion detection appliance 640 may collect, reformat, and store relevant data into the intrusion detection database 642 for subsequent use by the analysis logic 643. The ingest logic 641 may for example collect footprint data 650, NMS data 651 and atmospheric data 652. In the ingest logic 641, reformatted footprint data 650 may include footprint data ingest sub-logic 641-1. Additionally in the ingest logic 641, reformatted NMS data 651 may include NMS data ingest sub-logic 641-2. Further in the ingest logic 641, reformatted atmospheric data 652 may include atmospheric data ingest sub-logic 641-3. As shown in FIG. 6D, each of these sub-logics may be transmitted to the intrusion detection database 642.

Figure 6E:
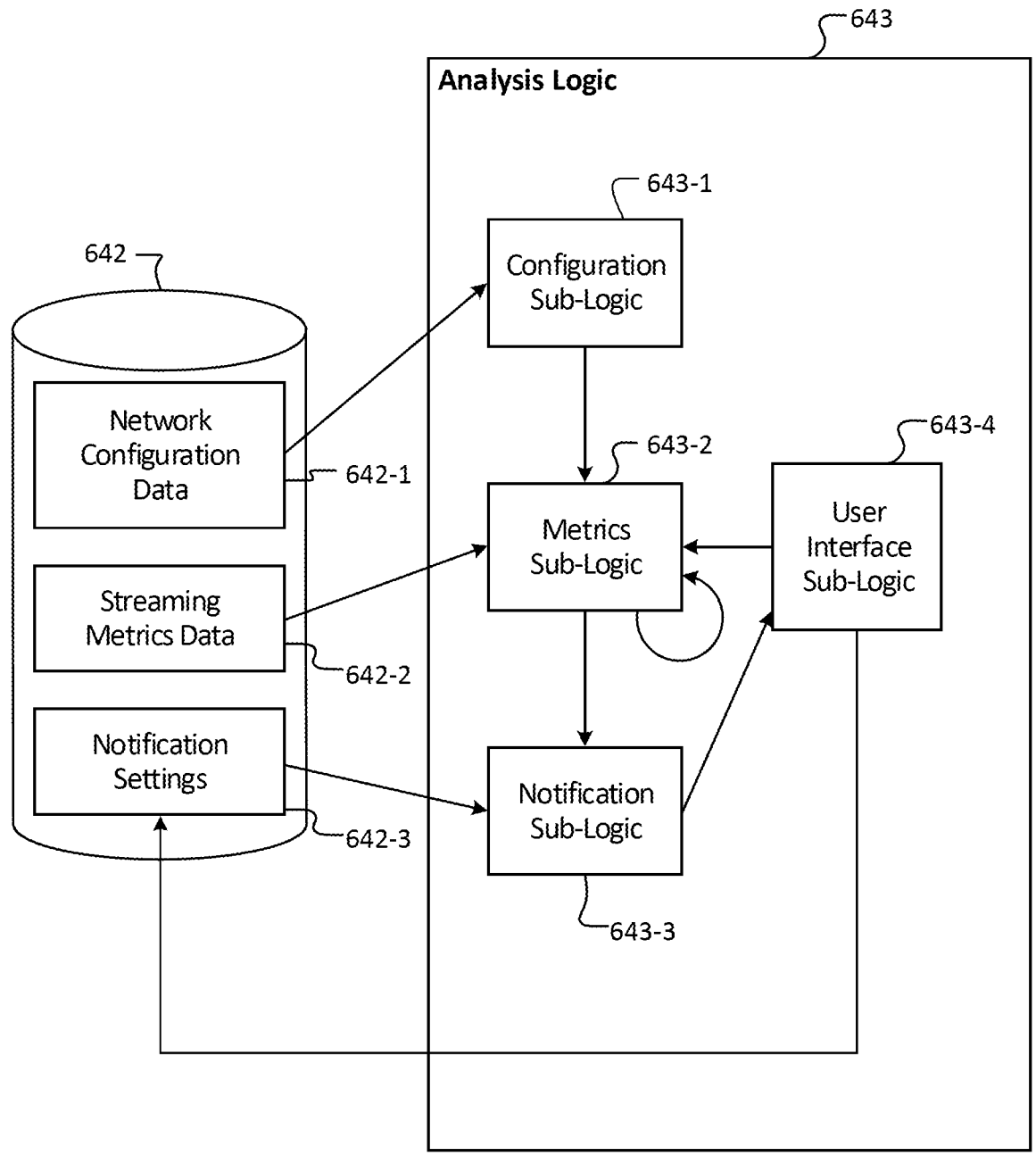
FIG. 6E depicts functionality of analysis logic of an intrusion detection appliance according to an aspect of the application.

According to yet even another embodiment as shown in FIG. 6E, the network intrusion detection database 642 includes network configuration data 642-1, streaming metrics data 642-2 and notification settings 642-3. Each of these respective data types may be transmitted to the analysis logic 643 to a configuration sub-logic. Namely, network configuration data 642-1 may be transmitted, reformatted and/or stored under configuration sub-logic 643-1. Additionally, streaming metrics data 642-2 may be transmitted, reformatted and/or stored under metrics sub-logic 643-2. Further, notification settings 642-3 may be transmitted, reformatted and/or stored under notification sub-logic 643-3.

As shown in FIG. 6E, user interface sub-logic 643-4 receives a notification sub-logic 643-3, and transmits data to metrics sub-logic 643-2. Metric sub-logic 643-2 also receives data from configuration sub-logic 643-1.

Figure 7:
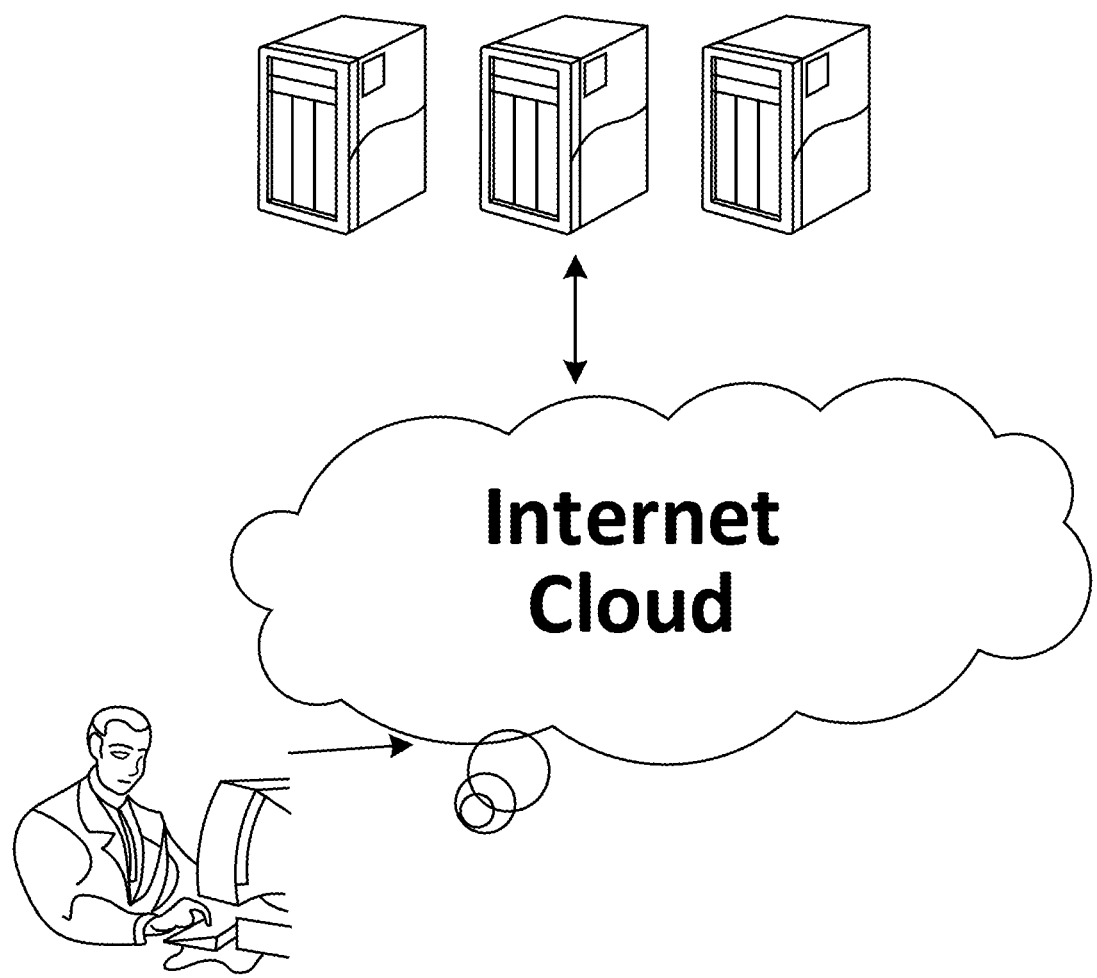
FIG. 7 depicts a cloud-hosted application server system according to an aspect of the application.
Figure 8:
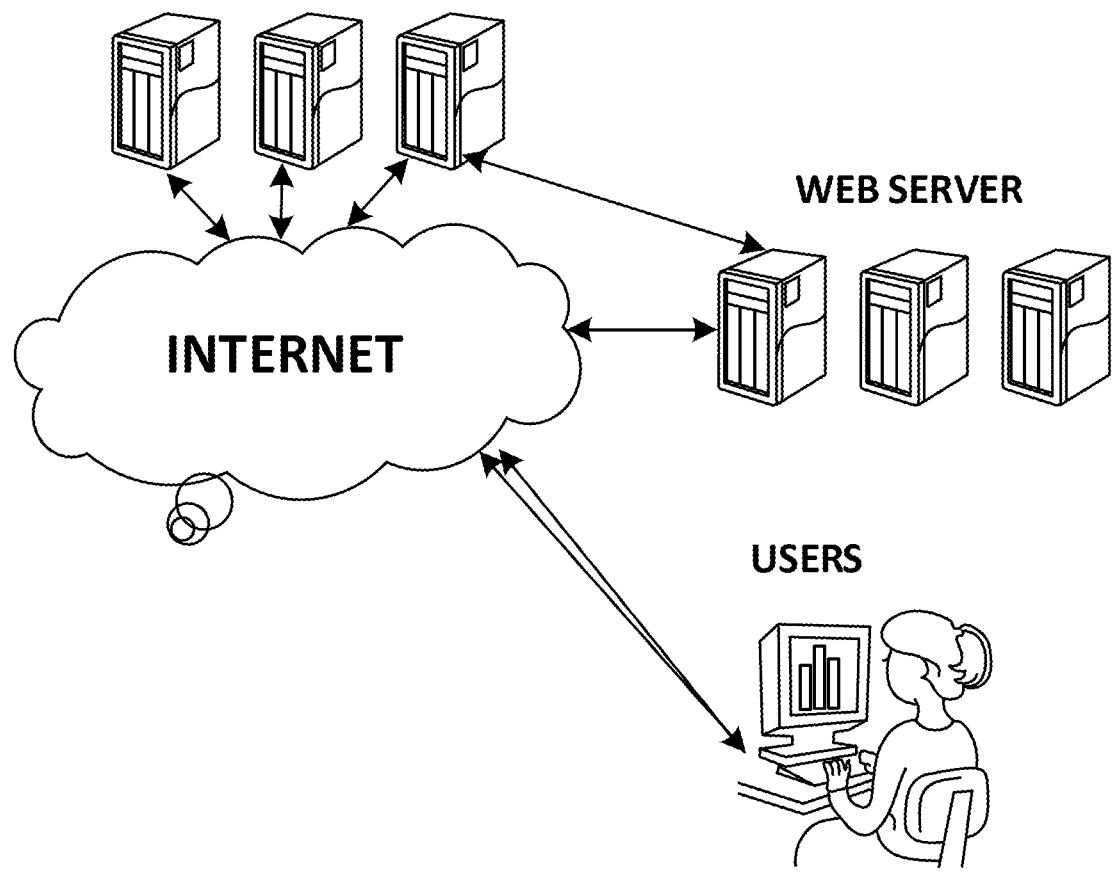
FIG. 8 depicts an exemplary web browser-based application server system according to an aspect of the application.

According to even further embodiments, FIG. 7 depicts an exemplary cloud-hosted application server system 700. FIG. 8 depicts an exemplary web browser-based application server exemplary system 800. Each of these embodiments provides an exemplary intrusion detection system with computer-implemented systems.

Machine Learning Model

Figure 9:
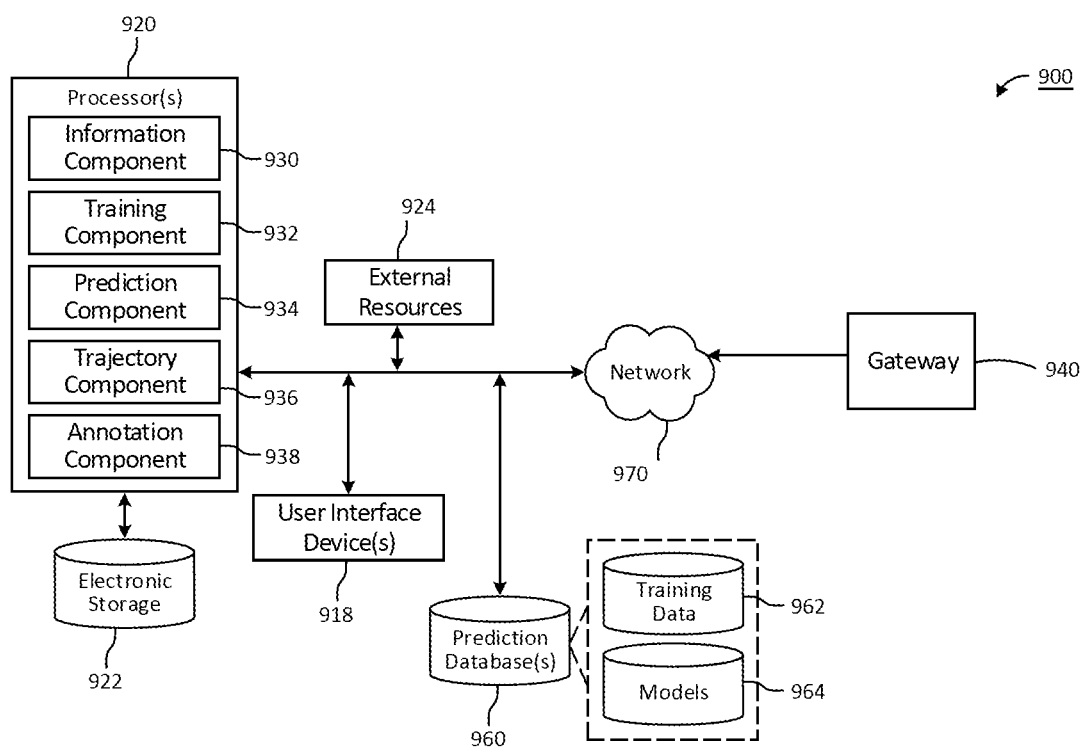
FIG. 9 depicts an exemplary machine learning model including training data according to an aspect of the application.

According to even a further aspect, the ML model shown in the exemplary embodiment in FIG. 9, the terms artificial neural network (ANN) and neural network (NN) may be used interchangeably. An ANN may be configured to determine a classification (e.g., threat) based on identified information. An ANN is a network or circuit of artificial neurons or nodes, and it may be used for predictive modeling. The prediction models may be and/or include one or more neural networks (e.g., deep neural networks, artificial neural networks, or other neural networks), other ML models, or other prediction models.

Disclosed implementations of ANNs may apply a weight and transform the input data by applying a function, where this transformation is a neural layer. The function may be linear or, more preferably, a nonlinear activation function, such as a logistic sigmoid, Tanh, or ReLU function. Intermediate outputs of one layer may be used as the input into a next layer. The neural network through repeated transformations learns multiple layers that may be combined into a final layer that makes predictions. This training (i.e., learning) may be performed by varying weights or parameters to minimize the difference between predictions and expected values. In some embodiments, information may be fed forward from one layer to the next. In these or other embodiments, the neural network may have memory or feedback loops that form, e.g., a neural network. Some embodiments may cause parameters to be adjusted, e.g., via back-propagation.

An ANN is characterized by features of its model, the features including an activation function, a loss or cost function, a learning algorithm, an optimization algorithm, and so forth. The structure of an ANN may be determined by a number of factors, including the number of hidden layers, the number of hidden nodes included in each hidden layer, input feature vectors, target feature vectors, and so forth. Hyperparameters may include various parameters which need to be initially set for learning, much like the initial values of model parameters. The model parameters may include various parameters sought to be determined through learning. In an exemplary embodiment, hyperparameters are set before learning and model parameters can be set through learning to specify the architecture of the ANN.

Learning rate and accuracy of an ANN rely not only on the structure and learning optimization algorithms of the ANN but also on the hyperparameters thereof. Therefore, in order to obtain a good learning model, it is important to choose a proper structure and learning algorithms for the ANN, but also to choose proper hyperparameters.

The hyperparameters may include initial values of weights and biases between nodes, mini-batch size, iteration number, learning rate, and so forth. Furthermore, the model parameters may include a weight between nodes, a bias between nodes, and so forth.

In general, the ANN is first trained by experimentally setting hyperparameters to various values. Based on the results of training, the hyperparameters may be set to optimal values that provide a stable learning rate and accuracy.

A convolutional neural network (CNN) may comprise an input and an output layer, as well as multiple hidden layers. The hidden layers of a CNN typically comprise a series of convolutional layers that convolve with a multiplication or other dot product. The activation function is commonly a ReLU layer and is subsequently followed by additional convolutions such as pooling layers, fully connected layers and normalization layers, referred to as hidden layers because their inputs and outputs are masked by the activation function and final convolution.

The CNN computes an output value by applying a specific function to the input values coming from the receptive field in the previous layer. The function that is applied to the input values is determined by a vector of weights and a bias (typically real numbers). Learning, in a neural network, progresses by making iterative adjustments to these biases and weights. The vector of weights and the bias are called filters and represent particular features of the input (e.g., a particular shape).

In some embodiments, the learning of models 164 may be of reinforcement, supervised, semi-supervised, and/or unsupervised type. For example, there may be a model for certain predictions that is learned with one of these types but another model for other predictions may be learned with another of these types.

Supervised learning is the ML task of learning a function that maps an input to an output based on example input-output pairs. It may infer a function from labeled training data comprising a set of training examples. In supervised learning, each example is a pair consisting of an input object (typically a vector) and a desired output value (the supervisory signal). A supervised learning algorithm analyzes the training data and produces an inferred function, which may be used for mapping new examples. And the algorithm may correctly determine the class labels for unseen instances.

Unsupervised learning is a type of ML that looks for previously undetected patterns in a dataset with no pre-existing labels. In contrast to supervised learning that usually makes use of human-labeled data, unsupervised learning does not via principal component (e.g., to preprocess and reduce the dimensionality of high-dimensional datasets while preserving the original structure and relationships inherent to the original dataset) and cluster analysis (e.g., which identifies commonalities in the data and reacts based on the presence or absence of such commonalities in each new piece of data).

Semi-supervised learning makes use of supervised and unsupervised techniques described above. The supervised and unsupervised techniques may be split evenly for semi-supervised learning. Alternatively, semi-supervised learning may involve a certain percentage of supervised techniques and a remaining percentage involving unsupervised techniques.

Models 164 may analyze made predictions against a reference set of data called the validation set. In some use cases, the reference outputs resulting from the assessment of made predictions against a validation set may be provided as an input to the prediction models, which the prediction model may utilize to determine whether its predictions are accurate, to determine the level of accuracy or completeness with respect to the validation set, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input data. For example, a labeled training dataset may enable model improvement. That is, the training model may use a validation set of data to iterate over model parameters until the point where it arrives at a final set of parameters/weights to use in the model.

In some embodiments, training component 932 in the architecture 900 illustrated in FIG. 9 may implement an algorithm for building and training one or more deep neural networks. A used model may follow this algorithm and already be trained on data. In some embodiments, training component 932 may train a deep learning model on training data 962 providing even more accuracy after successful tests with these or other algorithms are performed and after the model is provided a large enough dataset.

In an exemplary embodiment, a model implementing a neural network may be trained using training data from storage/database 962. For example, the training data obtained from prediction database 960 of FIG. 9 may comprise hundreds, thousands, or even many millions of pieces of information. The training data may also include past traffic associated with the instant multi-hop network or another multi-hop network. Model parameters from the training data 962 and/or past traffic may include but is not limited to: type of protocol in the traffic, source IP address, associated encrypted pathway, provider of the encrypted pathway, source geography, cadence, and content. Weights for each of the model parameters may be adjusted through training.

The training dataset may be split between training, validation, and test sets in any suitable fashion. For example, some embodiments may use about 60% or 80% of the known probes for training or validation, and the other about 40% or 20% may be used for validation or testing. In another example, training component 932 may randomly split the data, the exact ratio of training versus test data varies throughout. When a satisfactory model is found, training component 932 may train it on 95% of the training data and validate it further on the remaining 5%.

The validation set may be a subset of the training data, which is kept hidden from the model to test accuracy of the model. The test set may be a dataset, which is new to the model to test accuracy of the model. The training dataset used to train prediction models 964 may leverage, via training component 932, an SQL server and a Pivotal Greenplum database for data storage and extraction purposes.

In some embodiments, training component 932 may be configured to obtain training data from any suitable source, e.g., via prediction database 960, electronic storage, external resources 924, network, and/or UI device(s). The training data may comprise, a type of protocol, source IP address, destination IP address, source and destination port numbers, associated encrypted pathway, provider of the encrypted pathway, source geography, cadence, content, time of day, etc.).

In some embodiments, training component 932 may enable one or more prediction models to be trained. The training of the neural networks may be performed via several iterations. For each training iteration, a classification prediction (e.g., output of a layer) of the neural network(s) may be determined and compared to the corresponding, known classification. For example, sensed data known to capture a closed environment comprising dynamic and/or static objects may be input, during the training or validation, into the neural network to determine whether the prediction model may properly predict probes from third parties. As such, the neural network is configured to receive at least a portion of the training data as an input feature space. As shown in FIG. 9, once trained, the model(s) may be stored in database/storage 964 of prediction database 960 and then used to classify received probes from third parties.

Electronic storage 922 of FIG. 9 comprises electronic storage media that electronically stores information. The electronic storage media of electronic storage 922 may comprise system storage that is provided integrally (i.e., substantially non-removable) with a system and/or removable storage that is removably connectable to a system via, for example, a port (e.g., a USB port, a firewire port, etc.) or a drive (e.g., a disk drive, etc.). Electronic storage may be (in whole or in part) a separate component within the system, or electronic storage may be provided (in whole or in part) integrally with one or more other components of a system (e.g., a user interface (UI) device, processor, etc.). In some embodiments, electronic storage may be located in a server together with processor, in a server that is part of external resources, in UI devices, and/or in other locations. Electronic storage may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage may store software algorithms, information obtained and/or determined by processor, information received via UI devices and/or other external computing systems, information received from external resources, and/or other information that enables system to function as described herein.

External resources may include sources of information (e.g., databases, websites, etc.), external entities participating with a system, one or more servers outside of a system, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources may be provided by other components or resources included in the system. Processor, external resources, UI device, electronic storage, a network, and/or other components of the system may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

UI device(s) of the system may be configured to provide an interface between one or more clients/users and the system. The UI devices may include client devices such as computers, tablets and smart devices. UI devices are configured to provide information to and/or receive information from the one or more users/clients. UI devices include a UI and/or other components. The UI may be and/or include a graphical UI configured to present views and/or fields configured to receive entry and/or selection with respect to particular functionality of the system, and/or provide and/or receive other information. In some embodiments, the UI of UI devices may include a plurality of separate interfaces associated with processors and/or other components of the system. Examples of interface devices suitable for inclusion in UI device include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices include a removable storage interface. In this example, information may be loaded into UI devices from removable storage (e.g., a smart card, a flash drive, a removable disk) that enables users to customize the implementation of UI devices.

In some embodiments, UI devices are configured to provide a UI, processing capabilities, databases, and/or electronic storage to the system. As such, UI devices may include processors, electronic storage, external resources, and/or other components of the system. In some embodiments, UI devices are connected to a network (e.g., the Internet). In some embodiments, UI devices do not include processor, electronic storage, external resources, and/or other components of system, but instead communicate with these components via dedicated lines, a bus, a switch, network, or other communication means. The communication may be wireless or wired. In some embodiments, UI devices are laptops, desktop computers, smartphones, tablet computers, and/or other UI devices on the network.

Data and content may be exchanged between the various components of the system through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol (IP) defines addressing methods and structures for datagram encapsulation. Of course, other protocols also may be used. Examples of an Internet protocol include Internet Protocol version 4 (IPv4) and Internet Protocol version 6 (IPv6).

In some embodiments, processor(s) may form part (e.g., in a same or separate housing) of a user device, a consumer electronics device, a mobile phone, a smartphone, a personal data assistant, a digital tablet/pad computer, a wearable device (e.g., watch), AR goggles, VR goggles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a space craft, or any other device. In some embodiments, processor is configured to provide information processing capabilities in the system. Processor may comprise one or more of a digital processor, an analog processor, a digital circuit designed to process information, an analog circuit designed to process information, a state machine, and/or other mechanisms for electronically processing information. Although processor is shown in FIG. 9 as a single entity, this is for illustrative purposes only. In some embodiments, processor may comprise a plurality of processing units. These processing units may be physically located within the same device (e.g., a server), or processor may represent processing functionality of a plurality of devices operating in coordination (e.g., one or more servers, UI devices, devices that are part of external resources, electronic storage and/or other devices).

As shown in FIG. 9, processor is configured via machine-readable instructions to execute one or more computer program components. The computer program components may comprise one or more of information component 930, training component 932, prediction component 934, annotation component 936, trajectory component 938, and/or other components. Processor may be configured to execute components 930, 932, 934, 936, and/or 938 by: software; hardware; firmware; some combination of software, hardware, and/or firmware; and/or other mechanisms for configuring processing capabilities on processor.

It should be appreciated that although components 932, 932, 934, 936, and 938 are illustrated in FIG. 9 as being co-located within a single processing unit, in embodiments in which processor comprises multiple processing units, one or more of components 930, 932, 934, 936, and/or 938 may be located remotely from the other components. For example, in some embodiments, each of processor components 930, 932, 934, 936, and 938 may comprise a separate and distinct set of processors. The description of the functionality provided by the different components 930, 932, 934, 936, and/or 938 described below is for illustrative purposes, and is not intended to be limiting, as any of components 930, 932, 934, 936, and/or 938 may provide more or less functionality than is described. For example, one or more of components 930, 932, 934, 936, and/or 938 may be eliminated, and some or all of its functionality may be provided by other components 930, 932, 934, 936, and/or 938. As another example, processor may be configured to execute one or more additional components that may perform some or all of the functionality attributed below to one of components 930, 932, 934, 936, and/or 938.

FIG. 9 may also illustrates another smart gateway 940 connected to network 970.

Threat Estimation, Prediction, and Characterization

According to even a further aspect of the application, a method of estimating relative security of a VSAT network characterizing an attack is set forth, including, e.g., but not limited to, a location or attribution of the attacker, equipment being used in the attack, etc.)

As will be apparent to those skilled in the relevant art, VSAT networks are inherently dynamic systems. The geometric relationship between a teleport ("hub"), VSAT user terminals ("terminals"), and satellite dictates how the system functions including, e.g., but not limited to, the system's timing, power, antenna pointing, and other operating functions. Attackers exploit this geometric relationship to successfully compromise VSAT networks.

By analyzing the VSAT network geometry, an exemplary embodiment may include, e.g., but not limited to:
  predict relative security (i.e., difficulty of exploitation) of the VSAT network over radio frequency (RF) communication;
  determine which VSAT user terminals might be complicit in an exemplary VSAT network compromise (i.e., may be participating in spoofing based attack); and/or
  determine the geographic region(s) that an attack may have come originated from.

According to an exemplary embodiment, one may assume a star topology VSAT network operating on a geostationary satellite using a constant outbound carrier (e.g., but not limited to, an exemplary DVB-S2 frame capable of providing adaptive coding and modulation satellite services) and a time division multiple access (TDMA) based inbound channel(s), according to an exemplary embodiment. According to an exemplary embodiment, slant range may refer to the distance between a user terminal and a satellite. Due to the geographically diverse locations of the VSAT user terminals, the slant range (terminal to satellite) of the VSAT user terminals, varies, according to an exemplary embodiment. The slant range variability of VSAT user terminals necessitates that the hub be "location aware" of the VSAT user terminals in order to manage TDMA time slots, according to an exemplary embodiment.

Should an exemplary attacker VSAT terminal "spoof" a target VSAT user terminal, the attacker VSAT terminal must keep the attacker VSAT terminal slant range equal to the slant range of the target VSAT user terminal (i.e., within a margin of error dictated by an exemplary acquisition timing search range of the hub). According to an exemplary embodiment, a region of equal timing of the VSAT user terminals is referred to herein as an "isochrone," according to an exemplary embodiment If the slant range of the attacker VSAT terminal is not the same as the slant range of the target VSAT terminal, then the transmissions of the attacker VSAT terminal will miss the timeslot of the target VSAT terminal and skew either into the guard band or stomp on other timeslots of other VSAT terminals, causing loss of communication, according to an exemplary embodiment. A terminal attempting to impersonate or spoof a given user terminal may attempt to conceal itself by impersonating the given user terminal by, e.g., but not limited to, inserting delay to approximate a similar slant range or timing as the target user terminal, which the attacking user terminal is attempting to impersonate, according to an exemplary embodiment. A terminal attempting to impersonate or spoof a given user terminal may also attempt to conceal itself by impersonating the given user terminal by, e.g., but not limited to, adopting a user device identifier which may correspond to the user device identifier of the target user terminal, which the attacking user terminal is attempting to impersonate, according to an exemplary embodiment.

If a user terminal is potentially suspected of being an attacking user terminal impersonating a target user terminal, the hub may take exemplary active measures to test the suspicion, according to an exemplary embodiment. According to an exemplary embodiment, the hub or other network device (e.g., hardware appliance, software agent, etc.) may, e.g., interrogate the user terminal to determine whether the user terminal is actually the target user terminal, or rather an attacking user terminal impersonating the target user terminal.

One method of interrogating a user terminal may include, e.g., but not limited to, by sending a configuration change from the hub to an exemplary user terminal, and analysis of the response to such exemplary configuration change, according to an exemplary embodiment.

A hub may interact with an exemplary user terminal by, e.g., but not limited to, by using DVB-S2 adaptive coding and modulation (ACM), which may be used to optimally take advantage of maximum amount of available bandwidth of the communication network. According to an exemplary embodiment, a hub may be location aware of the user terminals in communication with the hub, and may be preconfigured in the hubs' network management system (NMS), the locations of each user terminal and may adjust timing to keep all communication in timing synchronization, e.g., taking into account mobile terminals and the like, and accounting for variations in transceiver power, coding and modulation, etc., of exemplary user terminals in communication over the exemplary SATCOM system.

According to an exemplary TDMA access method SATCOMM system, timing information may be sent down from the hub to each user station, for highly time sensitive communication by user terminals during designated exemplary time slots as may be assigned via an exemplary burst time plan.

According to an exemplary embodiment, the exemplary user terminal may communicate with the hub station via an exemplary highest order of coding and modulation scheme, via exemplary protocols which may include an exemplary adjustable coding and modulation (ACM) method and/or scheme, since by adjusting to send data to each user terminal at a highest possible signal strength, the system may optimally push a greater amount of data through each given frame, so as to take advantage of as much bandwidth as is available for overall system data throughput maximization, according to an exemplary embodiment. According to an exemplary embodiment, if a shift in modulation may be identified between a user terminal going offline and coming back online, the suspicion level of that terminal may be raised, and may be analyzed for the potential of an attacking user terminal impersonating the target user terminal. The change/shift in modulation could be due to a different user terminal coming online, or alternatively could be due to other outside effects. To raise confidence in whether the user terminal is legitimate versus an attacker impersonating a target, according to an exemplary embodiment, the system may attempt to ascertain, and rule out alternative explanations for the shift in modulation, such as, e.g., but not limited to, whether a dish was skewed by a one-time accident versus determining whether there is a real-time weather occurrence such as, e.g., but not limited to, rain fade, cloud cover, snow, a hurricane, vs. sunny clear sky and/or other atmospheric effect including solar flares, extreme temperatures, heat effects, etc., and based on heuristic analysis may modify the confidence in the suspicion level associated with the user terminal in raising and/or lowering the level of threat suspicion, according to an exemplary embodiment.

In the case of a fixed antenna, exemplary slant range should be relatively constant, and a change in slant range may raise greater suspicion from perhaps an exemplary mobile or moving impersonating user terminal, according to an exemplary embodiment. Thus, according to an exemplary embodiment, tracking a history of an exemplary range of variation in exemplary parameters, over time, may be able to model an expected predictive data set, akin to a signature for a given user terminal, against which real time reading parameters may be compared and analyzed to ascertain a likelihood of threat suspicion, which may then be iteratively analyzed for confidence, so as to determine whether an outlier rises to sufficient confidence to trigger an alarm/alert and/or other notification of a potential detected suspicious access, according to an exemplary embodiment.

According to an exemplary embodiment, an exemplary alarm may be studied and if determined to be, e.g., but not limited to, a duplicate alarm and/or ruled out for other reasons, may be, e.g., but not limited to, silenced, and/or paused, and/or delayed, and/or delayed for an exemplary period of time, or for a time duration, etc., according to an exemplary embodiment.

According to another exemplary embodiment, rather than a timing and/or coding and/or modulation change being identified, an exemplary change in polarization parameters may also be used as a potential exemplary trigger to be analyzed for potential suspicion of a threat and/or impersonation by an attacker of a target user terminal. For example, one polarization parameter, which may be analyzed could include, e.g., but not limited to, an exemplary cross-polarization isolation parameter, according to an exemplary embodiment. For example, in an exemplary embodiment, during antenna pointing, an optimal cross-polarization isolation level may be used for optimal pointing of the antenna, to correspond to, e.g., a satellite operator's exemplary recommended cross-polarization isolation (cross-pol), according to an exemplary embodiment. Consider for example, an example satellite operator recommends that for optimal aiming, the antenna be directed in the direction toward the satellite so as to provide a cross-pol isolation of a given operator pre-determined isolation, say, e.g., but not limited to, an exemplary 30 decibel (dB) isolation, and/or a range of potential isolations, say, e.g., from an exemplary lower cross-pol isolation to an exemplary upper cross-pol isolation, according to one exemplary embodiment. After antenna aiming achieves a desired cross-pol isolation, according to an exemplary embodiment, a fixed antenna may be locked in that orientation to remain within the operator desired cross-pol isolation, according to an exemplary embodiment. In this case, at a later date, if the antenna gets hit by a baseball, or is on a roof and gets moved by a roofer changing roofing shingles, the antenna may get out of alignment, as may be determined from a change in the cross-pol isolation and/or other polarization related parameters, according to an exemplary embodiment. According to an exemplary embodiment, if an attacker attempts to impersonate a target user terminal with the attacker's user terminal, the attacker's user terminal may not have exactly the same polarization parameters as the target user terminal, e.g., the attacker terminal may be a mobile terminal and may have its antenna aimed a little differently than an exemplary fixed and optimally aimed target user terminal's antenna. Thus, according to one exemplary embodiment, upon identifying a change in polarization parameters may be used to trigger raising suspicion of a potential attacker impersonating a target user terminal. According to an exemplary embodiment, the confidence in the suspicion may be analyzed by exemplary heuristics analyzing the exemplary polarization parameters. For example, polarization parameters may be expected to vary within an exemplary range based upon exemplary expected movement of, e.g., but not limited to, the satellite within its station keeping and ephemeris range of variation of satellite location within the satellite's orbital box, according to an exemplary embodiment. Thus, according to an exemplary embodiment, an expected range of variation of the exemplary polarization parameters may be tracked by logging monitored data as captured via, e.g., but not limited to, the hub and/or a database coupled to the hub and/or other network equipment, and may, over time, determine what an expected range of variation attributable to such station keeping changes, and/or other variation such as, e.g., movement of a mobile user terminal, or the like, and from that expected variation range, real-time observation/monitoring of a user terminal's associated polarization parameters may be used to identify any outlying polarization parameters, potentially attributable to an attacker impersonating a target user terminal.

As will be apparent to those skilled in the relevant art, cross-polarization isolation is only one example of a polarization parameter, which may be monitored and analyzed, however other example polarization parameters including other parameters associated with linear polarization, as well as other parameters such as, e.g., but not limited to, parameters associated with circular polarization, may also be analyzed for potential variance from logged historical differential ranges, according to an exemplary embodiment. According to an exemplary embodiment, exemplary parameter data may be accumulated and/or graphed, as an exemplary continuous signal having an exemplary amplitude value capable of being tracked and/or numerically tracked, and/or other data, and may, e.g., but not limited to, may be analyzed for variation by any of various exemplary statistical methods such as, including, e.g., but not limited to, means averages, and/or standard deviations of the exemplary variations may be determined, and exemplary thresholds may be used to ascertain exemplary anomalous and/or outlier monitored data exceeding exemplary logged historical data. Such techniques analyzing variation of monitored values of exemplary polarization parameters, may also be used in exemplary analysis of other data variation as otherwise discussed herein, including e.g., but not limited to, exemplary variation in exemplary timing, coding and modulation, forward error correction (FEC) data, timing, time delay, changes in power levels, data throughput, substantial change in rate of bandwidth utilization, and/or variation in user terminals and/or other user devices to which data may be sent (e.g., new destination location for packets, destinations in particular new regions of potential higher suspicion, etc.), etc.

As it is impossible to artificially shorten the slant range between a user terminal and satellite, an attacker terminal may not have a longer slant range than the target terminal (since there is no way for an attacker VSAT terminal to shorten a terminals timing, since timing is based on propagation delay). However, an attacker terminal could have a shorter slant range, and inject artificial delay into the attacker terminal's signal, effectively increasing the attacker terminal slant range in order to sit on the isochrone of the target VSAT terminal, being spoofed, according to an exemplary embodiment.

According to an exemplary embodiment, by analyzing the geometry of a VSAT satellite network, the relative security of the VSAT network can be estimated. According to an exemplary embodiment, a VSAT network with a tight spot-beam and VSAT terminals with isochrones that sit over oceans or within borders of a country make those ocean-based or within country border terminals less prone to attack. If a satellite network operator has specific security concerns, geometrically architecting the VSAT network to specifically combat the specific security concerns is important and often overlooked. According to an exemplary embodiment, exemplary methods of threat estimation, threat prediction, threat characterization and the various techniques of performing such analysis, as discussed herein make this network geometry architecture planning possible, according to an exemplary embodiment. For example, by narrowing timing search windows, picking particular spotbeams and satellites (to limit a number of vulnerable isochrones and satellite footprints with energy in hostile territory), an exemplary hardened network may be architected to be more inherently secure by avoiding being vulnerable to such isochrone, similar slant range terminal based attacks.

By flagging an attack based on other exemplary heuristics, as set forth in the exemplary embodiments disclosed herein, one may determine with relative certainty which remote VSAT user terminal on a given VSAT network may be being spoofed, according to an exemplary embodiment. According to one exemplary embodiment, based on the flagged remote VSAT user terminal, an isochrone may be calculated. Pairing the calculated isochrone with the spot-beam footprint of the satellite associated with the flagged remote VSAT user terminal, may yield the likely region an attack originated from, according to an exemplary embodiment. Thus, the attack origin may be attributed to the likely actor associated with the geographic region of the attacking user terminal location on the isochrone.

A less sophisticated attacker will exist on an isochrone, according to an exemplary embodiment. Attackers are more likely to choose to attack from an isochrone. Since attacker VSAT terminals are more likely to be placed on an isochrone, to avoid requiring complex timing delay adjustment and management, and thus isochron locations with satellite footprints in enemy territory increase a probability of attack, according to an exemplary embodiment. Thus, VSAT terminal in locations with isochrones crossing multiple geographic boundaries, e.g., with satellite footprints spanning more than one country, particularly when spanning non-ally countries, may be rated as having a higher probability of hosting spoof attacks, according to an exemplary embodiment.

A highly sophisticated attacker will inject delay into their timing, and may sit between the isochrone and the satellite (i.e., the attacking VSAT user terminal will choose to be a shorter distance from the satellite than the target VSAT user terminal, adding delay to mimic timing of the target VSAT terminal), according to an exemplary embodiment.

Attacks may be deemed to be more likely to originate from habitable regions on land, to allow for less complex spoofing, according to an exemplary embodiment. According to an exemplary embodiment, then analyzing habitable regions on land for a potential attacker to place an attacking terminal further narrows likely locations.

According to an exemplary embodiment, an exemplary attack may likely come from a "sanctuary," country, i.e., if there are known "enemies" or allies of known enemies, that lay on an isochrone, the sanctuary regions are a higher probability, and may be weighed more heavily in exemplary prediction analytics/heuristics, according to an exemplary embodiment.

If an attacker persists on a network for a long period of time, slight variations of the attacker's timing may further refine their location (due to satellite ephemeris movement in station keeping), according to an exemplary embodiment.

According to an exemplary embodiment, based on an exemplary modulation and coding (MODCOD) of a spoofed target VSAT terminal, a satellite operator may also be able to make inferences of where an attacking VSAT terminal may be coming from. According to an exemplary embodiment, a degraded MODCOD may indicate an attacking VSAT terminal is operating in, e.g., but not limited to, a poor signal region of a beam, in a pocket of weather, in the presence of a small user terminal, in poor alignment, and/or using a low power BUC, etc., according to an exemplary embodiment.

Attack Detection Metrics

According to a further aspect, the application describes an Attack/Intrusion Detection System of Monitoring, Logging, Analyzing, Weighting, Comparing Metrics to Thresholds, Performing Heuristics, Threat Estimation, Threat Prediction, Threat Characterization, Analysis, Ranking, and Alert/Notification Generation. The system may include one or more of:

- detecting an intrusion/attack of a VSAT network;
- analyzing inputs and outputs to the VSAT network;
- monitoring RF signal of at least one of the plurality of VSAT terminals (e.g., but not limited to, inbound signals, outbound signals, etc.;
- monitoring raw radio frequency (RF) signal properties of the at least one of the plurality of VSAT terminals, with monitoring by at least one of: the hub; the network management system portion of the hub; an onsite server; a hardware appliance; an onsite hardware appliance; a radio frequency monitoring hardware appliance; or a software application server;
- monitoring power properties of the at least one of the plurality of VSAT terminals;
- analyzing acquisition burst at authentication;
- analyzing device ID;
- monitoring polarization properties of the at least one of the plurality of VSAT terminals;
- monitoring, e.g., but not limited to, cross-polarization isolation of the at least one of the plurality of VSAT terminals;
- determining if optimal polarization parameters are being abided by, e.g., an example operator designated parameter, such as isolation, etc. to a range or a given optimal isolation, (e.g., at least 30 dB isolation differential between vertical polarization and horizontal polarization of the at least one of the plurality of VSAT terminals);
- monitoring frequency properties of the at least one of the plurality of VSAT terminals;
- monitoring network level demodulated RF signals of at least one of the plurality of VSAT terminals;
- analyzing pattern of life of the at least one of the plurality of VSAT terminals;
- logging or storing history associated with the at least one of the plurality of VSAT terminals;
- determining if VSAT terminal normally online or offline during time period;
- analyzing frequency;
- determining if same operating frequency;
- analyzing modulation;
- determining changes in modulation;
- determining if same adaptive coding and modulation (ACM) scheme;
- determining if acquisition burst modulation is different from last drop off modulation and coding scheme;
- analyzing timing;

same 3-dimensional distance from satellite and/or same isochrone;
same or different delay to impersonate another terminal;
analyzing configuration data;
analyzing device ID;
possibility of being spoofed;
analyzing current data against pattern of life;
comparing current traffic to logged or stored history associated with the at least one of the plurality of VSAT terminals;
analyzing timing of the at least one of the plurality of VSAT terminals;
identifying anomalies in analyzed timing;
analyzing modulation;
monitoring network (TCP/IP) based communications such as:
watching user traffic;
Internal to Internal (VSAT terminal to VSAT terminal or hub);
Normal pattern of life, or new terminal to communicate with;
Internal to External (VSAT terminal to external host via hub);
New host;
External to Internal;
New external host communicating to hub;
Monitoring network traffic TO the HUB:
Has the network been penetrated via traditional Computer Network Operations (CNO) methods;
Government cyber actor—phishing email sent to Network Admin compromises the computer to swim upstream and hack the hub;
Hacking the hub if it exists directly on the Internet;
Traffic Analysis for all user traffic;
Watch traffic type;
Traffic Type—Ex. Normally HTTP traffic but now we see different type of traffic (e.g., administrative protocol, e.g., SSH);
Traffic pattern of life;
When is traffic occurring (does it match pattern of life of the VSAT terminal (what is normal for Alice);
Watch traffic destinations;
Hosts;
Who is the VSAT terminal communicating to? What host is Alice talking to? Is it normal for her by comparing to pattern of life the VSAT terminal;
Internal hosts (LAN);
External hosts (WAN)—Russia, China, etc.;
By Hybrid—of Network (IP based) and RF based;
Analyzing if strange network level traffic correlates to RF or other based; suspicious events;
Heuristics/Signatures;
Software based monitoring (agent or appliance) build confidence, use a ranking system of data, use heuristics, probability and statistics weighting to build confidence, when exceeds a threshold throw alert, generate alert/notification;
External Data Sources;
Atmospheric events, e.g., weather, clouds, hurricanes, at teleport(hub) and terminals (link estimation);
Solar flare events;
Vast temperature changes;
Power grid factors;
Terminal Connection/Disconnection/Reconnection (pattern of life);
Did it shut off;
Caused by rain fade? Rule out by atmospheric data;
Caused by jamming? Is VSAT terminal always online, and suddenly goes offline? Why did terminal go down? Did terminal get jammed off? Interrogate terminal, take retroactive measures (make slight change to terminal configuration, check if terminal drops offline), check if configuration change sticks, or is modified;
Was jamming detected;
Is pattern of life consistent over time;
Modulation Changes;
Changes to coding and modulation scheme;
Power Changes—Monitoring using data already collected by NMS;
Initial power;
Was the power too high or too low when coming online. Does power stay too high or too low;
Timing Changes;
Isochrone;
The line of same timing between a terminal and a satellite;
Plot timing variances over time. Analyze differentials. (changes within station keeping of the satellite—ephemeris of satellite wobble in its orbital slot);
Are timing variances different or inappropriate for geometry of satellite network;
How far does VSAT terminal normally vary from ideal, has timing been observed to differ outside of expected range, e.g., measure amplitude expected variation and compare to measured amplitude, difference in signal identified;
Addition of artificial delay into RF chain;
Signatures/Process Monitoring/hub and terminal software validation;
Hub, Supporting Servers (NMS, PP), Terminals, Line Cards, etc.;
Integrity monitoring of:
RAM;
Disk Contents;
Processes;
Network based monitoring;
Type of traffic sent by remote (protocol, content, destination, etc.);
Communication with restricted hosts (NMS, PP, Line Cards, Other Terminals;
Network Resets (User initiated or Network Based);
RF based monitoring—Gathering data using a separate "box" as the NMS may not have the ability to gather this information;
Power;
Polarization/Cross Polarization;
Jamming detection;
Intelligent jamming;
Jamming of a specific modem;
Dumb jamming;
Indiscriminate jamming of RF channel;
Active interrogation of modem;
Forced configuration changes;
Data retrieval;
Alerting;
Different levels of alerting based on confidence score from heuristics and monitoring;
Automatic defensive measures;
Ex. Turn off service for that terminal;
Threat Analysis and Prediction;
Computation of relative security level of network based on but not limited to:
Suspected threats;
Geography;
Network Footprints;

Intelligent determination of threat origin:
RF direction finding (single or two ball geolocation, space/ground/air based receivers);
Satellite network geometry;
Timing;
Geography/Terrain/Population density/Known Satellite Stations;

Some of the functionality discussed above includes, e.g., but not limited to, the following terms:

detecting and/or detecting intrusions;
monitoring and/or monitoring network metrics (radio frequency (RF) and/or Network level) for signs of an intrusion;
logging and/or logging data from key metrics being monitored. Note that logged data doesn't necessarily need to be formally written to disk; logged data reside in memory; a buffer; a cache and/or as a last seen value; and/or some adaptive threshold;
interrogating and/or referring to active probing of a modem and/or terminal device and/or device in question; interrogating may be referred to in some cases as an example active analysis vs. a passive analysis;
analyzing and/or comparing and/or analyzing incoming values that are monitored and/or logged values to determine likelihood of an intrusion; sometimes analyzing and/or comparing may be over a long period of time and/or may require large amounts of logged data (e.g., but not limited to, timing variances); sometimes analyzing and/or comparing may be instantaneous (e.g., but not limited to, an example insane power spike from terminal and/or an example vastly different polarization change, etc.);
alerting and/or alarming and/or alerting operators to possible suspicious modems and/or strange deviations from the norm; alarming may also be issued and/or if, e.g., thresholds are met, etc.;
silencing and/or watching and/or silencing and/or deferring alarms, etc., and/or may including keeping a close eye on the given device the subject of an alarm and/or alert, and/or for the alarm and/or alert to rearm; and/or
modifying and/or manually modifying, and/or adjusting, etc., e.g., but not limited to, threshold(s) in the case of a known good user terminal that may alarm too often (and/or where exemplary logged data and/or metrics may be, too sensitive).

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. An intrusion detection system comprising:
    a non-transitory memory including a set of instructions; and
    a processor operably coupled to the non-transitory memory configured to execute the set of instructions including:
        obtaining streaming metrics data from a satellite network management system;
        identifying a very small aperture terminal (VSAT) in an intrusion detection database;
        determining, based on the streaming metrics data, whether a confidence score providing an indication of authenticity for the identified VSAT meets or exceeds a predetermined threshold; and
        generating an alert based upon the determination.

2. The intrusion detection system of claim 1, wherein the determination includes:
    detecting the VSAT is in an online state after being in an offline state;
    determining a prior transmit power for the VSAT before being in the offline state; and
    determining a current transmit power for the VSAT in the online state,
    wherein the confidence score is based on a difference between the prior transmit power and the current transmit power.

3. The intrusion detection system of claim 1, wherein the determination includes:
    calculating, for the VSAT, a prior amplitude and a prior frequency of a prior periodic oscillating waveform representing a time-based variation of a timing offset during a prior period of time; and
    calculating, for the VSAT, a current amplitude and a current frequency of a current periodic oscillating waveform representing a time-based variation of a timing offset during a current period of time,
    wherein the confidence score is based on a difference between the prior amplitude and the current amplitude and/or the prior frequency and the current frequency.

4. The intrusion detection system of claim 1, wherein the determination includes:
    determining a prior operating temperature for the VSAT at a prior period of time; and
    determining a current operating temperature for the VSAT at a current period of time,
    wherein the confidence score is based on a difference between the prior operating temperature and the current operating temperature and/or lack of a predetermined variation in the current operating temperature.

5. The intrusion detection system of claim 1, wherein the determination includes:
    detecting the VSAT is an online state after being in an offline state;
    determining a prior noise value for the VSAT prior to being in the offline state; and
    determining a current noise value for the VSAT in the online state,
    wherein the confidence score is based on a difference between the prior noise value and the current noise value, and
    wherein the prior noise value and the current noise value are based on a ratio of carrier to noise or carrier to noise density.

6. The intrusion detection system of claim 1, wherein the determination includes:
    detecting the VSAT is an online state after being in an offline state;
    determining a prior equipment aspect for the VSAT prior to being in the offline state; and
    determining a current equipment aspect for the VSAT in the online state,
    wherein the confidence score is based on a difference between the prior equipment aspect and the current equipment aspect, and
    wherein the prior equipment aspect and the current equipment aspect include one or more of a LAN port identifier, a modem link speed, a modem link state, a sensitivity of clock to temperature variation, and a feedhorn polarization setup.

7. The intrusion detection system of claim 1, wherein the determination includes:
   determining a prior traffic attribute for the VSAT during a prior period of time; and
   determining a current traffic attribute for the VSAT during a current period of time,
   wherein the confidence score is based on a difference between the prior traffic attribute and the current traffic attribute, and
   wherein the prior traffic attribute and the current traffic attribute include one or more of a relative composition of IP packet types, and an amount of traffic latency.

8. The intrusion detection system of claim 1, wherein the determination includes:
   determining a prior pattern of life for the VSAT during a prior period of time; and
   determining a current pattern of life for the VSAT during a current period of time,
   wherein the confidence score is based on a difference between the prior pattern of life and the current pattern of life, and
   wherein the prior pattern of life and the current pattern of life include one or more of a pattern of operating time and down time of the VSAT, and a pattern of IP traffic transmission of the VSAT.

9. The intrusion detection system of claim 1,
   wherein the intrusion detection database is populated with satellite footprint data and/or weather data, and
   wherein the determination includes:
      determining an actual noise value for the VSAT during a period of time; and
      determining an expected noise value for the VSAT during the period of time, taking into account the satellite footprint data and/or the weather data,
      wherein the confidence score is based on a difference between the actual noise value and the expected noise value, and
      wherein the actual noise value and the expected noise value are based on a ratio of carrier to noise or carrier to noise density, and/or the weather data pertains to one or more of precipitation, cloudiness, and wind.

10. The intrusion detection system of claim 1, wherein the determination is performed by a predictive machine learning model.

11. The intrusion detection system of claim 1, wherein the confidence score is a sum of one or more weighted scores each based on a partial score.

12. A method comprising:
   populating, via an intrusion detection database, streaming metrics data obtained from a satellite network management system operably coupled to a hub station;
   identifying a very small aperture terminal (VSAT) in the intrusion detection database;
   determining, via a trained predictive machine learning model and the streaming metrics data, whether a confidence score providing an indication of authenticity for the identified VSAT meets or exceeds a predetermined threshold; and
   updating the intrusion detection database in view of the determination.

13. The method of claim 12, wherein the determining step further includes:
   detecting the VSAT is in an online state after being in an offline state;
   determining a prior transmit power for the VSAT before being in the offline state; and
   determining a current transmit power for the VSAT in the online state,
   wherein the confidence score is based on a difference between the prior transmit power and the current transmit power.

14. The method of claim 12, wherein the determining step further includes:
   calculating, for the VSAT, a prior amplitude and a prior frequency of a prior periodic oscillating waveform representing a time-based variation of a timing offset during a prior period of time; and
   calculating, for the VSAT, a current amplitude and a current frequency of a current periodic oscillating waveform representing a time-based variation of a timing offset during a current period of time,
   wherein the confidence score is based on a difference between the prior amplitude and the current amplitude and/or the prior frequency and the current frequency.

15. The method of claim 12, wherein the determining step further includes:
   determining a prior operating temperature for the VSAT at a prior period of time; and
   determining a current operating temperature for the VSAT at a current period of time,
   wherein the confidence score is based on a difference between the prior operating temperature and the current operating temperature and/or lack of a predetermined variation in the current operating temperature.

16. The method of claim 12, wherein the determining step further includes:
   detecting the VSAT is an online state after being in an offline state;
   determining a prior noise value for the VSAT prior to being in the offline state; and
   determining a current noise value for the VSAT in the online state,
   wherein the confidence score is based on a difference between the prior noise value and the current noise value, and
   wherein the prior noise value and the current noise value are based on a ratio of carrier to noise or carrier to noise density.

17. The method of claim 12, wherein the determining step further includes:
   detecting the VSAT is an online state after being in an offline state;
   determining a prior equipment aspect for the VSAT prior to being in the offline state; and
   determining a current equipment aspect for the VSAT in the online state,
   wherein the confidence score is based on a difference between the prior equipment aspect and the current equipment aspect, and
   wherein the prior equipment aspect and the current equipment aspect include one or more of a LAN port identifier, a modem link speed, a modem link state, a sensitivity of clock to temperature variation, and a feedhorn polarization setup.

18. The method of claim 12, wherein the determining step further includes:
   determining a prior traffic attribute for the VSAT during a prior period of time; and
   determining a current traffic attribute for the VSAT during a current period of time, wherein the confidence score is based on a difference between the prior traffic attribute and the current traffic attribute, and wherein the prior traffic attribute and the current traffic attribute include one or more of a relative composition of IP packet types, and an amount of traffic latency.

19. A non-transitory computer readable medium including program instructions which when executed by a processor effectuate:

causing streaming metrics data to be obtained from a satellite network management system;

identifying a very small aperture terminal (VSAT) in an intrusion detection database;

determining, via a trained predictive machine learning model and the streaming metrics data, whether a confidence score providing an indication of authenticity for the identified VSAT meets or exceeds a predetermined threshold; and updating the intrusion detection database in view of the determination.

20. The non-transitory computer readable medium of claim 19, wherein the determining instructions include:

calculating, for the VSAT, a prior amplitude and a prior frequency of a prior periodic oscillating waveform representing a time-based variation of a timing offset during a prior period of time; and calculating, for the VSAT, a current amplitude and a current frequency of a current periodic oscillating waveform representing a time-based variation of a timing offset during a current period of time, wherein the confidence score is based on a difference between the prior amplitude and the current amplitude and/or the prior frequency and the current frequency.

* * * * *